(12) United States Patent
Kiessling et al.

(10) Patent No.: US 9,206,271 B2
(45) Date of Patent: Dec. 8, 2015

(54) FULLY BACKBONE DEGRADABLE AND FUNCTIONALIZABLE POLYMERS DERIVED FROM THE RING-OPENING METATHESIS POLYMERIZATION (ROMP)

(71) Applicant: WISCONSIN ALUMNI RESEARCH FOUNDATION, Madison, WI (US)

(72) Inventors: Laura L. Kiessling, Madison, WI (US); Joshua Fishman, Madison, WI (US); Lynne Prost, Fitchburg, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 1 day.

(21) Appl. No.: 13/841,592

(22) Filed: Mar. 15, 2013

(65) Prior Publication Data

US 2013/0281644 A1    Oct. 24, 2013

Related U.S. Application Data

(60) Provisional application No. 61/615,318, filed on Mar. 25, 2012.

(51) Int. Cl.

| | |
|---|---|
| *C08F 26/06* | (2006.01) |
| *C08F 2/00* | (2006.01) |
| *C08F 297/02* | (2006.01) |
| *C08F 8/00* | (2006.01) |
| *C08F 290/14* | (2006.01) |
| *C08F 279/00* | (2006.01) |
| *C08G 61/04* | (2006.01) |
| *C08F 6/00* | (2006.01) |
| *C08G 83/00* | (2006.01) |
| *C08F 232/08* | (2006.01) |
| *C08L 101/00* | (2006.01) |

(52) U.S. Cl.
CPC ............... *C08F 26/06* (2013.01); *C08F 232/08* (2013.01); *C08G 83/00* (2013.01); *C08L 101/005* (2013.01)

(58) Field of Classification Search
CPC ........ C08F 26/06; C08F 232/08; C08G 83/00
USPC ............... 526/258, 72; 525/242, 55, 50, 313; 520/1; 528/480, 491, 482
See application file for complete search history.

(56) References Cited

U.S. PATENT DOCUMENTS

| | | | |
|---|---|---|---|
| 6,111,121 A | 8/2000 | Grubbs et al. | |
| 6,271,315 B1 | 8/2001 | Kiessling et al. | |
| 6,291,616 B1 | 9/2001 | Kiessling et al. | |
| 6,538,072 B2 | 3/2003 | Kiessling et al. | |
| 6,759,537 B2 | 7/2004 | Grubbs et al. | |
| 6,921,735 B2 | 7/2005 | Hoveyda et al. | |
| 6,972,320 B2 | 12/2005 | Raines et al. | |
| 7,256,259 B2 | 8/2007 | Raines et al. | |
| 7,317,129 B2 | 1/2008 | Raines et al. | |
| 7,329,758 B1 | 2/2008 | Grubbs et al. | |
| 2010/0048866 A1 | 2/2010 | Raines et al. | |
| 2011/0077406 A1 | 3/2011 | Garg et al. | |

OTHER PUBLICATIONS

Fraser et al, Degradable Cyclooctadiene/Acetal Copolymers: Veratile Precursors to 1,4-Hydroxytelechelc Polybutadiene and Hydroxytelechelic Polyethylene, 1995, Macromolecules, 28, 7256-7261.*
Jeffrey et al, Generation and Reactivity of Aza-Oxyallyl Catinoic Intermediates: Aza-[4+3] Cycloaddition ractions for Heterocycle Synthesis, May 3, 2011, Journal of the American Chemical Society, 133, 7688-7691.*
Afarinkia et al. (1992) "Diels-Alder cycloadditions of 2-pyrones and 2-pyridones," *Tetrahedron.* 48(42):9111-9171.
Bandini et al. (1999) "Synthesis of Perhydrooxazinones from 2-Aza-3-Trimethylsilyloxy-1,3-Butadiene. A General Route to 3,3-Disubstituted-β-Hydroxy Acids," *Synlett.* 11:1735-1738.
Bandlish et al. (1973) "Synthesis and structure of a trimer of 4,5-dihydropyridazine," *J. Org. Chem.* 38(6):1102-1105.
Binder et al. (2004) "Combining Ring-Opening Metathesis Polymerization (ROMP) with Sharpless-Type "Click" Reactions: An Easy Method for the Preparation of Side Chain Functionalized Poly(oxynorbornenes)," *Macromolecules.* 37(25):9321-9330.
Boger et al. (1987) "Preparation and Inverse-Electron-Demand Diels—Alder Reaction of an Electron-Deficient Diene: Methyl 2-OXO-5,6,7,8-Tetrahydro-2h-1-Benzopyran-3-Carboxylate and 6-Methoxy-7-Methoxycarbonyl-1,2,3,4-Tetrahydronaphthalane," *Org. Synth.* 65:98.
Cardillio et al. (1990) "Functionalisation of unsaturated amides: synthesis of chiral α- or β-hydroxy acids," *J. Chem. Soc. Perkin Trans.* 1:1487-1488.
Fraser et al. (1995) "Degradable COD/Acetal Copolymers: Versatile Precursors to 1,4-Hydroxytelechelic Polybutadiene and Hydroxytelechelic Polyethylene," *Macromolecules.* 28:7256-7261.
Fishman J.M. & Kiessling, L.L. (Apr. 2013) "Synthesis of Functionalizable and Degradable Polymers by Ring-Opening Metathesis Polymerization," *Ange. Chem. Int'l Ed.* 52:5061-5064.
Hilt et al. (2009) "Functional end groups for polymers prepared using ring-opening metathesis polymerization," *Nature Chemistry.* 1:537-546.

(Continued)

*Primary Examiner* — Ling Choi
*Assistant Examiner* — Jessica E Whiteley
(74) *Attorney, Agent, or Firm* — Lathrop & Gage LLP

(57) ABSTRACT

Functionalized degradable ROMP (ring-opening metathesis) polymers and methods, starting monomers and synthetic monomeric and polymeric intermediates for preparation of such functionalized polymers. More specifically, monomers having a bicyclic oxazinone structure, a bicyclic urea, or a heteronorbornene core structure, among others, have been found to be substrates for ROMP polymerization. ROMP polymers prepared from these monomers have been found to be both acid and base labile. Additionally, the monomers can be chemically modified at a site distal to the polymerizable moieties and bridgehead carbons. The properties of the resulting polymers and copolymers can be tailored without destabiling the monomer. Polymers and copolymers of the invention are degradable but have a glass temperature of 100° C. or more.

27 Claims, 3 Drawing Sheets

(56) References Cited

OTHER PUBLICATIONS

Hilt et al. (2009) "Thiol-functionalized ROMP polymers via Sacrificial Synthesis," *Macromolecules.* 42(12):4127-4133.

Jeffrey et al. (May 2011) "Generation and reactivity of aza-oxyallyl cationic intermediates: aza-[4+3] cycloaddition reactions for heterocycle synthesis," *J. Amer. Chem. Soc.* 133(20):7688-7691.

Johnson et al. (Jan. 2011) "Core-clickable PEG-branch-azide bivalent-bottle-brush polymers by ROMP: grafting-through and clicking-to," *J. Amer. Chem. Soc.* 133(3):559-566.

Kang et al. (Jun. 2011), "Ultrafast cyclopolymerization for polyene synthesis: living polymerization to dendronized polymers", *J. Amer. Chem. Soc* 133(31):11904-7.

Kolonko et al. (2008), "A polymeric domain that promotes cellular internalization", *J. Amer. Chem. Soc.* 130(17):5626-7.

Lavilla et al. (Jan. 2013) "High T(g) bio-based aliphatic polyesters from bicyclic D-mannitol," *Biomacromolecules.* 14(3):781-793.

Love et al. (2002) "A Practical and Highly Active Ruthenium-Based Catalyst that Effects the Cross Metathesis of Acrylonitrile," *Angew. Chem., Int. Ed.* 41(21):4035-4037.

Mansfeld et al. (2010) "Clickable initiators, monomers and polymers in controlled radical polymerizations—a prospective combination in polymer science," *Polym. Chem.* 1:1560-1598.

Mihovilovic et al. (2006) "Facile Synthesis and Ring-Opening Cross Metathesis of Carbo- and Heterocyclic Bicyclo[3.2.1]oct-6-en-3-ones Using Gaseous Olefinic Reaction Partners," *Adv. Synth. Catal.* 348(4-5):463-470.

Pichavant et al. (Sep. 2011) "Synthesis of pH-Sensitive Particles for Local Delivery of an Antibiotic via Dispersion ROMP," *Macromolecules.* 44(20):7879-7887.

Scholl et al. (1999) "Synthesis and Activity of a New Generation of Ruthenium-Based Olefin Metathesis Catalysts Coordinated with 1,3-Dimesityl-4,5-dihydroimidazol-2-ylidene Ligands," *Org. Lett.* 1(6):953-956.

Smith et al. (2007) "Bioactive and therapeutic ROMP polymers," *Polym. Rev.* 47:419-459.

Walker et al. (2009) "The Living ROMP of trans-Cyclooctene," *Macromolecules.* 42(3):599-605.

Wallace et al. (1987) "Ring-opening polymerization of norbornene by a tantalum catalyst: a living polymerization," *Macromolecules.* 20(2):448-450.

Wright et al. (2001) "Unusual influence of substituents on ring-opening metathesis reactions," *Org. Lett.* 3(26):4275-4277.

Yao et al. (Apr. 2011) "Degradable Rosin-Ester—Caprolactone Graft Copolymers," *Biomacromolecules.* 12(6):2171-2177.

\* cited by examiner

FULLY BACKBONE DEGRADABLE AND FUNCTIONALIZABLE POLYMERS DERIVED FROM THE RING-OPENING METATHESIS POLYMERIZATION (ROMP)

CROSS-REFERENCE TO RELATED APPLICATIONS

This application claims the benefit of U.S. provisional application 61/615,318, filed Mar. 25, 2012 which is incorporated by reference herein in its entirety.

STATEMENT REGARDING GOVERNMENT FUNDING

This invention was made with government support under GM049975 and AI055258 awarded by the National Institutes of Health. The government has certain rights in the invention.

BACKGROUND OF THE INVENTION

Polymers have become an integral component of our society. Advances in synthetic polymer chemistry have allowed plastics to be produced more economically and processed more efficiently than most naturally occurring materials. These advances have enabled the annual production of plastics to increase at a faster rate than lumber, steel, or aluminum in the United States over the last half century. [Mulder, K. F. Technology Forecasting and Social Change 1998, 58, 105.]

Synthetic polymers have also found broad applicability in biological settings. [Kolonko, E. M.; Kiessling, L. L. *J. Am. Chem. Soc.* 2008, 130, 5626.] Because polymer architectures can be highly modular, changes in polymer template, molecular mass, and function can be tailored to elicit a specific biological recognition or signaling event. A valuable for creating these defined materials is the ring-opening metathesis polymerization (ROMP). [Ivin, K. J. and Mol, J. C. *Olefin Metathesis and Metathesis Polymerization.* Academic Press: New York, 1997; Grubbs, G. H (ed.) In *Handbook of Metathesis*; Wiley: VCH; Vol. 3.] Well-defined metal carbene catalysts have been devised that afford control over the polymer chain length and architecture. [L. R. Gilliom, R. H. Grubbs J. Am. Chem. Soc. 1986, 108, 733; K. C. Wallace, R. R. Schrock Macromolecules 1987, 20, 448; R. R. Schrock, S. A. Krouse, K. Knoll, J. Feldman, J. S. Murdzek, D. C. Yang J. Mol. Catal. 1988, 46, 243.] In addition, ruthenium carbene intiators have been developed with excellent air stability and functional group tolerance. [S. T. Nguyen, L. K. Johnson, R. H. Grubbs, J. W. Ziller J. Am. Chem. Soc. 1992, 114, 3974;] J. A. Love, J. P. Morgan, T. M. Trnka, R. H. Grubbs Angew. Chem. Int. Ed. 2002, 41, 4035.] These catalysts enable the synthesis of polymers with a range of functionality. [S. Hilf, A. F. M. Kilbinger Nat. Chem. 2009, 1, 537; K. H. Mortell, R. V. Weatherman, L. L. Kiessling J. Am. Chem. Soc. 1996, 118, 2297; L. L. Kiessling, J. E. Gestwicki, L. E. Strong Curr. Opin. Chem. Biol. 2000, 4, 696; E. B. Puffer, J. K. Pontrello, J. J. Hollenbeck, J. A. Kink, L. L. Kiessling A.C.S. Chem. Biol. 2007, 2, 252; M. J. Borrok, E. M. Kolonko, L. L. Kiessling A.C.S. Chem. Biol. 2008, 3, 101; A. H. Courtney, E. B. Puffer, J. K. Pontrello, Z.-Q. Yang, L. L. Kiessling Proc. Natl. Acad. Sci. 2009, 106, 2500; K. A. Baessler, Y. Lee, N. S. Sampson A.C.S. Chem. Biol. 2009, 4, 357; S.-G. Lee, J. M. Brown, C. J. Rogers, J. B. Matson, C. Krishnamurthy, M. Rawat, L. C. Hsieh-Wilson Chem. Sci. 2010, 1, 322] ROMP methods have provided access to polymers for diverse applications. [D. Smith, E. B. Pentzer, S. T. Nguyen Polym. Rev. 2007, 47, 419; K. Lienkamp, A. E. Madkour, A. Musante, C. F. Nelson, K. Nusslein, G. N. Tew J. Am. Chem. Soc. 2008, 130, 9836; A. V. Ambade, S. K. Yang, M. Weck Angew. Chem., Int. Ed. 2009, 48, 2894; N. J. Robertson, H. A. I. V. Kostalik, T. J. Clark, P. F. Mutolo, H. D. Abruna, G. W. Coates J. Am. Chem. Soc. 2010, 132, 3400.] In particular applications, bioactive ligands have been appended off the ROMP polymer main chain or chain end. [Kolonko and Kiessling, 2008; Hilf, S, and Kilbinger, A. F. M. *Nature Chemistry* 2009, 1, 537.] Functional group tolerance has been exploited to design polymers that can interrogate receptor-mediated cellular processes. [a) Kiessling, L. L.; Gestwicki, J. E.; Strong, L. E. *Curr. Opin. Chem. Biol.* 2000, 4, 696; b) Gestwicki, J. E.; Strong, L. E.; Kiessling, L. L. *Chem. Biol.* 2000, 7(8), 58; c) Borrok, J. M.; Kolonko, E. M.; Kiessling, L. L. A.C.S. *Chem. Bio.* 2008, 3(2), 101.]

Extant polymers from ROMP, like the majority of synthetic polymers, are non-degradable. A functional and degradable polymer from ROMP would allow the synthetically useful traits of ROMP reactions to be combined with the growing need for new degradable polymer scaffolds. Because they are non-degradble, the utility of ROMP polymers in many biomedical applications is limited by the cellular toxicities of the non-degradable polymer backbones. [Kolonko and Kiessling, 2008; Kolybaba, M.; Tabil, L. G.; Panigrahi, S.; Crerar, W. J.; Powell, T.; Wang, B. Presented at the 2003 CSAE/ASAE Annual Intersectional Meeting, Fargo, N. Dak., October 2003; paper RRV03-0007; Fournier, E.; Passirani, C.; Montero-Menei, C. N.; Benoit, J. P. *Biomaterial* 2003. 24, 3311.] A functional and degradable ROMP polymer could allow these biomaterials to be used in vivo by mitigating the side effects caused by prolonged exposure to the hydrolytically stable backbone.

To date, efforts to prepare biodegradable ROMP polymers have afforded polymers that are either functionalizable or partially hydrolysable, but not both (FIG. 1A). For example, polymers wherein a pH- or light-sensitive cleavable linker connects small molecules to the polymer backbone can be used for the controlled release of cargo. [a) Smith, D.; Pentzer, E. B.; Nguyen, S. T. *Polymer Rev.* 2007, 47, 419; b) Pichavant, L.; Bourget, C.; Durrieu, M.-C.; Héroguez, V. *Macromolecules* 2011, 44, 7879; c) Johnson, J. A.; Lu, Y. Y.; Burts, A. O.; Lim, Y. H.; Finn, M. G.; Koberstein, J. T.; Turro, N. J.; Tirrell, D. A.; Grubbs, R. H *J. Amer. Chem. S.* 2011, 133, 559.] Still, the polymeric backbone persists.

Alternatively, partially degradable polymers have been generated. A block copolymer can be generated from a modifiable monomer and a sacrificial dioxepine or dithiepine monomer. [S. Hilf, A. F. M. Kilbinger Nat. Chem. 2009, 1, 537; C. Fraser, M. A. Hillmyer, E. Gutierrez, R. H. Grubbs Macromolecules 1995, 28, 7256; S. Hilf, A. F. M. Kilbinger Macromolecules 2009, 42, 4127.] In this scenario, one block is composed of a non-hydrolysable backbone and the degradable block contains acid-labile acetals or thioacetals that can be cleaved by hydrogenation. Polymers of this type only undergo partial degradation, as one block persists, as shown in FIG. 1A. The current state-of-the-art therefore demands a compromise between generating polymers that can be customized and polymers that can be easily degraded.

U.S. Pat. Nos. 6,271,315 and 6,538,072 relate to functionalization of ROMP monomers and polymers. Each of these patents is incorporated by reference herein for its teachings with respect to functionalization, including reactive functional groups. U.S. Pat. No. 6,291,616 relates to methods for varying the end-groups of ROMP polymers. This patent is incorporated by reference herein in its entirety for a description of such methods which can be applied to the ROMP polymers of this invention.

Alternatively, partially degradable polymers have been generated. A block copolymer can be created from a functionalizable ROMP monomer and a dioxepine or dithiepine monomer. [Hilf, S, and Kilbinger, A. F. M. *Nature Chemistry* 2009, 1, 537. Hilf, S, and Kilbinger, A. F. M. *Macromolecules* 2009, 42, 4127.] The cargo-bearing block has a non-hydrolysable backbone, and the degradable block contains acid-labile acetals or thioacetals along the backbone. Following hydrolysis, the non-degradable block is retained as an oligomer. While advances have been made in the art, there remains a significant need for biodegradable ROMP polymers which can be functionalized.

Applying ROMP to synthesize a modifiable homopolymer with a degradable backbone requires a monomer with three important attributes. First, it must be a strained cyclic or bicyclic olefin, so that it undergoes polymerization. [Walker, R.; Conrad, R. M.; Grubbs, R. N. Macromolecules 2009, 42, 599.] Second, it must contain core functionality that gives rise to a polymer that can be degraded. Third, a means to append desired functionality onto the monomer or polymer is needed to enable polymer diversification. Monomers with all of these attributes have been elusive. Many strained olefinic heterocycles spontaneously aromatize. [Boger, D. L.; Mullican, M. D. J. Org. Synth. 1987, 65, 98; K. Afarinkia, V. Vinader, T. D. Nelson, G. H. Posner Tetrahedron 1992, 48, 9111] In addition, attempts to incorporate handles for diversification can further increase monomer instability. [Bandlish, B. K.; Brown, J. N.; Timberlake, J. W.; Trefonas, L. M. J. Org. Chem. 1973, 1973, 1102.] Thus, traditional monomers used in ROMP cannot be simply modified to instill polymer degradability.

Recently, Jeffrey and coworkers reported a novel aza-[4+3] cycloaddition to afford bicyclic compound 3a from furan and hydroxamic ester 2a (Scheme 1A). [Jeffrey, C. S.; Barnes, K. L.; Eickhoff, J. A.; Carson, C. R. J. Amer. Chem. Soc. 2011, 133, 7688.] Calculations of the ring strain of similar frameworks suggest 3a has a ring strain comparable to trans-cyclooctene, which has favorable kinetics of polymerization using ROMP. [Walker et al., 2009; Howell, J.; Goddard, J. D.; Tam, W. Tetrahedron 2009, 65(23), 4562.] Successful ring-opening cross metathesis on architecturally analogous oxybicyclo[3.2.1.]oct-6-en-3-ones had also been reported. [Wright, D. L.; Usher, L. C.; Estrella-Jimenez, M. Org. Lett. 2001, 3(26), 4275; M. D. Mihovilovic, B. Groetzl, W. Kandioller, R. Snajdrova, A. Muskotal, D. A. Bianchi, P. Stanetty Adv. Synth. Catal. 2006, 348, 463] Furthermore, upon ring-opening, a N-alkoxy-1,3-oxazin-4-one motif would be revealed, a framework that should be both acid and base labile (Scheme 1B). [Cardillio, G.; Hashem, M. A.; Tomasini, C. J. Chem. Soc. Perkin Trans 1 1990, 1487; Bandini, E.; Martelli, G.; Spunta, G.; Bongini, A.; Panunzio, M. Synlett 1999, 11, 1735.]

SUMMARY OF THE INVENTION

The present invention provides functionalized degradable ROMP (ring-opening metathesis) polymers and methods, starting monomers and synthetic monomeric and polymeric intermediates for preparation of such functionalized polymers. More specifically, monomers having a bicyclic oxazinone core structure have been found to be substrates for ROMP polymerization. ROMP polymers prepared from these monomers have been found to be both acid and base labile. Additionally, this core monomer can be chemically modified at a site distal to the polymerizable moieties and bridgehead carbons. Thus, without destabilizing the heterocyclic monomer, the properties of the resulting materials can be tailored.

More specifically the invention relates to functionalized monomers of formula I:

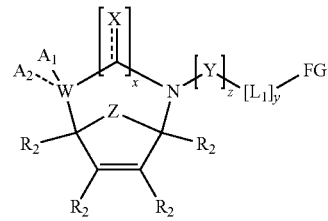

and salts thereof
where:

X is =O, =S, —N($R_1$)—, —C($R_2$)$_2$— and x is 0 or 1 to show the absence or presence of X;

Y is —N$R_1$, —O—, —S—, —C($R_2$)$_2$—, and z is 0 or 1 to show the absence of presence of Y;

Z is >C($R_2$)$_2$, >N$R_1$, —O—, —S—, —SO—, or —SO$_2$—;

W is tetravalent carbon or trivalent nitrogen, where if W is N, then $A_2$ is not present;

$A_1$ and $A_2$ are independently hydrogen, halogen, alkyl, arylalkyl, alkoxy, acyl, heterocyclyl, aryl or heteroaryl, $A_1$ and $A_2$ together form a 5-6-member ring which optionally has one or two heteroatoms or one or both of $A_1$ and $A_2$ are independently -[$L_2$]$_{y2}$-FG1;

FG and FG1 are independently functional groups;

$L_1$ and $L_2$ are independently optional divalent linking moieties, where y and y2 are 0 or 1 to show the absence of presence of $L_1$ or $L_2$, respectively;

each $R_1$ is independently hydrogen, alkyl or aryl;

each $R_2$ is independently hydrogen, halogen, alkyl, arylalkyl, alkoxy, acyl, or aryl; and wherein $A_1$, $A_2$, $R_1$ and $R_2$ groups are optionally substituted with one or more alkyl, alkoxy, acyl, amine, hydroxyl or halogen.

More specifically the invention relates to functionalized monomers of formulas IIA-C:

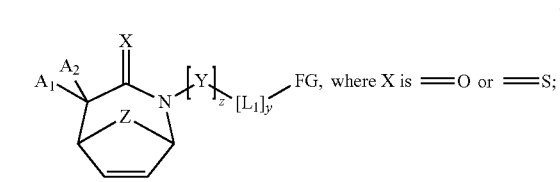

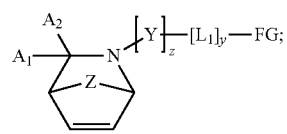

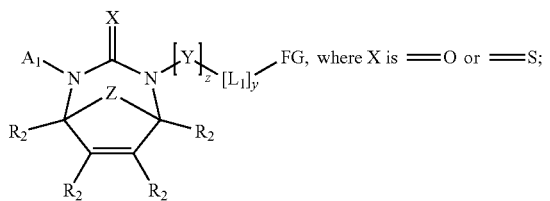

IIC where other variable are as defined above.

In specific embodiments, monomers also include multiply-functionalized monomers IID-IIF:

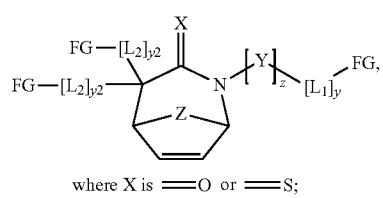

IID

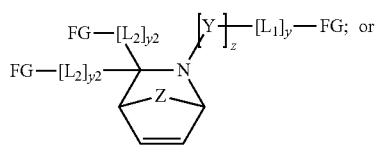

IIE

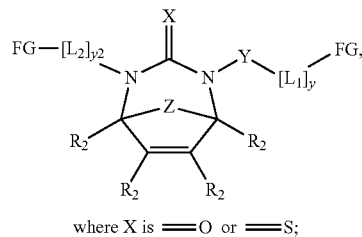

IIF where other variables are as defined above.

The invention also relates to degradable ROMP polymers and polymers wherein at least one monomer of the polymer is a monomer of formula I, or formulas IIA-F. The invention relates to homopolymers having one monomer of formula I or formulas IIA-F or copolymers which may be random copolymers or block copolymers comprising one or more monomers of formula I, or formulas IIA-IIF, in optionally combination with other appropriate bicyclic olefin monomers, but particularly in combination with monomers of formula III:

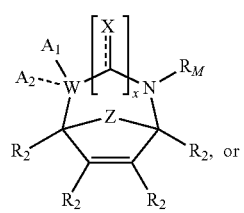

formulas IIIA-IIIC

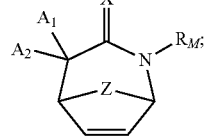

IIIA

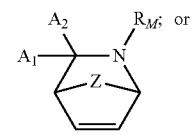

IIIB

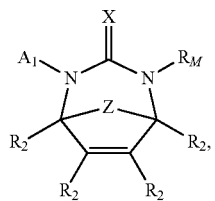

IIIC where X is =O, or =S;

where $A_1$, $A_2$, X, and Z are as defined for formula I and $R_M$ is unsubstituted alkyl, unsubstituted arylalkyl, unsubstituted alkoxyl, unsubstituted arylalkoxy, unsubstituted alkylthio ($R_{alkyl}$—S—), or unsubstituted arylakylthio ($R_{arylalkyl}$—S—). In specific embodiments, $R_M$ is benzyl or benzyloxy (—O-Bn). Certain monomers of formula III, where X and Z are both —O— and $A_1$ and $A_2$ are H, methyl, ethyl, t-butyl, chlorine, p-Cl-phenyl, and $A_1$ and $A_2$ together for a cyclohexyl group are disclosed in Jeffrey et al. 2011. The monomers of formula III may be employed, for example, as spacing monomers in polymers of this invention containing one or more monomers of formula I.

In specific embodiments, polymers and copolymers include those in which all of the variables X, W, Z and x are the same throughout the polymer. In specific embodiments, polymers and copolymers include those in which all of the variables X, W, Z, $R_2$, $A_1$ and $A_2$ and x are the same throughout the polymer.

In specific embodiments, this invention provides monomers of formula III where X is —O— or —S— and Z is >C($R_2$)$_2$, >N$R_1$, or —S—. In specific embodiments, this invention provides monomers of formula III where X is —S— and Z is >C($R_2$)$_2$, —N$R_1$—, —O— or —S—. More specifically, in these embodiments, $R_M$ is benzyl or benzyloxy.

The invention also relates to degradable functionalized ROMP polymers of formula, IX, X and XI:

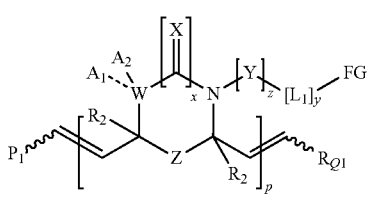

IX

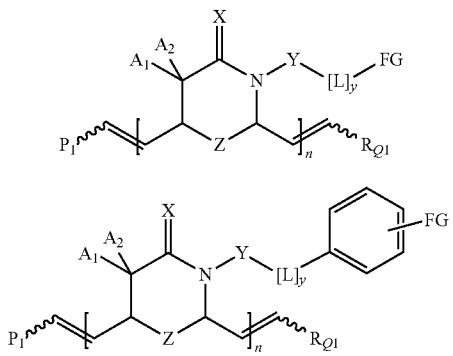

where variables are as defined above and $P_1$ and $R_{Q1}$ are polymer end groups. $P_1$ derives from the carbene of the ROMP initiator or catalyst used in the polymerization reaction. $R_{Q1}$ derives from the quenching agent employed in the ROMP polymerization. Art-known methods for varying $R_{Q1}$ are described herein below. Art-known methods for varying $P_1$ and a new method for varying $P_1$ are described herein below. In specific embodiments of formula XI, y is 1 and L is —CH$_2$—.

The invention additionally provides degradable polymers which exhibit glass transition temperatures greater than 75° C., greater than 90° C. and preferably greater than or equal to 100° C. In specific embodiments, degradable polymers with high glass temperatures are those of formula X. In more specific embodiments, degradable polymers with high glass temperatures are those of formula X, where X, Y and Z are all oxygen and more specifically those where X, Y and Z are oxygen and -[L]$_y$-FG is benzyl.

The also invention relates to a method for preparing a degradable ROMP polymer which comprises contacting a bicyclic monomer of formula I or II with a ROMP polymerization catalyst under conditions in which polymerization occurs. In specific embodiments, the polymerization catalyst is a Grubbs second generation catalyst, as is known in the art. In another embodiment, the polymerization catalyst is a hexacoordinate Ru or Os ROMP catalyst.

In a specific embodiment, the ROMP catalyst has formula VA:

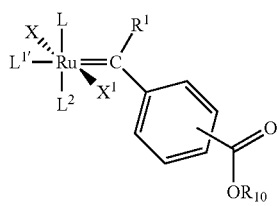

where L, L$^{1'}$, L$^2$, are neutral electron donor ligands or N-heterocyclic carbine ligands, X and X$^1$ are anionic ligands and R$^1$ is hydrogen or a substituents as generally described in U.S. Pat. No. 6,759,537, which is incorporated by reference herein in its entirety for the definitions of these groups, and —COOR$_{10}$ is an active ester group and specifically R$_{10}$ is an N-hydroxysuccinimidyl (NHS) or sulfo-NHS ester.

In a specific embodiment, the polymerization is carried out in an oxygenated solvent, and more specifically the solvent is THF. Additional useful oxygenated solvents include, isopropanol, acetone, dimethoxy ethane, and dioxanes. In a specific embodiment, the polymerization is carried out in dichloromethane solvent, but this embodiment is not preferred. In a specific embodiment, the polymerization is carried out at room temperature or below. In a specific embodiment, the bicyclic monomer is contacted with the catalyst in oxygenated solvent at a temperature of −15-0° C. and the mixture is allowed to return to room temperature during reaction.

Other aspects and embodiments of the invention will be apparent on review of the following non-limiting detailed description and non-limiting examples.

BRIEF DESCRIPTION OF THE DRAWINGS

FIG. 1A illustrates ligand attachment via a cleavable linker and copolymerization with a sacrificial monomer.

DETAILED DESCRIPTION OF THE INVENTION

Figure 1A:
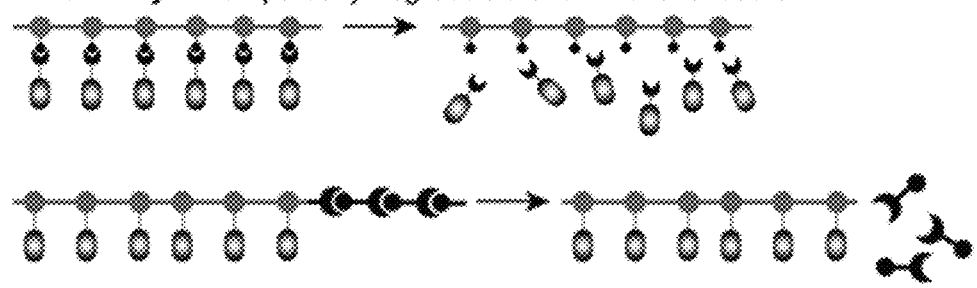
FIGS. 1A and B illustrate strategies to synthesize functionalizable and degradable ROMP polymers.

Polymers synthesized by the ring-opening metathesis polymerization (ROMP) are utilized across many disciplines. Their ubiquity can be attributed to the high functional group tolerance of the polymerization catalyst and its ability to effect living polymerization reactions, which allows polymers synthesized by ROMP to be tai-tailored for specific needs. Despite this versatility, it has been difficult to use ROMP to generate degradable polymers.

The present invention is based in part on the finding that a heterobicyclic olefin containing an oxazinone core is amenable to ROMP under certain conditions with certain ROMP catalysts and that the homopolymers produced are degradable under either acidic or basic conditions. Additionally, a general route to functionalize the degradable polymers is provided here. In a specific embodiment, functionalization by a copper-catalyzed [3+2] azide-alkyne cycloaddition is demonstrated.

More specifically the invention relates to functionalized monomers of formula I:

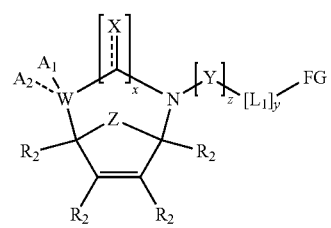

and salts thereof
where:
X is =O, =S, —N($R_1$)—, —C($R_2$)$_2$— and x is 0 or 1 to show the absence or presence of X;
Y is —N$R_1$, —O—, —S—, —C($R_2$)$_2$—, and z is 0 or 1 to show the absence of presence of Y;
Z is >C($R_2$)$_2$, >N$R_1$, —O—, —S—, —SO—, or —SO$_2$—;
W is tetravalent carbon or trivalent nitrogen, where if W is N, then $A_2$ is not present;
$A_1$ and $A_2$ are independently hydrogen, halogen, alkyl, arylalkyl, alkoxy, acyl, heterocyclyl, aryl or heteroaryl, $A_1$ and $A_2$ together form a 5-6-member ring which optionally has one or two heteroatoms or one or both of $A_1$ and $A_2$ are independently -[$L_2$]$_{y2}$-FG1;
FG and FG1 are independently functional groups;
$L_1$ and $L_2$ are independently optional divalent linking moieties, where y and y2 are 0 or 1 to show the absence of presence of $L_1$ or $L_2$, respectively;
each $R_1$ is independently hydrogen, alkyl or aryl;
each $R_2$ is independently hydrogen, halogen, alkyl, arylalkyl, alkoxy, acyl, or aryl; and
wherein $A_1$, $A_2$, $R_1$ and $R_2$ groups are optionally substituted with one or more alkyl, alkoxy, acyl, amine, hydroxyl or halogen.

In specific embodiments of formula I:
A. x is zero;
  x is zero and W is carbon;
  x is zero and W is nitrogen;
  x is 1, X is =O or =S and W is carbon;
  x is 1, X is =O or =S and W is nitrogen;
  x is 1, X is >C$R_2$ and W is carbon;
  x is 1, X is >C$R_2$ and W is nitrogen; or
  x is 1, X is >N$R_1$ and W is carbon;
B. Z is >C($R_2$)$_2$, or >N$R_1$, and
  x is zero;
  x is zero and W is carbon;
  x is zero and W is nitrogen;
  x is 1, X is =O or =S and W is carbon;
  x is 1, X is =O or =S and W is nitrogen;
  x is 1, X is >C$R_2$ and W is carbon;
  x is 1, X is >C$R_2$ and W is nitrogen; or
  x is 1, X is >N$R_1$ and W is carbon;
C. Z is —O—, or —S—, and
  x is zero;
  x is zero and W is carbon;
  x is zero and W is nitrogen;
  x is 1, X is =O or =S and W is carbon;
  x is 1, X is =O or =S and W is nitrogen;
  x is 1, X is >C$R_2$ and W is carbon;
  x is 1, X is >C$R_2$ and W is nitrogen; or
  x is 1, X is >N$R_1$ and W is carbon; or
D. Z is SO—, or —SO$_2$— and
  x is zero;
  x is zero and W is carbon;
  x is zero and W is nitrogen;
  x is 1, X is =O or =S and W is carbon;
  x is 1, X is =O or =S and W is nitrogen;
  x is 1, X is >C$R_2$ and W is carbon;
  x is 1, X is >C$R_2$ and W is nitrogen; or
  x is 1, X is >N$R_1$ and W is carbon.

More specifically the invention provides functionalized monomers of formula I:

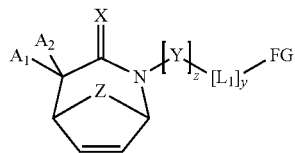

and salts thereof
where:
X is O or S;
Y is N$R_1$, O, S or Y is absent, where y is 0 or 1 to show absence or presence of L1;
Z is >C($R_2$)$_2$, >N$R_1$, O or S;
$A_1$ and $A_2$ are independently hydrogen, halogen, alkyl, arylalkyl, alkoxy, acyl, heterocyclyl, aryl or heteroaryl, or $A_1$ and $A_2$ together form a 5-6-member ring which optionally has one or two heteroatoms;
FG is a functional group;
L1 is an optional divalent linking moiety, where y is 1 or 0 to show presence or absence of L1;
$R_1$ is hydrogen, alkyl or aryl;
$R_2$ is hydrogen, halogen, alkyl, arylalkyl, alkoxy, acyl, or aryl; and
wherein $A_1$, $A_2$, $R_1$ and $R_2$ groups are optionally substituted with one or more alkyl, alkoxy, acyl, amine, hydroxyl or halogen (particularly F).

In specific embodiments, Z is O. In specific embodiments, X is O. In specific embodiments, both of X and Z are O. In specific embodiments, Y is O. In specific embodiments, Y is N$R_1$. In specific embodiments, both of X and Z are O and Y is O. In specific embodiments, both of X and Z are O and Y is N$R_1$.

In specific embodiments one of Z or X is S. In specific embodiments, Z is C($R_2$)$_2$. In specific embodiments, Z is N$R_1$.

In specific embodiments, $A_1$ and $A_2$ are both alkyl groups. In specific embodiments, $A_1$ and $A_2$ are both C1-C3 alkyl groups. In specific embodiments, both of $A_1$ and $A_2$ are halogens. In specific embodiments, one of $A_1$ and $A_2$ is a halogen. In specific embodiments, both of $A_1$ and $A_2$ are halogens. In specific embodiments, one of $A_1$ and $A_2$ is a halogenated phenyl. In a specific embodiment, $A_1$ and $A_2$ together form a cyclohexyl ring.

FG1 and FG2 independently take all the values of FG as described herein.

$L_1$ and $L_2$ independently take all the values of L or $L_1$ as described herein.

In specific embodiments, FG is a chemical or biochemical group other than H or an unsubstituted phenyl ring. In specific embodiments, FG is an optionally substituted aryl group other than an optionally substituted phenyl group.

In specific embodiments, FG is a reactive functional group, particularly where the monomer is employed as a starting material or intermediate for synthesis of functionalized polymers. FG can be a latent reactive group which is a reactive functional group that does not interfere with polymerization of the monomer in the ROMP reaction and does not itself react with other groups on the growing polymer or any monomer present, but will allow for subsequent functionalization of the polymer end group. Latent reactive groups include protected reactive groups which are protected with protecting groups suitable for use under ROMP polymerization conditions.

In other specific embodiments, FG is the ultimate function group of the product polymer, which is not typically intended to carry a reactive or latent reactive group, which can be various chemical species including among others, biochemical species, such as, amino acid groups, peptide groups, mono-, di-, oligo- or polysaccharide groups, and nucleic acid groups; tags, reporters or labels, such as fluorescent groups, isotopic labels, radiolabels; and ligands, such as biotin groups.

In other specific embodiments, FG is selected from natural products or analogs thereof, metal chelators (such as nitrilotriacetic acid), fluorescent probes (such as an amide derived from BODIPY FL EDA which is 4,4-difluoro-5,7-dimethyl-4-bora-3a,4a-diaza-s-indacene-3-propionyl ethylenediamine).

In another specific embodiment FG is a solid support. In such cases, the linker moiety L is present (y is 1) and is of sufficient length to not detrimentally affect ROMP polymerization. Exemplary solid supports are described in more detail below.

In another specific embodiment, FG is an optionally substituted alkyl, alkenyl or aryl group (other than a unsubstituted C1-C3 alkyl group or an unsubstituted phenyl or benzyl group) wherein substituents include one or more halogens, particularly fluorines; alkoxy groups; hydroxyl groups; amine groups ($—N(R_4)_2$) and quaternary ammonium groups ($—N(R_4)_3^+$) and salts thereof; carboxylate groups ($—COO—$) and salts thereof, carboxylic acid groups and ester groups ($—COOR_4$), and/or sulfonic acid and sulfonate groups ($—SO_3R_4$), wherein $R_4$ is an alkyl, alkenyl or aryl group which in turn is optionally substituted with one or more halogens, particularly fluorines, C1-C3 alkyl groups, C1-C3 alkoxy groups, hydroxyl groups, amino groups ($—NH_2$) or protonated amino groups ($—NH_3^+$) or salts thereof, $—COH$, $—COOH$, $—COO^-$ (or salts thereof), $—SO_3H$, $—SO_3^-$ (or salts thereof). FG alkyl and alkenyl groups include straight-chain and branched as well as cyclic groups. In specific embodiments, FG alkyl and alkenyl groups have 1-20 carbon atoms. In specific embodiments, FG alkyl and alkenyl groups are substituted with an amine group ($—N(R_4)_2$ or quaternary ammonium group ($—N(R_4)_3^+$) and salt thereof; a carboxylate group ($—COO—$) or salt thereof, or a sulfonate group ($—SO_3^-$) or salts thereof. In specific embodiments, FG aryl groups are phenyl, biphenyl, naphthyl or pyrenyl groups. In specific embodiments, FG aryl groups, including phenyl, biphenyl, naphthyl or pyrenyl groups, are substituted with one or more halogens. In specific embodiments, FG aryl groups, including phenyl, biphenyl, naphthyl or pyrenyl groups, are substituted with an amine group ($—N(R_4)_2$ or quaternary ammonium group ($—N(R_4)_3^+$) and salt thereof; a carboxylate group ($—COO—$) or salt thereof, or a sulfonate group ($—SO_3^-$) or salt thereof.

In specific embodiments, FG is selected from a halogen, a silyl group, a silyl ether, a sulfonate, an amine, $—N_3$, an azide, a tosyl group, an aryl, an alkynyl, an alkenyl, an arylalkyl, an alkylaryl, a triazolyl, an epoxide group, $—OH$, $—COOH$, an activated ester group, a thioester group, a phosphinothioester group, an acid halide group, a malemide group, HS—, an acyl azide group, a hydroxylamine group, an aldehyde or ketone group, a urea group, a disulfide group, a diol group, a dithiol, $—CO—CH=CH_2$, $—NH—CO—CH=CH$, a hydrazine, a hydrazone, an acyl sulfonamide, a boronic acid, cyano, isocyanide, isocyanate, isothiocyanate, phosphoric acid esters (mono-, di-, and tri-esters), a phosphite, a phosphine, a, phosphoranes, an iminophosphorane, a guanadinium, an acyl nitrites, a phenol group, an aryl halide group, a heterocyclic or a heteroaryl group.

In specific embodiments, FG is selected from a halogen, $—OSO_2R_5$, an amine ($—N(R_6)_2$), $—N_3$, a tosyl group, an aryl, an alkynyl, an alkenyl, an arylalkyl, an alkylaryl, a triazolyl, an epoxide group, $—OH$, $—COOH$, an activated ester group, a thioester group, a phosphinothioester group, an acid halide group, a malemide group, HS—, an acyl azide group, a hydroxylamine group, an aldehyde or ketone ($—COR_7$), a urea ($—N(R_7)_2—CO—N(R_7)_2$; a disulfide ($—S—SR_7$), a diol group, a dithiol, $—CO—CH=CH_2$, $—NH—CO—CH=CH$, a hydrazine, a hydrazone, an acyl sulfonamide, a boronic acid, isocyanate, isothiocyanate, phosphoric acid esters (mono-, di-, and tri-esters), phosphites, phosphines, phosphates, phosphoranes, iminophosphoranes, guanadinium, silyl ($Si(R_{10})_3$), silyl ether [$Si(R_{10})_2(OR_7)$, $Si(R_{10})(OR_{17})_2$, $Si(OR_{17})_3$], acyl nitrites, a phenol group, an aryl halide group, and indolyl groups, wherein $R_5$ is fluorine, alkyl, aryl, halogenated alkyl, or halogenated aryl; each $R_6$ is hydrogen, alkyl or aryl or both $R_6$ together form a 5- or 6-member heterocyclic or heteroaryl ring; each $R_7$ is hydrogen, alkyl, alkenyl, alkynyl, aryl, each of which is optionally substituted with one or more halogens, alkyl, alkoxy, aryl, acyl, amine, or hydroxyl;

and each $R_{10}$ is a halogen, hydrogen, alkyl, alkenyl, alkynyl, aryl, heteroaryl or heterocyclic, each of which is optionally substituted with one or more halogens, alkyl, alkoxy, aryl, acyl, amine, or hydroxyl In specific embodiments, FG is a halogen, an alkyl halide, a hydroxyalkyl, an amine-substituted alkyl, an alkynyl, alkenyl, an activated ester group, a fluorescent label, a mono-, di-, oligo- or polysaccharide.

In specific embodiments, FG is an alkyl, alkenyl or aryl group optionally substituted with one or more halogens; alkoxy groups; hydroxyl groups; amine groups ($—N(R_4)_2$) and quaternary ammonium groups ($—N(R_4)_3^+$) and salts thereof; carboxylate groups ($—COO—$) and salts thereof, carboxylic acid groups and ester groups ($—COOR_4$), and/or sulfonic acid and sulfonate groups ($—SO_3R_4$), wherein $R_4$ is an alkyl, alkenyl or aryl group which in turn is optionally substituted with one or more halogens, C1-C3 alkyl groups, C1-C3 alkoxy groups, hydroxyl groups, amino groups ($—NH_2$) or protonated amino groups ($—NH_3^+$) or salts thereof, $—COH$, $—COOH$, $—COO^-$ (or salts thereof), $—SO_3H$, $—SO_3^-$ (or salts thereof).

In specific embodiments, FG is a halogenated aryl group, a substituted phenyl group, a substituted benzyl group, an amino acid, peptide or protein.

In a specific embodiment, y is 1 and L is a divalent linking moiety which has formula:

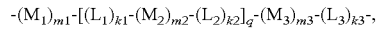

where:

m1, m2, m3, k1, k2, k3 are 0 or 1 and at least one of k1, k2, or k3 is 1;

q is 0 or an integer from 1-10, inclusive, preferably 1-5, inclusive;

each $M_1$, $M_2$ and $M_3$ is independently selected from $—O—$, $—S—$, $—CO—$, $—CS—$, $—NR_1—$, $—OOC—$, $—COO—$, $—COS—$, $—CSO—$, $—S—S—$, $—CO—NR_1—$, $—NR_1—CO—$, $—SO_2—$, $—OCO—NR_1—$, $—NR_1—COO—$, $—NR_1—CO—NR_1—$, $—NR_1—CS—NR_1—$; $—CR_2(OH)—CR_2(OH)—$; and each $L_1$, $L_2$ and $L_3$ is independently selected from alkylene, cycloalkylene, heterocyclene, arylene or heteroarylene, wherein one or more atoms of these groups are optionally substituted with one or more alkyl, alkoxy, acyl, amine, hydroxyl or halogen (particularly fluorine).

In specific embodiments, L is an alkylene, —(CH$_2$)$_a$—, where a is 1-12 and which is optionally substituted with one or more fluorines, or hydroxyl groups. More specifically a is 1-8 and yet more specifically a is 1-3. More specifically the alkylene moiety is unsubstituted. In additional specific embodiments, Y is O. In additional specific embodiments, FG is a halogen, particularly Cl, Br and I. In additional specific embodiments, FG is —N$_3$. In additional specific embodiments, FG is a —CH—C≡CH group. In additional specific embodiments, FG is an activated ester.

In specific embodiments, L is —(CH$_2$)$_a$-arylene-, where a is 1-12 and which is optionally substituted with one or more fluorines, alkyl groups or hydroxyl groups. More specifically, a is 1-6 and arylene is phenyl, biphenyl, naphthyl or pyrenyl groups. More specifically, a is 1, 2 or 3. In additional specific embodiments, Y is O. In additional specific embodiments, FG is a halogen, particularly Cl, Br and I.

In specific embodiments, L is —(CH$_2$)$_a$-heterocyclene-, where a is 1-12 and which is optionally substituted with one or more fluorines, alkyl groups or hydroxyl groups. More specifically, a is 1-6 and the divalent heterocyclene group has a 5- or 6-member ring having 1-3 heteroatoms. More specifically a is 1, 2 or 3. In additional specific embodiments, Y is O. More specifically the heterocyclene group is a 1,2,3-triazolylene:

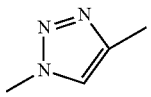

In a specific embodiment, L is:

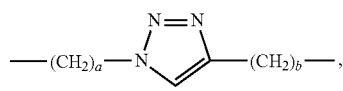

where a and b are 1-12, 1-6 or 1-3, and more specifically a is 6 and b is 1.

In specific embodiments, y is 0 and no L is present, in this case a functional group, often an unreactive functional group is directly bonded to the N—Y— moiety.

More specifically, FG is an amino acid, peptide, mono-, di-, oligo- or polysaccharide, a purine or pyrimidine, a nucleoside, or a nucleotide.

In specific embodiments, FG is a halogen (particularly Cl, Br and I), —OSO$_2$R$_5$, an amine (—N(R$_6$)$_2$), —N$_3$, a tosyl group, an alkynyl, an alkenyl, a triazolyl, an epoxide group, —OH, —COOH, an activated ester group, a thioester group, a phosphinothioester group, an acid halide group (—COX$_1$, where X is halide), a malemide group, thiol, an acyl azide group, a hydroxylamine group, an aldehyde group (—COH), a ketone (—COR$_7$, a diol group, a dithiol, —CO—CH═CH$_2$, —NH—CO—CH═CH, a hydrazine, a hydrazone, an acyl sulfonamide, a boronic acid, an isocyanate, an isothiocyanate, phosphoric acid esters (mono-, di-, and tri-esters), phosphites, acyl nitrites, phenol groups, aryl halide groups, and indolyl groups, wherein R$_5$ is fluorine, alkyl, aryl, halogenated alkyl, or halogenated aryl; each R$_6$ is hydrogen, alkyl or aryl or both R$_6$ together with the atom to which they are attached form a 5- or 6-member heterocyclic or heteroaryl ring; R$_7$ is alkyl or aryl, both of which are optionally substituted with one or more halogens, particularly fluorines, and wherein when feasibly such groups are optionally substituted with one or more alkyl, alkoxy, acyl, amine, hydroxyl or halogen (particularly F) groups which do not interfere with the re-reaction(s) of the FG group.

An activated ester group refers to a carboxylic acid ester which is more reactive than an alkyl ester (e.g., a methyl ester) in reactions in which the carbonyl moiety is an electrophilic center. In specific embodiments, activated esters are —CO—OR$^A$ groups where R$^A$ is a nitro-substituted, or a halogenated phenyl group, particularly those having 2-5 halogens, including, for example, pentafluorophenyl and 2,4,6-triclorophenyl, and 4-nitrophenyl, where R$^A$ is a-ON(R$_6$)$_2$ group, a —O—NR$_6$—CO—R$_6$ group or a —O—N(COR$_6$)—COR$_6$, where each R$^6$ is an optionally substituted alkyl or aryl, or where the two R$_6$ groups together form an optionally substituted 5-8 member heterocyclic ring having one or more heteroatoms or —CO— groups or both in the ring, or where R$^A$ is a heterocyclyl or heteroaryl group, particularly those having 5- or 6-member rings, and particularly those heterocyclic and heteroaryl groups having one or two nitrogens and optionally having one oxygen or optionally having one or two —CO— groups in the ring. Activated esters include NHS esters (N-hydroxysuccinimide esters) or sulfo NHS esters (N-hydroxysulfosuccinimide esters), imidoester group, such as methylimidate salts.

In a specific embodiment, the invention relates to functionalized monomers of formula II:

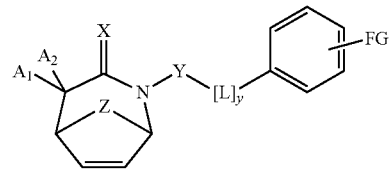

where X, Y and Z, A$_1$, A$_2$ and most generally L, y and FG are as defined above and more specifically L, if present, is an alkylene, —(CH$_2$)$_a$—, where a is 1-12 and which is optionally substituted with one or more fluorines or hydroxyl groups. More specifically a is 1, 2 or 3. More specifically a is 1. More specifically the alkylene moiety is unsubstituted. In specific embodiments, FG is a halogen, particularly Cl, Br or I. In specific embodiments, Z is O. In specific embodiments, X is O. In specific embodiments, both of X and Z are O. In specific embodiments, Y is O. In specific embodiments, Y is NR$_1$. In specific embodiments, both of X and Z are O and Y is O. In specific embodiments, both of X and Z are O and Y is NR$_1$. In specific embodiments, A$_1$ and A$_2$ are both alkyl groups. In specific embodiments, A$_1$ and A$_2$ are both C1-C3 alkyl groups. In specific embodiments, one or both of A$_1$ and A$_2$ are halogens.

The invention also relates to degradable ROMP polymers wherein at least one monomer of the polymer is a monomer of formula I or formula II. The invention relates to homopolymers having one monomer of formulas I or copolymers which may be block copolymers comprising one or more monomers of formulas I or II in optionally combination with other appropriate bicyclic olefin monomers, but particularly in combination with monomers of formula III:

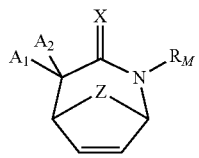

where $A_1$, $A_2$, X, and Z are as defined for formula I and $R_M$ is unsubstituted alkyl, unsubstituted arylalkyl, unsubstituted alkoxyl, unsubstituted arylalkoxy, unsubstituted alkylthio ($R_{alkyl}$—S—), or unsubstituted arylakylthio ($R_{arylalkyl}$—S—). In specific embodiments, $R_M$ is benzyl or benzyloxy (—O-Bn). Certain monomers of formula III, where X and Z are both O and $A_1$ and $A_2$ are H, methyl, ethyl, t-butyl, chlorine, p-Cl-phenyl, and $A_1$ and $A_2$ together for a cyclohexyl group are disclosed in Jeffrey et al. 2011. The monomers of formula III may be employed, for example, as spacing monomers in polymers of this invention containing one or more monomers of formula I or formula ii.

In specific embodiments, this invention provides monomers of formula III where X is O or S and Z is C($R_2$)$_2$, N$R_1$, or S. In specific embodiments, this invention provides monomers of formula III where X is S and Z is C($R_2$)$_2$, N$R_1$, O or S. More specifically, in these embodiments, $R_M$ is benzyl or benzyloxy.

Y is N$R_1$, O, S or a single bond;
Z is C($R_2$)$_2$, N$R_1$, O or S;
The invention also relates to degradable functionalized ROMP polymers of formula X and XI:

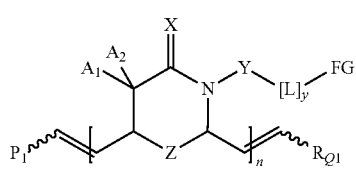

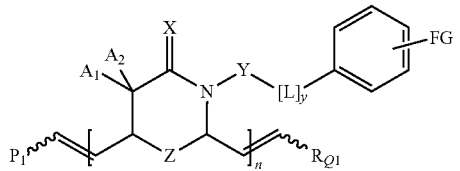

where X, Y and Z, $A_1$, $A_2$ and most generally L, y and FG are as defined above, $P_1$ and $R_{Q1}$ are polymer end groups. $P_1$ derives from the carbene of the ROMP initiator or catalyst used in the polymerization reaction. $R_{Q1}$ derives from the quenching agent employed in the ROMP polymerization. Art-known methods for varying $R_{Q1}$ are described herein below. Art-known methods for varying $P_1$ and a new method for varying $P_1$ are described herein below. In specific embodiments of formula XI, y is 1 and L is —CH$_2$—.

The invention specifically relates to copolymers of schematic formulas XII, XIII or XIIIA:

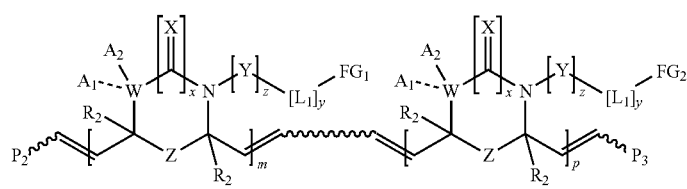

XII

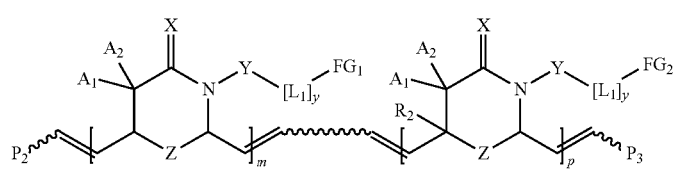

XIIA

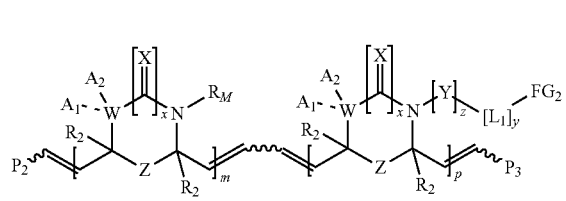

XIII

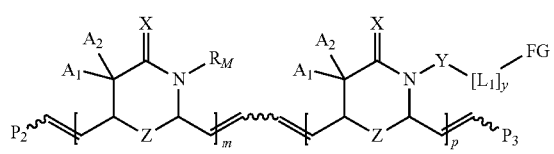

XIIIA

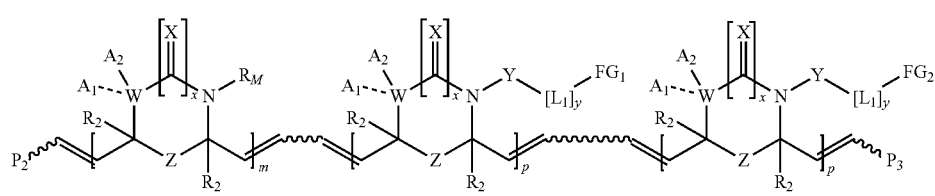

XIV

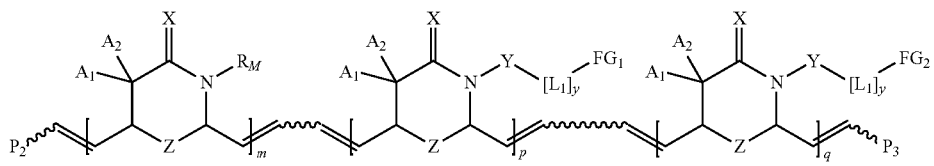

XIVA where variables are as defined for formulas I, and III, $FG_1$ and $FG_2$ represent one or more different FG groups (i.e., the one or more $FG_1$ groups are different from the one or more $FG_2$ groups);

m+p=n or m+p+q=n which is the average number of repeating units in the polymer and n, m, p and q are not zero; and $P_2$ and $P_3$ are end groups which can arise from the catalyst ($P_1$) or the capping agent ($R_{Q1}$). $A_1$ and $A_2$ group in different monomers may be the same or different. $P_2$ and $P_3$ may be the same or different and may be functionalized as described herein below.

Co-polymers include block copolymers and random co-polymers.

In specific embodiments of formula XII or XIII, m/p can range from 100 to 0.01, from 50 to 0.05 or form 10 to 0.1. In more specific embodiments of formula XII or XIII, m/p can range from 2 to 0.5, or from 1.5 to 0.75. In specific embodiment of formula XIIIA, p/g can range from 100 to 0.01, from 50 to 0.05 or form 10 to 0.1. In more specific embodiments of formula XIIIA, p/q can range from 2 to 0.5, or from 1.5 to 0.75. In specific embodiments of formula XIIIA, m/(p+q) can range from 100 to 0.01, from 50 to 0.05 or form 10 to 0.1. In more specific embodiments of formula XII or XIII, m/p can range from 2 to 0.5, or from 1.5 to 0.75. In specific embodiments of formulas XII and XIIIA, the $R_M$ monomer may be present a small number of monomers in the polymer, for example 1-10. In a specific embodiment, the $R_M$ monomer may be located at a terminus of the polymer. In specific embodiments, the $R_M$ monomer may be the predominant monomer in the polymer representing 80% to 99% of the monomers on the polymer.

In a specific embodiment, copolymers can be prepared employing a selected mixture of different monomers of formulas I and/or II and optionally of formula III in ROMP polymerization to achieve selected copolymer composition.

The number "n" is the average number of repeating units in the polymer. In specific embodiments, n is the experimentally determined degree of polymerization (DP). In specific embodiments, n is estimated as the ratio of the initial monomer concentration ($[M]_0$) to the concentration of the ROMP initiator or catalyst [CAT]. In specific embodiments, n is 1-1000 or 2-1000. In other embodiments, n is 4-1000, or 4-500, or 4-200, or 4-100 or 4-50. In specific embodiments, n is 10-30 or n is 10-50. In specific embodiments, n is 50-500 or n is 50-100. In copolymers herein n is the total number of repeating units of all different monomers.

In specific embodiments for the polymers, Z is O. In specific embodiments for the polymers, X is O. In specific embodiments for the polymers, both of X and Z are O. In specific embodiments for the polymers, Y is O. In specific embodiments for the polymers, Y is $NR_1$. In specific embodiments for the polymers, both of X and Z are O and Y is O. In specific embodiments for the polymers, both of X and Z are O and Y is $NR_1$. In specific embodiments for the polymers, $A_1$ and $A_2$ are both alkyl groups. In specific embodiment for the polymers s, $A_1$ and $A_2$ are both C1-C3 alkyl groups. In specific embodiments for the polymers, both of $A_1$ and $A_2$ are halogens. In specific embodiments for the polymers, $P_1$ is an optionally substituted phenyl group, where substituents include one or more halogens, alkyl groups, alkoxy groups, hydroxyl groups, or activated ester groups. In a specific embodiment for the poly-polymers, $P_1$ is a phenyl groups substituted with an activated ester group which more specifically is an N-hydroxysuccinimidyl (NHS) ester.

In specific embodiments of the polymers, FG is a halogen, an azide group, an activated ester group or an alkynyl group. In other specific embodiments, FG is a mono-, di-, oligo- or polysaccharide. In other specific embodiments for the polymers, FG is an optionally substituted alkyl group having 1-20 carbon atoms or an aryl group including phenyl, biphenyl, naphthyl or pyrenyl groups. In specific embodiments for the polymers, FG is alkyl and alkenyl groups substituted with an amine group (—$N(R_4)_2$ or quaternary ammonium group (—$N(R_4)_3^+$) and salt thereof, a carboxylate group (—COO—) or salt thereof, or a sulfonate group (—$SO_3^-$) or salt thereof. In specific embodiments for the polymers, FG aryl groups, including phenyl, biphenyl, naphthyl or pyrenyl groups, are substituted with an amine group (—$N(R_4)_2$ or quaternary ammonium group (—$N(R_4)_3^+$) and salt thereof; a carboxylate group (—COO—) or salt thereof, or a sulfonate group (—$SO_3^-$) or salt thereof.

The also invention relates to a method for preparing a degradable ROMP polymer which comprises contacting a bicyclic monomer of formula I or II with a ROMP polymerization catalyst under conditions in which polymerization occurs. In specific embodiments, the polymerization catalyst is a Grubbs second generation catalyst, as is known in the art. In another embodiment, the polymerization catalyst is a hexacoordinate Ru or Os ROMP catalyst. More specifically, the catalyst is a hexacoordinate Ru or Os ROMP catalysts has at least one N-heterocyclic carbine ligand. In a specific embodiment, the N-heterocyclic carbine ligand is a ligand of formula:

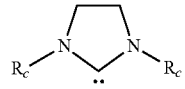

where: Rc is an optionally substituted aryl group, where substituents include one or more alkyl groups, or halogens. In a specific embodiment, Rc is an alkyl substituted phenyl group and more specifically is a mesityl group. In specific embodiments, the ROMP catalyst carries one or two neutral electron donor ligands, and two anionic ligands. Specific neutral electron donor ligands are N-containing heteroaryl groups which are optionally substituted with one or more halogens. More specific neutral electron donor ligands are optionally substituted pyridine groups, and particularly halogen-substituted pyridine groups. In specific embodiments, the anionic ligands are halides and in particular are chlorides (Cl⁻). In specific embodiments, the ROMP catalyst is a Ru catalyst.

In a specific embodiment, the catalyst has formula VA:

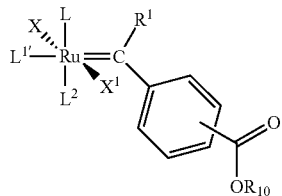

where L, $L^{1'}$, $L^2$, are neutral electron donor ligands or N-heterocyclic carbine ligands, X and $X^1$ are anionic ligands and $R^1$ is hydrogen or a substituents as generally described in U.S. Pat. No. 6,759,537, which is incorporated by reference herein in its entirety for the definitions of these groups, and —COOR$_{10}$ is an active ester group and specifically $R_{10}$ is an N-hydroxysuccinimidyl (NHS) or sulfo-NHS ester.

In a specific embodiment, the polymerization is carried out in an oxygenated solvent, and more specifically the solvent is THF. Additional useful oxygenated solvents include, isopropanol, acetone, dimethyoxy ethane, and dioxanes. In a specific embodiment, the polymerization is carried out in dichloromethane solvent, but this embodiment is not preferred. In a specific embodiment, the polymerization is carried out at room temperature or below. In a specific embodiment, the bicyclic monomer is contacted with the catalyst in oxygenated solvent at a temperature of −15-0° C. and the mixture is allowed to return to room temperature during reaction.

In a specific embodiment, the invention provides ROMP catalyst of formula V which can be reacted to attach a fluorescent label or other reporter to the polymers of this invention.

Recently, a novel aza-[4+3] cycloaddition product 3a from reaction of furan and hydroxamic ester 2a (Scheme 1A) was reported. (Jeffrey et al. 2011). This bicyclic compound appeared to be a good candidate for ROMP polymerization and upon ring-opening, a N-alkoxy-1,3-oxazin-4-one motif would be revealed which could be both acid and base labile (Scheme 1B). However, polymerization of this monomer would generate highly oxygenated polymer products that could facilitate backbiting [W. Buchowicz, M. N. Holerca, V. Percec Macromolecules 2001, 34, 3842; D. M. Haigh, A. M. Kenwright, E. Khosravi Macromolecules 2005, 38, 7571], which would result in an increase in PDI and a decrease in the number averaged molecular weight ($M_n$) of the products as the polymerization progressed.

In initial experiments, it was demonstrated that compound 3a could be polymerized using a Grubbs 2nd generation catalyst in dichloromethane at room temperature to give polymer 4a. However, the polydispersity index of the polymers produced was broad, which could be attributed to backbiting during ROMP (see The Examples). One strategy to mitigate backbiting is to raise the reaction temperature to disrupt dative bonds. [E.-H. Kang, I. S. Lee, T.-L. Choi J. Am. Chem. Soc. 2011, 133, 11904; G. Cardillo, M. A. Hashem, C. Tomasini J. Chem. Soc., Perkin Trans. 1 1990, 1487] However, in this system, an increase in temperature did not reduce backbiting (Table 1, entry 2). It was found that use of THF as a solvent improved backbiting. THF is a solvent system that can compete with the polymer for catalyst coordination. In additional, catalyst 5, was employed, which has superior polymerization kinetics to those obtained with 8. [E.-H. Kang, I. S. Lee, T.-L. Choi J. Am. Chem. Soc. 2011, 133, 11904; J. A. Love, J. P. Morgan, T. M. Trnka, R. H. Grubbs Angew. Chem. Int. Ed. 2002, 41, 4035] These changes afforded dramatic improvements in the polymerization. Stable $M_n$ or PDI values were observed even at long reaction times (Table 1, entry 5-6). In addition, the $M_n$ increased proportionally to monomer to catalyst loading (Table 1, entry 3-7), and the degree of polymerization was found to be in good agreement with monomer conversion. Thus, structures such as compound 3a undergo ROMP to afford polymer scaffolds with a repeating oxazinane backbone.

SCHEME 1

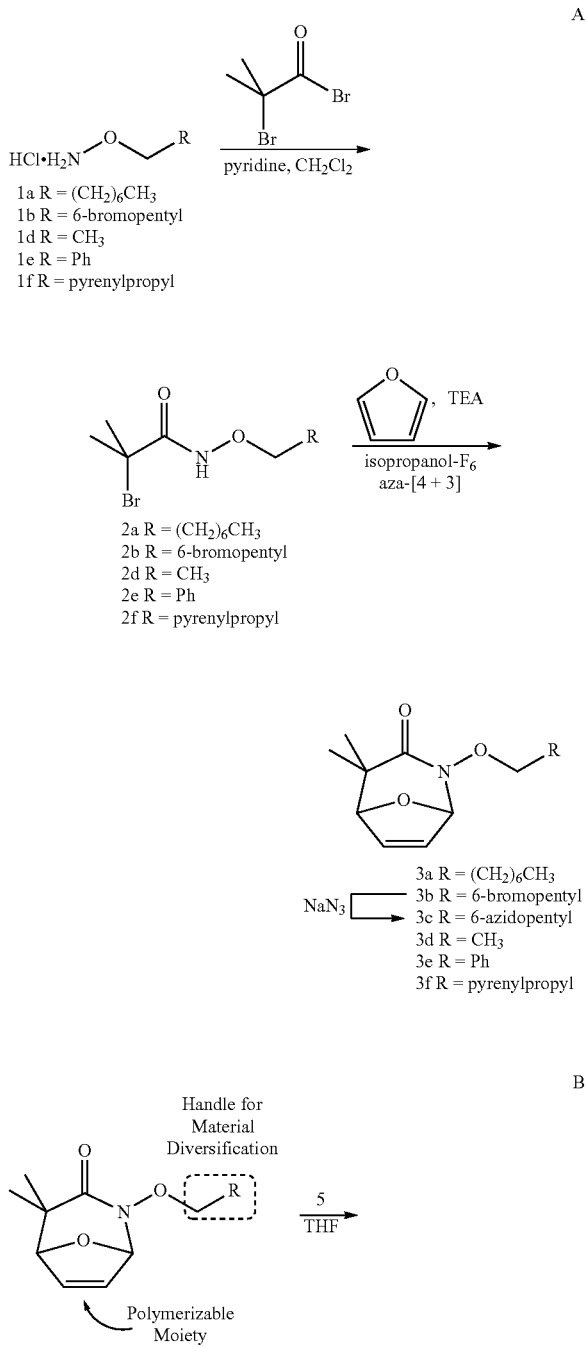

-continued

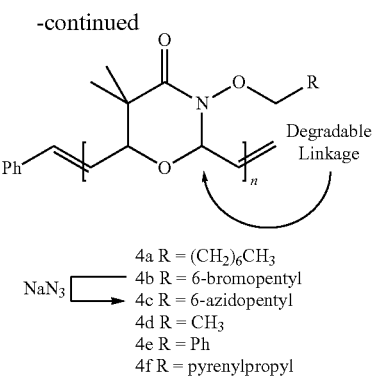

4a R = (CH₂)₆CH₃
4b R = 6-bromopentyl
NaN₃ → 4c R = 6-azidopentyl
4d R = CH₃
4e R = Ph
4f R = pyrenylpropyl

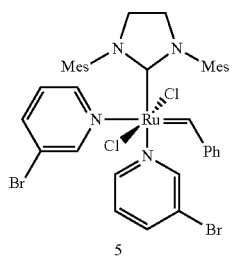

5 cific conditions. At pH values less than 1.0, degradation is fast with complete decomposition occurring in under an hour.

The acid-catalyzed backbone decomposition also occurs readily at pH 2.5, with 66% of the polymer mass lost in 6 h. At pH values up to 4.5, slower degradation occurs. Polymer backbone cleavage was also observed under basic conditions. Thus, either acid or base can promote degradation of polymers with an N-alkoxy-oxazinone backbone. The oxazinone polymers represent a unique class of backbone degradable ROMP polymer that are stable at neutral pH values, but labile in either acidic or basic environments.

Further studies were conducted to characterize the degradation products. Because obtaining the necessary quantities of specific polymer degradation fragments for characterization is difficult, a model was employed. Specifically, compound 3e was subjected to a ring-opening cross metathesis reaction with 1-hexene to yield heterocycle 6. When the product was exposed to an acidic methanol solution, ring-cleavage occurred to afford hydroxamic acid 9. [G. Cardillo et al. 1990] This mode of reactivity would promote fragmentation of the polyoxazinone backbone causing polymer degradation. It is expected that hydroxamic ester 9 undergoes further hydrolysis to a β-hydroxy carboxylic acid (10), however this species was not isolated. (Scheme 5, Example 3).

The term degradation is used herein to refer to cleavage of the backbone of the ROMP polymer by treatment with acid or

TABLE 1

Polymerization of monomer 3a using ROMP

| entry | [M]₀/[l] | catalyst | solvent[a] | temp (° C.) | time (h) | conversion (%)[b] | Yield[c,d] | $M_n^{theo}$ (g/mol) | $M_n^{NMR[e]}$ (g/mol) | $M_n^{GPC[f]}$ (g/mol) | PDI[f] ($M_n/M_w$) |
|---|---|---|---|---|---|---|---|---|---|---|---|
| 1 | 100/1 | G11 | CHCl₃ | 20 | 4 | 84 | 72 | 23600 | 103800 | 63200 | 2.8 |
| 2 | 100/1 | G11 | CHCl₃ | 45 | 18 | 81[g] | 49 | 22800 | 26000 | 24900 | 2.6 |
| 3 | 25/1 | 5 | THF | 20 | 1 | 87 | 57 | 6100 | 6500 | 9300 | 1.4 |
| 4 | 50/1 | 5 | THF | 20 | 1 | 85 | 71 | 12000 | 12500 | 16300 | 1.4 |
| 5 | 100/1 | 5 | THF | 20 | 1 | 81 | 80 | 23100 | 22000 | 21600 | 1.4 |
| 6 | 100/1 | 5 | THF | 20 | 18 | 81 | 85 | 23100 | 22100 | 22300 | 1.4 |
| 7 | 200/1 | 5 | THF | 20 | 1 | 73 | 83 | 41000 | 45200 | 50300 | 1.5 |

[a][M]₀ = 1M.
[b]based off of ¹H-NMR integrations of monomer olefin signals to polymer olefin signals.
[c]isolated.
[d]theoretical yield based off of monomer conversion.
[e]based off ¹H-NMR integrations of polymers olefin signals and polymers chain-end phenyl signals.
[f]calibrated with polystyrene standards, eluted in THF.
[g]additional 10-15% cyclic dimer.

Figure 1B:
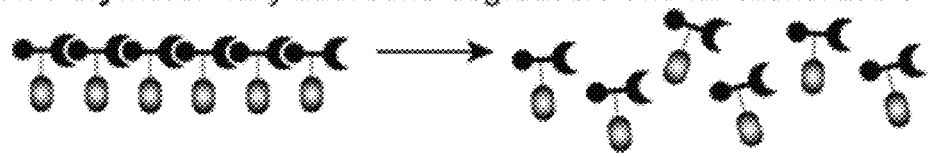
FIG. 1B illustrates fully backbone degradable and functionalizable polymers, as exemplified herein by homopolymerization of a functionalizable, heterocyclic oxazinone.

In experiments detailed herein below, it was demonstrated that the N-alkoxy-oxazinone motif of a ROMP polymer, such as 4a, is susceptible to ring-opening and degradation with both acid and base. These studies demonstrated that the oxazinone backbone of 4a can lead to complete polymer degradation, as illustrated in FIG. 1B.

Figure 2A:
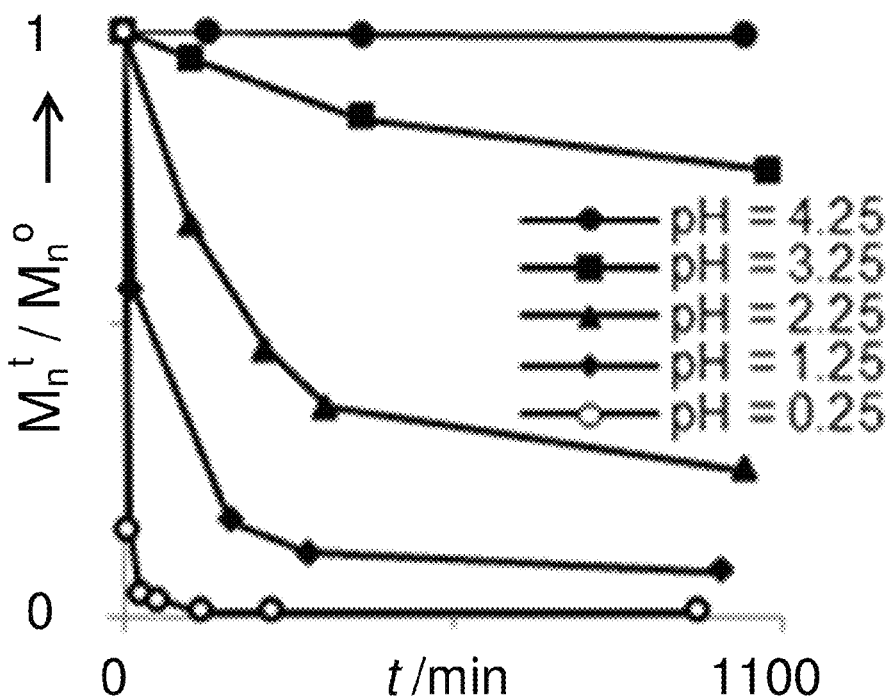
FIGS. 2A and B provide graphs showing the degradation profile of polymer 4e under acidic (FIG. 2A) and basic (FIG. 2B) conditions. Mn°=18,500 g/mol.
Figure 2B:
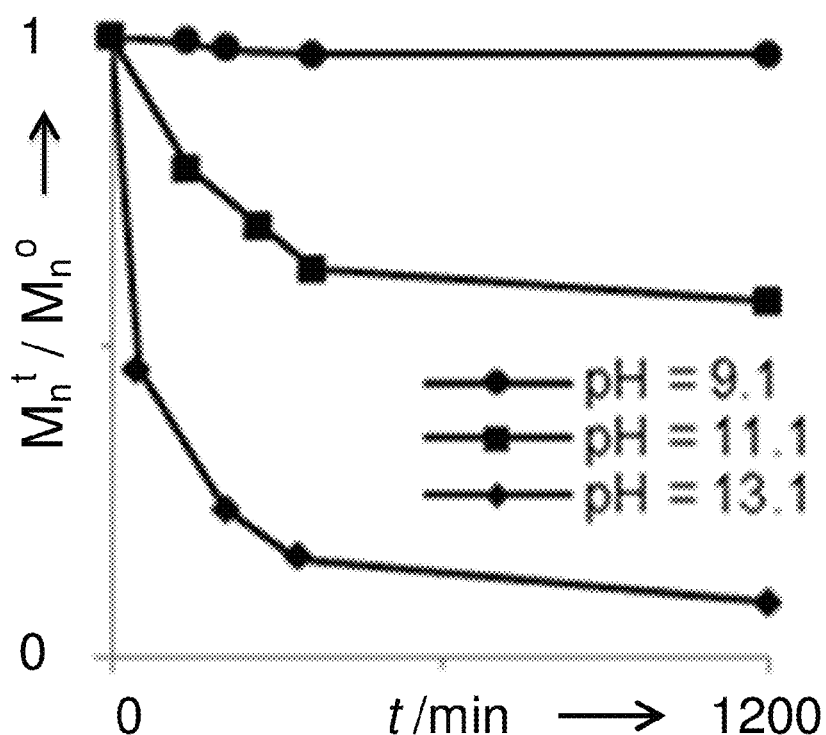

Small molecule oxazinones have been used to generate β-hydroxy carboxylic acids, [G. Cardillo, M. A. Hashem, C. Tomasini J. Chem. Soc., Perkin Trans. 1 1990, 1487; E. Bandini, G. Martelli, G. Spunta, A. Bongini, M. Panunzio Synlett 1999, 1999, 1735] but the conditions used for ring opening have been harsh (i.e. extreme pH and high temperatures). Milder conditions were assessed. Utilizing gel permeation chromatography (GPC), the decomposition of polymer 4e was monitored under a range of acidic and basic conditions at room temperature (FIGS. 2A and 2B). No appreciable breakdown occurred at pH values between 4.6 and 9.1 over 48 hours. This observation indicates that the oxazinane backbone is able to withstand exposure to a wide range of conditions, thereby facilitating polymer handling or modification. Still, the polymers are vulnerable to degradation under specific conditions. Degradation in general includes any measurable level of degradation, including partial degradation as well as substantial degradation. In a specific embodiment, polymer degradation is assessed as a change in polymer molecular weight, for example as assessed in FIGS. 2A and B herein (see The Examples).

A modular way to impart new functionality is through judicious choice of starting hydroxylamine (Scheme 1A) to functionalize the bicyclic monomer (see compounds of Formulas I and II). This strategy is attractive because it allows diversification at a site distal from the monomer's core, reducing the chance of destabilizing the compound upon functionalization. Moreover, no changes to the synthetic route are required (Scheme 1).

The following discussion focuses on certain exemplary functionalized monomers and polymers, it will be appreciated that the description applies to a variety of functionalized monomers and polymers as described above with respect to reactive functional groups in formulas I and II.

By using hydroxylamine 1b, a bromine-functionalized monomer was prepared as shown in Scheme 1A, 3b. Monomer 3b allows functionalized polymers to be created in a grafting-to or grafting-through strategy. Monomers can be functionalized or ROMP polymers can be functionalized.

Monomer 3b can be polymerized to make polymer 4b using ROMP polymerization conditions. Monomer 3b can be elaborated through nucleophilic displacement of its alkyl bromide functionality. Displacement with sodium azide affords the azide 3c (Scheme 2B). Analogously, polymer 4b can be reacted with sodium azide to generate the azide-substituted polymer 4c (Scheme 2A).

Substituents can be added to influence a polymer's bioactivity or its mechanical or optical properties. To illustrate the generality of the methods herein, polymers were generated from O-octyl hydroxylamine (1a), O-ethyl hydroxylamine (1d) or O-benzyl hydroxylamine (1e) starting materials. In this way, polymers 4a, 4d and 4e with modified hydrocarbon functionality were generated. Additionally, pyrene conjugated hydroxylamine it was leveraged to assemble polymer 4f (Scheme 1B), which could serve as an optical sensor.

Scheme 2A/B. Exemplary Methods to Create Degradable and Functionalized Polymers by ROMP.

A

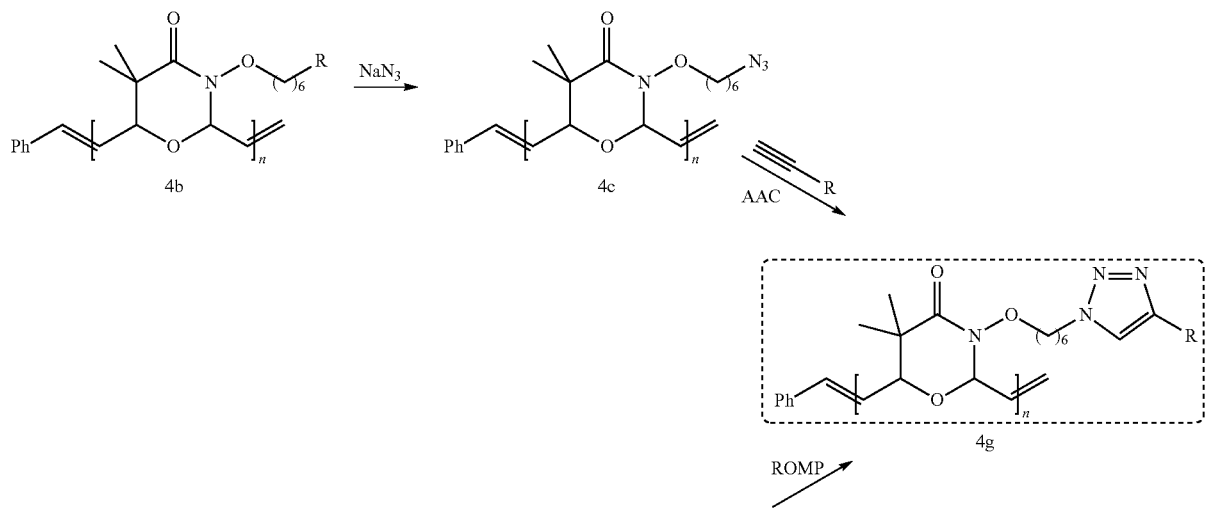

B

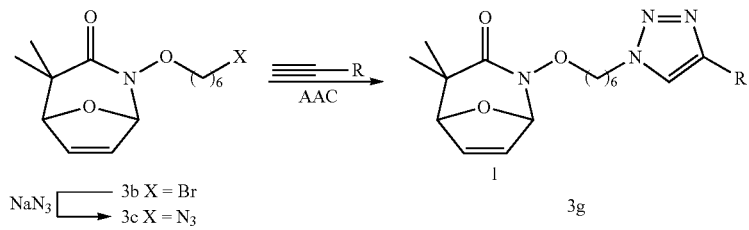

Using an azide-alkyne [3+2] cycloaddition (AAC), a ligand bearing an alkyne can be conjugated to the polymer. [Kolb, H. C.; Finn, M. G.; Sharpless, K. B. Angew. Chem. Int. Ed. 2001, 40, 2004.] Because of the exquisite chemoselectivity of this Click chemistry reaction, it is widely used to introduce new functionality into polymers. [H. C. Kolb, M. G. Finn, K. B. Sharpless Angew. Chem., Int. Ed. 2001, 40, 2004; C. W. Tornoe, C. Christensen, M. Meldal J. Org. Chem. 2002, 67, 3057; W. H. Binder, C. Kluger Macromolecules 2004, 37, 9321; R. K. Iha, K. L. Wooley, A. M. Nystrom, D. J. Burke, M. J. Kade, C. J. Hawker Chem. Rev. 2009, 109, 5620; U. Mansfeld, C. Pietsch, R. Hoogenboom, C. R. Becer, U. S. Schubert Polym. Chem. 2010, 1, 1560.

It was found, however, that azido monomer 3c was incompatible with Grubbs' type metathesis catalysts. [J. A. Johnson, Y.-Y. Lu, A. O. Burts, T.-H. Lim, M. G. Finn, J. T. Koberstein, N. J. Turro, D. A. Tirrell, R. H. Grubbs J. Am. Chem. Soc. 2011, 133, 559; B. C. Boren, S, Narayan, L. K. Rasmussen, L. Zhang, H. Zhao, Z. Lin, G. Jia, V. V. Fokin J. Am. Chem. Soc. 2008, 130, 8923] However, corresponding triazole monomers prepared using Click chemistry were able to undergo ROMP using these ruthenium carbenes.

Figure 3:
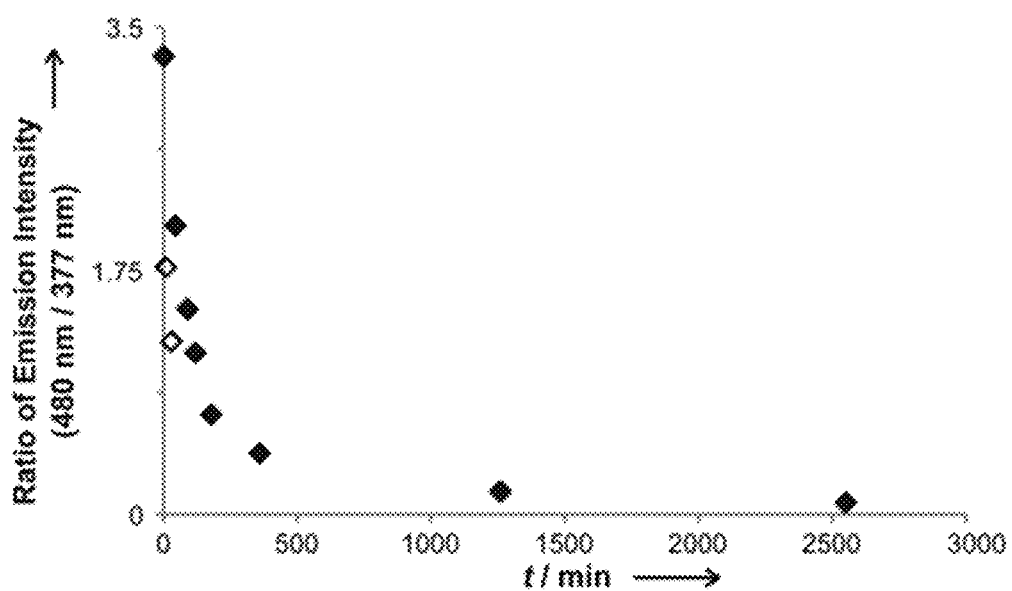
FIG. 3 is a graph showing the degradation of 4f which was monitored by comparing the ratio of polymeric pyrene exiplex emission (λmax=480 nm) to monomeric pyrene emission (λmax=377 nm). λex=250 nm, pH=0.25 (3:1 THF:MeOH). Unfilled diamonds denote data from times when the polymer was only partially dissolved; full dissolution occurred within 40 min.

This substance exhibited a red-shifted fluorescence spectrum indicative of pyrene exciplex emission. [I. A. Gorodetskaya, A. A. Gorodetsky, E. V. Vinogradova, R. H. Grubbs Macromolecules 2009, 42, 2895] When polymer 4f undergoes hydrolytic degradation, a monomeric pyrene derivative is released from the backbone thereby diminishing exciplex emission. Changes in the ratio of fluorescence intensity of monomeric pyrene ($\lambda$max=377 nm) and polymeric exciplex ($\lambda$max=480 nm) over time report on the extent of backbone hydrolysis. This spectral change was followed to reveal that exposure to acidic conditions for 3 hours resulted in approximately 80% polymer degradation (FIG. 3).

The polymers of this invention can be diversified to explore various rheological properties of these materials for commodity plastics development or made bioactive for biological applications.

For example, compound 3c was conjugated to 1-propargyl-$\alpha$-D-mannose-2,3,4,6-tetraacetate using a copper-catalyzed AAC to afford monomer 6 (Scheme 4). The functionalized monomer that resulted could undergo ROMP to afford polymer 7. The acetate groups were hydrolyzed to produce mannose-substituted polymer 8. The water solubility of this polymer facilitated analysis of its degradation in aqueous solution. At pH values similar to those that led to the loss of polymer 4e, decomposition of 8 was observed.

Scheme 4: Synthesis of Glycopolymers 7 and 8.

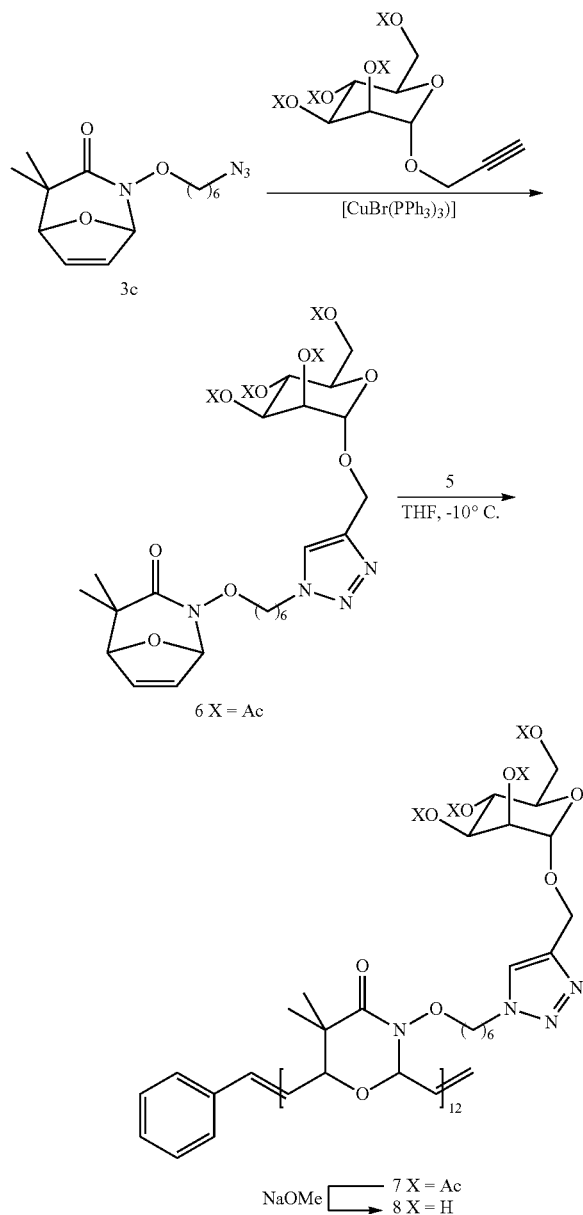

Diverse degradable ROMP polymers can be prepared using either scheme of Scheme 2. Preparation of such diversely functionalized polymers can be used to explore various rheological properties of these materials for commodity plastics development or can be made bioactive for biological applications. The azide-functionalized monomer 3c or the azide-functionalized polymer 4c or the analogs of these azide-functionalized species of formulas I and II can be employed to react with any terminal alkyne (HC≡≡—R) to conjugate the —R species to the monomer or polymer via a triazole linker as illustrated and thereby generate a polymer functionalized with —R. More generally, in examples of the grafting-to approach, as illustrated in Scheme 2A, Br is a ROMP compatible reactive functional group. Polymerization of a Br-functionalized monomer provides a Br-functionalized polymer which can in turn be reacted to replace the Br functionality with desired alternative functionality. Halogenated monomers are examples of monomers carrying ROMP-compatible functionality. Halogenated ROMP polymers are thus also useful intermediate functionalized polymers which can be useful for generating additional functionalized polymers. An additional useful intermediate functionalized polymer is an azide-functionalized polymer (formed by reaction of a Br-functionalized polymer, rather than by polymerization of the azide-functionalized monomer) which can be reacted via an ACC reaction with alkynes which can carry further functionalization if desired to vary the ultimate functionalization on the polymer.

More generally, in examples of the grafting-through approach, as illustrated in Scheme 2B, a functionalized monomer, such as an azide-functionalized monomer is reacted to alter its functionality to a ROMP-compatible functionality. The monomer carrying ROMP-compatible functionality is then polymerized to provide the desired final functionalized polymer. Analogously to azide-substituted polymers, azide-substituted monomers can be reacted with alkynes via ACC reactions to generate triazole functionalized monomers which can be polymerized by ROMP methods.

In specific embodiments, glycopolymers can be synthesized by a grafting-through approach by reaction of azide-functionalized monomer with saccharides (e.g., a mono-, di- or oligomeric saccharide, or polysaccharides) functionalized with an alkyne group, e.g. —(CH$_2$)$_a$—C≡CH, where a is an integer ranging from 1-10 and more specifically, a is 1 (propargyl group). Methods for making, saccharides derivatized with an alkyne group are well-known in the art. It will be understood that other chemical groups in the saccharides (e.g., —OH groups) may require protection (e.g. acetylation) during preparation of glycopolymers.

In other embodiments, azide-functionalized monomers of this invention can be reacted with alkenyls (in so-called Click reactions) to form triazolines.

In additional embodiments, azide-functionalized monomers or polymers of this invention can be reacted with phosphinothioesters as described in U.S. Pat. Nos. 6,972,320 and 7,256,259, and 7,317,129 and U.S. published application US 2010/0048866 to form amide bonds in a traceless Staudinger ligation. Phosphinothioesters can be prepared employing phosphinothiol reagents as also described in these references. Each of these references is incorporated by reference herein in its entirety for descriptions of such ligation reactions, methods of making azides and methods of making phosphinothioesters.

Table 4 lists several exemplary coupling schemes that can be employed to functionalize the degradable polymers of this invention. The Table lists the type of conjugation reaction and the FG that would be employed on the monomer or polymer.

TABLE 4

Exemplary Coupling Reactions For Introducing Functionality into Degradable ROMP Polymers

| conjugation type | bond formed | substituent needed on monomer/polymer |
|---|---|---|
| substitution | amine | halogen or amine (protected for polymerization) |
| azide-alkyne [3 + 2] cycloaddition | triazole | Azide, alkyne, triazole |

TABLE 4-continued

Exemplary Coupling Reactions For Introducing Functionality into Degradable ROMP Polymers

| conjugation type | bond formed | substituent needed on monomer/polymer |
|---|---|---|
| esterification | ester | alcohol, protected alcohol, carboxylic acid |
| amide formation | amide | activated ester (NHS, pentafluorophenyl, HOBt, HOAt, thioester), amine (protected for polymerization) |
| thio-ene | thioether | alkene, maleimide, thiol (protected for polymerization) |
| oxime/hydrazone | oxime/hydrazone | hydroxylamine, aldehyde, ketone, diol, dithiol, hydrazine |
| urea | urea | isocyanate, amine (protected for polymerization) |
| thiourea | thiourea | isothiocyanate, amine (protected for polymerization) |
| Cross coupling reaction | C—C bond formation | phenol derivatives, aryl halide, alkynes, alkene, organometalic species |
| Cross coupling reaction | C—C bond formation | indoles, aryl halide |

Each of the conjugations or coupling reactions listed is well-known in the art and one of ordinary skill in the art understands how to conduct such coupling reactions. Methods for introducing the indicated functionality will be apparent to one of ordinary skill in the art in view of the descriptions herein and what is well-known in the art about such reactions. In specific embodiments, FG groups are azides and alkynes. In specific embodiments, reactive FG groups are halogens, amines, sulfhydryl groups, activated esters, and carboxylates. One of ordinary skill in the art will also appreciate that amine groups, can be reacted with any one of an isothiocyanate, an acyl azide, an activated ester (e.g., NHS ester), a sulfonyl chloride, an aldehyde or glyoxal, an epoxide, an aryl halide, an imidoester, or an anhydride by art-recognized methods to form various coupling linkages. Additionally an amine group can be coupled to a carboxylate or alkylphosphate using a coupling reagent (e.g., a carbodiimide) to form an amide or phosoamide linkage. One of ordinary skill in the art will also appreciate that sulfhydryl groups, can be reacted with any one of an halo-acetyl or alkyl halides, maleimides, aziridines, acryloyls, aryl halides, thiol-disulfide exchanges reagents, (pyridyl disulfides or TNB thiols), or vinyl sulfones by art-recognized methods to form various coupling linkages. Further one of ordinary skill in the art will appreciate that hydrazides can be reacted with aldehydes to form a hydrazone linkage. A variety of such coupling reactions of reactive and latent reactive FG as listed herein are known in the art. For example, various art-known coupling reactions useful for conjugation and particularly for bioconjugation are described in Hermanson, G. T. (2008) Bioconjugation Techniques $2^{nd}$ Edition Academic Press, N.Y.

Additional useful coupling reactions, particularly for conjugating a protein, peptide or amino acid to a monomer of the invention are described in Gauthier, M. A.; Klok, H-A. (2008) Chem. Commun. 2591-2611.

Coupling reaction in which a —C—C— bond is formed are useful for coupling desired functionality to monomers of this invention. A variety of such coupling reactions are known in the art and are typically catalyzed by a metal catalysts and often involve organometallic species as reactants or intermediates. Coupling reactions include homo and cross-coupling reactions. Useful cross-coupling reactions include reactions of organo halides, particularly aryl halides, with organo tin compounds (Stille cross coupling), reaction of organohalides, particularly, aryl halides with organoboron compounds (Suzuki reaction), the reaction of olefins with organo halides, particularly aryl halides (Heck reaction). See, for example, Kosugi, M. et al. Chem. Letters 1977, 301; Milstein, D.; Stille, J. K. J. Am. Chem. Soc. 1978, 100, 3636; Miyaura, Norio; Yamada, Kinji; Suzuki, Akira (1979) Tetrahedron Letters 20 (36): 3437-3440; Miyaura, Norio; Suzuki, Akira (1979) Chem. Comm. (19): 866-867; Miyaura, Norio; Suzuki, Akira (1995) Chemical Reviews 95 (7): 2457-2483; Heck, R. F.; Nolley, Jr., J. P. (1972) J. Org. Chem. 37 (14): 2320-2322; Heck, R. F. (1982). Org. React. 27: 345-390; De Vries, Johannes G. (2001) Canadian Journal of Chemistry 79 (5-6): 1086; Miyaura, N. (ed) Cross-Coupling Reactions: A Practical Guide (219 Topics in Current Chemistry) Springer-Verlag Berlin (2002); Metal-Catalyzed Diederich F. and Stang P. Cross-Coupling Reactions (2008) John Wiley & Sons, N.Y.

An additional useful cross coupling reaction is that of phenol derivatives, e.g., pivalates of phenol, with aryl halides as is described in U.S. published application 20110077406, which is incorporated by reference herein in its entirety for its description of this type of cross coupling reaction and the functional groups which react to achieve cross coupling.

An additional useful cross-coupling reaction in which a C—N bond is formed is N-arylation of indoles with aryl halides catalyzed by transition metals, such as described in XU, H. (2009) Mini-Reviews in Organic Chemistry 6:367-377.

As demonstrated herein, ROMP can be used to synthesize a new class of degradable polymers. These polymers possess a backbone that is labile under either acidic or basic conditions. In addition, the polymers can be decorated through a modular monomer synthesis using bifunctional hydroxylamine building blocks. The process d affords functional and degradable polymers that can be used in specific applications. Polymers of this type are useful in the synthesis of new degradable plastics or resins. ROMP can be used on an industrial scale to generate new materials; therefore, the strategy described herein could be used to generate consumables with properties that complement those currently generated by ROMP. In this way, ROMP can give rise to stable species or materials that can be broken down to simple building blocks. Furthermore, degradable and functional polymers can serve as scaffolds for directed drug delivery or regenerative medicine. Additionally, these polymers may find utility as novel biomaterials as well.

Catalysts and Catalyst Functionalization

A survey of solvent and ROMP polymers was conducted with monomer 3a. It was found that neither Grubb's $1^{st}$ generation catalysts, exemplified by $RuCl_2$(=CHPh)(P(Cy)$_3$)$_2$, where Ph is phenyl and Cy is cyclohexyl, [e.g., Schwab, P., Grubbs, R. H., Ziller, J. W. (1996) J. Amer. Chem. Soc. 118(1):100-110] nor Hoveyda-Grubbs $1^{st}$ generation catalysts, where one phosphine ligand of the Grubbs $1^{st}$ generation catalyst is replaced with an isopropyl group attached to Ph (e.g., $R^u Cl_2$(=CHPh-iso-propyl) P(Cy)$_3$) [e.g., Kingsbury, J. S.; Harrity, J. P.; Bonitatebus, P. J.; Hoveyda, A. H. (1999) J. Amer. Chem. Soc. 121:791) was useful to polymerize 3a. In contrast, as described in The Examples, Grubbs $2^{nd}$ generation catalyst (Sigma-Aldrich) 20

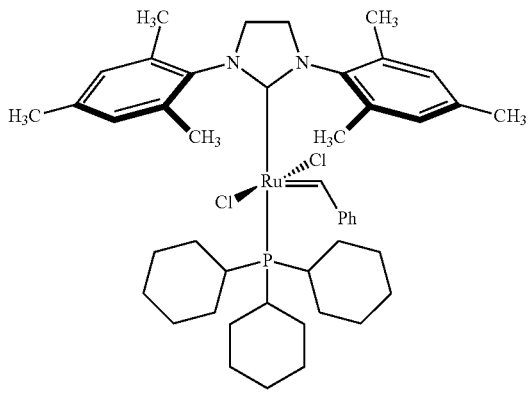

in dichloromethane at room temperature afforded polymer 4a, but with broad polydispersity index (PDI). Grubbs 2$^{nd}$ generation catalysts are described in more detail in U.S. Pat. Nos. 6,111,121 and 7,329,758, which are both incorporated by reference herein in their entirety for a description of such catalysts. Significantly improved polymerization of 3a was observed using catalyst 5 [Love, Jennifer A.; Morgan, John P.; Trnka, Tina M.; Grubbs, Robert H. (2002) Angew. Chem. Int. Edit. 41 (21): 4035-4037] in oxygenated solvents, particularly THF (tetrahydrofuran). Catalyst 5 is an example of a fast-initiation ROMP catalyst having at least one N-heterocyclic carbine ligand and no phosphine ligand, as in Formula V:

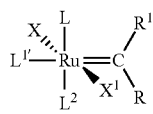

where L, L$^{1'}$, L$^2$, are neutral electron donor ligands or N-heterocyclic carbine ligands, X and X$^1$ are anionic ligands, R$^1$ is hydrogen or other substituents and R is phenyl or other substituents as generally described in U.S. Pat. No. 6,759,537, which is incorporated by reference herein in its entirety for definitions of the variables L, L$^{1'}$, L$^2$, X, X$^1$, R$^1$ and R (and other structurally variables) of such catalysts. The referenced patent also provides details on the use of such catalysts. In a specific embodiment, the N-heterocyclic carbine ligands have formulas:

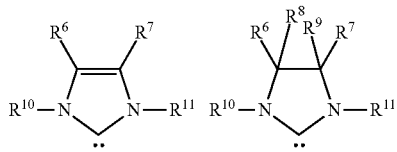

where variables R$^6$—R$^{11}$ are as defined as in U.S. Pat. No. 6,759,537. In a preferred embodiment of the present invention, the N-heterocyclic carbine ligand has formula

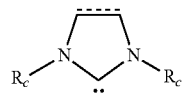

where the dashed line indicates the optional presence of a double bond in the ring (R$^6$, R$^7$ being hydrogens and R$^8$ and R$^9$, if present, being hydrogens), where each R$_c$ most generally takes any value of R$^{10}$ and R$^{11}$ of U.S. Pat. No. 6,759,537, but more specifically each R$_c$ is an optionally substituted phenyl ring, where substitution is with one or more alkyl groups and/or with one or more halogens. In a specific embodiment, R$_c$ is a mesityl or other C1-C3 alkyl substituted-phenyl ring. In a specific embodiment, the N-heterocyclic carbine is a 1,3-bis-substitued dihydroimidazole (with no ring double bond). In specific embodiments, the neutral electron donor ligands are optionally substituted N-heteroaryl groups, particularly optionally substituted pyridines, more specifically halogen-substituted pyridines, and yet more specifically 2-halo-substitued pyridines. In related embodiments, the ROMP catalysts useful in this invention is a Hoveyda-Grubbs 2$^{nd}$ generation catalyst as described in U.S. Pat. No. 6,921,735 which is incorporated by reference herein in its entirety for its description of such catalysts. Examples of these catalysts are as illustrated in formula VI:

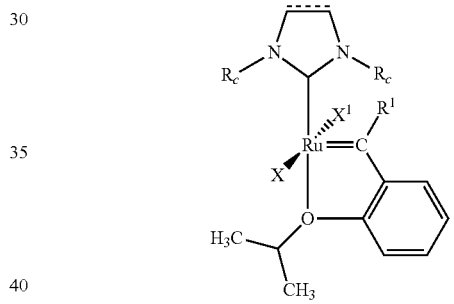

where X, X$^1$, R$_c$ and R$^1$ are as defined above and in U.S. Pat. No. 6,921,735 or 6,759,537. These catalysts have a N-heteroaryl carbene ligand, no neutral electron donor ligands and no phosphine ligands. The 2-position of the phenyl ring of the catalyst is substituted with an alkoxy group, shown as an isopropoxy group in the formula, which bonds to the Ru. In specific embodiments of this invention catalysts of formula VI have a 1,3-bis-substituted dihydroimidazole ligand and more specifically have a 1,3-bis(2, 4, 6-trimethylphenyl)dihydroimidazole ligand.

Additional useful functionalization of ROMP catalysts is described in a review article by Hilf, S.; Kilbinger, A. F. M. (2009) Nature Chemistry 1:537-546, which is incorporated by reference herein in its entirety for descriptions of additional methods of catalyst functionalization and polymer end group modification.

In specific embodiments of useful ROMP catalysts herein, X and X$^1$ are both chloride. Ruthenium catalysts are illustrated in the discussion above, but the corresponding osmium catalysts can also be employed, but are not currently preferred. ROMP catalysts useful in this invention are commercially available or can be prepared from readily available starting materials by methods that are well-known in the art, such as those provided or references in U.S. Pat. No. 6,111, 121; 7,329,758; 6,759,537 or 6,921,735.

In these metal carbene catalysts, the carbene becomes one end group (initiation end group) of the resultant polymer. The metal carbene of the catalysts is illustrated as:

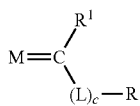

Variation of the structure of this carbene of the catalyst or initiator will allow the end group of result polymers to be varied, i.e. functionalized. For example, the carbene can be provided with a latent reactive functional group which can be used after polymerization to attach any desired end group functionality to the polymer. Latent reactive group of the catalyst refers to a reactive group that does not interfere with the reactivity of the catalyst for ROMP polymerization and does not otherwise react with the growing polymer chain or monomers presence, but which can after polymerization be reacted to add functionalization to the polymer end group. The carbene can alternatively be provided with a non-reactive functional group as described above for FG groups. Typically, only one group of R1 or R is provided with a functional group (latent or non-reactive) and only one group has been indicated as $P_1$ in the polymer formulas X and XI herein. The R functional group is optionally attached to the carbene via a linker moiety as described above for L in formulas I and II and C is 0 or 1 to indicate the absence or presence of L. Thus, $P_1$ in formulas X and XI can be R or of -L-R (note that linker L in the carbene is distinct from the L ligand in the catalyst).

U.S. Pat. No. 6,291,616 describes functionalization of a ROMP catalyst to allow for end group modification. These methods can be applied to the catalysts of this invention. Specifically, this patent discusses introduction of latent reactive groups selected from electrophilic or nucleophilic groups, where examples of electrophilic latent reactive groups include, but are not limited to, acyl sulfonamides, acyl azides, epoxides, anhydrides, esters (including activated esters such as pentafluorophenyl esters and N-hydroxysuccinimidyl esters), carboxylic acids (including activated acids such as acyl halides), halides, boronic acids, ketones, aldehydes, phosphoric acid esters (mono-, di-, and tri-esters), phosphites, acyl nitrites, alkenes, and alkynes, and the like and where examples of nucleophilic latent reactive groups include, but are not limited to, amines, hydroxyls, thiols, sulfones, acyl hydrazides, phosphites, hydrazines, oximes, isocyanates, thiocyanates, and the like.

It will be appreciate that latent reactive groups include reactive groups which are protected with protecting groups suitable for use under ROMP polymerization conditions.

In a specific embodiment, the invention provides a specific method for functionalizing catalysts useful in this invention. The method is exemplified in Scheme IX where the phenyl of the metal carbene M=CHPh is replaced with a functionalized styrene. In a specific embodiment, the styrene is functionalized to carry an activated ester (e.g., an NHS ester). More generally, the method can be used to install any desirable latent reactive group on the phenyl group of the metal carbene of the catalyst. In an alternative embodiment, the method as illustrated can be used to install any functionalized styrene where the styrene is functionalized with any non-reactive functional group. The method of Scheme IX can employ any Grubbs $2^{nd}$ generation catalyst as starting catalyst to be functionalized. Additionally, any neutral electron donor ligand can be used in place of the substituted pyridine illustrated in Scheme IX.

Functionalized catalysts of formulas XV, XVA and XVB can be prepared by the method illustrated in Scheme IX:

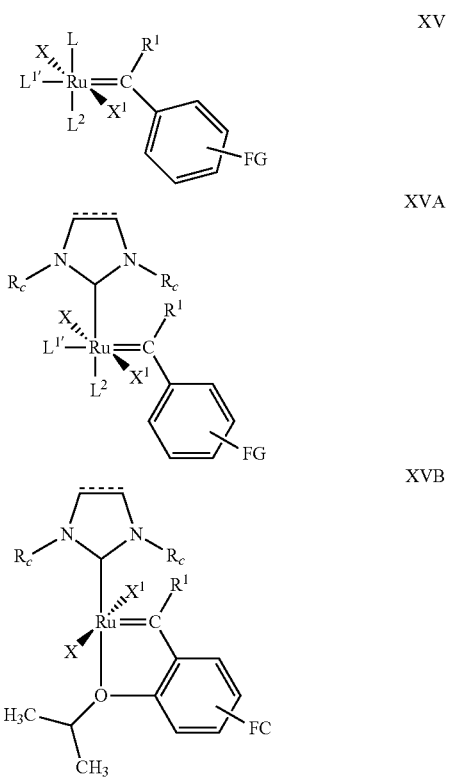

where variables are as defined above. In specific embodiments, FC is an activated ester —$COOR_{10}$. The activated ester of the functionalized catalyst can be reacted with various species to further functionalize the catalyst or more preferably to functionalize the polymer end group after the catalyst is used to polymerize the bicyclic olefin monomer. In a specific embodiment, the activated ester end group of the polymer is reacted with an amine and specifically with an amine substituted fluorophore to label the polymer.

Catalysts useful in the invention as described herein can be tethered to a solid support for example by reaction of FG groups added to the catalyst with appropriately derivatized surfaces. Weck et al. (1999) J. Amer. Chem. Soc. 121:4088 and Kong et al. (2007) Langmuir 23:6761-6765 describe attachment of ROMP catalysts to surfaces for surface initiated ROMP where the resulting polymer is bound to a surface at one end. Each of these references is incorporated by reference herein in its entirety for descriptions of surface attachment of ROMP catalysts which can be employed in the methods of this invention.

In a related method, a styrene that carries a luminescence label can be introduced into the catalyst as illustrated in Burtscher D.; Saf, R.; Sugovc, C. (2006) J. Polymer Sci. Part A: Polym. Chem. 44:6136-6145.

It will be appreciated that $R^1$ could take all the values of $P_1$ such that the end group would carry additional functionalization, however, this combination of functionalization is not currently preferred.

End-Group Functionalization with Capping Agents

The other end group of the polymer is formed from a capping or quenching agent that is added to end ROMP polymerization. In specific examples herein the capping agent used is ethyl vinyl ether. As discussed in U.S. Pat. No. 6,291,616 a capping agent has the formula:

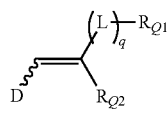

where D is an electron donating group, a group that causes an overall increase in olefin electron density when compared to ethylene. In specific embodiments D is $SR_9$, $OR_9$ or a halogen where $R_9$ can be any group that does not detrimentally affect the quenching reaction. Preferably $R_9$ is a group that makes the capping agent readily available from commercial sources or by routine synthesis. Typically $R_9$ is not hydrogen and can be an optionally substituted carbohydryl group that does not interfere with quenching, but is more typically an optionally substituted alkyl group. In specific embodiments, $R_9$ is an unsubstituted alkyl group having 1-6 carbon atoms. $R_{Q1}$ and $R_{Q2}$ are groups to be added at the end of the polymer on quenching and RQ1 is optionally attached to the capping agent via linker L, as defined for formulas I and II above, where q is 1 or 0 to indicate the presence or absence of the linker. When ethyl vinyl ether is used to quench the polymerization $R_{Q1}$ and $R_{Q2}$ are both hydrogens. Typically, only one of $R_{Q1}$ and $R_{Q2}$ carries desired functionality, thus herein $R_{Q1}$ is designated as the group carrying functionality. In specific embodiments, then $R_{Q2}$ is any group that does not detrimentally affect the quenching reaction and preferably is a group that makes the capping agent readily available from commercial sources or by routine synthesis. In specific embodiments then, $R_{Q2}$ is hydrogen or an unsubstituted C1-C3 alkyl group. In specific embodiments, $R_{Q1}$ is or carries a latent reactive group or is a nonreactive functional group that does not require further functionalization. Specific examples of capping agents useful for functionalizing the polymers of this invention are provided in U.S. Pat. No. 6,291,616.

It will be appreciated that $R_{Q2}$ could take all the values of $R_{Q1}$ such that the end group would carry additional functionalization, however, this combination of functionalization is not currently preferred.

The term latent reactive group is used in this case (for $R_{Q1}$) to describe a reactive functional group that does not interfere with the function of the capping agent in the ROMP reaction and does not itself react with other groups on the growing polymer or any monomer present, but will allow for subsequent functionalization of the polymer end group. Note that a latent reactive group can include a reactive group that is protected with a protecting agent suitable for use in a ROMP polymerization reaction. In specific embodiments, $R_{Q1}$ is attached to the capping agent by a divalent linker moiety, such as L (as described above), i.e., -L-$R_{Q1}$. In specific embodiments $R_{Q1}$ can include a latent reactive group selected from an azide, a nitro group, a disulfide, a hydrazine, a hydrazide, a hydroxylamine, an aldehyde, a ketone, an epoxide, a cyano group, an acetal, a ketal, a carbamate, a thiocyanate, an activated ester, or an activated acid. $R_{Q1}$ can be a non-reactive functional group (FG) as defined for formulas I and II. In specific embodiments, $R_{Q1}$ is a nonreactive functional group that is selected from natural products or analogs thereof, metal chelators (such as nitrilotriacetic acid), metals (such as Zn) which are attached to the capping agent by an appropriate linker moiety, a fluorescent probes or label (such as an amide derived from BODIPY FL EDA which is 4,4-difluoro-5,7-dimethyl-4-bora-3a,4α-diaza-s-indacene-3-propionyl ethylenediamine), or a solid support (such as polyethylene resins or metal surfaces, such as gold surfaces) again where the solid support is linked to the capping agent by an appropriate linking moiety.

Solid supports that can be used in this invention (FG groups and for functionalization of catalysts or capping agents) include, but are not limited to glass (including glass slides), quartz (including optical fibers), various metal surfaces such as gold with thiol monolayers, colloidal gold, semiconductors, diamond, silicon, plastic, ceramics, alum, hydroxyapatite, polyacrylamide, polyimines, polypropylene, latex, rubber, agarose, chitin, chitosan, dextran and derivatized dextrans, cellulose and derivatized cellulose (e.g., nitrocellulose, cellulose acetate), nylon, polyvinyl chloride, and polystyrene (resins, etc), artificial bone material. Solid supports can be flat or curved and can be a film, a plate, a fiber, plate wells, a wafer, a grid, a mesh, a membrane, beads or pins. Solid supports can be rigid or pliable, or the surface of a gel. Solid supports may further be composed of a plurality of solid particles, resins or beads. Solid supports may be derivatized, for example to carry amine, OH, epoxy, carboxylate or ester surfaces, which facilitates use in this invention. A variety of useful derivatized solid supports are commercially available or can be prepared by well-known techniques.

Polymerization Conditions

ROMP polymerization of this invention can be conducted in dichloromethane or more preferably in oxygenated solvents. In specific embodiments, the oxygenated solvent is THF, isopropanol, butanol, acetone, dimethoxy ethane, dioxanes, and ethers. In initial experiments with monomers such as 3a, chlorobenzene and pyridine were not useful solvents for ROMP polymerization and are thus, not currently preferred. While isopropanol is a useful solvent for the ROMP polymerizations herein, methanol and ethanol are not preferred.

The conditions of the polymerization reaction other than catalyst and solvent (e.g., temperature, time, atmosphere) will vary depending on the specific monomer and specific catalyst, and can be selected by one of ordinary skill in the art without undue experimentation. Preferably, the ROMP reaction is carried out at temperatures ranging from about −20° C. up to about 20° C. to about 30° C. (i.e., room temperature). While high temperatures may be employed, it has not been found necessary to heat the polymerization reaction above room temperature when using catalysts as exemplified herein. In typical reactions, the bicyclic olefin is contacted with the selected ROMP catalyst at temperatures below room temperature (e.g., −10° C.) and the reaction is allowed to warm to room temperature. The polymerization reactions are typically conducted under an inert atmosphere (e.g., nitrogen or argon).

Pressure is not critical, but may be varied to maintain a liquid phase reaction mixture. Reaction times can vary from several minutes to several days. Exemplary polymerization conditions are provided in The Examples.

Monomers of this invention of formulas I, II and III can be synthesized by one of ordinary skill in the art in view of descriptions herein and what is well known in the art from starting materials that are available from commercial sources or that can be made by methods well-known in the art without resort to undue experimentation. Guidance is provided herein and in references incorporated by reference herein (e.g., Jeffrey et al. 2011) for the synthesis of the illustrated monomers.

Methods exemplified in Examples 8 and 9 are employed to prepare monomers of this invention.

In a specific embodiment, monomers or polymers of the invention are functionalized with an azide group and reacted with an alkyne, often a terminal alkyne, by 1,3-dipolar cycloaddition. Alkynes useful in this invention can be prepared by methods that are well-known in the art using starting materials that are commercially available or readily available via synthetic methods that are well-known in the art.

The invention provides a method for preparing a degradable polymer of copolymer which comprises contacting a monomer of formula I with a ROMP catalyst wherein the ROMP catalyst is a Ru or Os carbene catalyst having at least one N-heterocyclic carbene ligand. In specific embodiments, the reaction is carried out in a solvent selected from halogenated solvents (for example, dichloromethane, chloroform, carbon tetrachloride, tetrachloroethane, among others.), toluene, acetonitrile, sulfur containing solvents, and/or oxygenated solvents (for example, isopropanol, acetone, dimethoxy ethane, dioxanes, among others) and any mixtures of solvents listed. It will be appreciated by one of ordinary skill in the art that the reaction can be carried out in the absence of solvent.

In specific embodiments of the method FG is selected from a halogen —$OSO_2R_5$, an amine (—$N(R_6)_2$), —$N_3$, a tosyl group, an alkynyl, an alkenyl, a triazolyl, an epoxide group, —OH, —COOH, an activated ester group, a thioester group, a phosphinothioester group, an acid halide group, a malemide group, HS—, an acyl azide group, a hydroxylamine group, an aldehyde group (—COH), a ketone (—$COR_7$), a diol group, a dithiol, —CO—CH=$CH_2$, —NH—CO—CH=CH, a hydrazine, a hydrazone, an acyl sulfonamide, a boronic acid, isocyanate, isothiocyanate, phosphoric acid esters (mono-, di-, and tri-esters), phosphites, acyl nitriles, a phenol group, an aryl halide group, and indolyl groups, wherein $R_5$ is fluorine, alkyl, aryl, halogenated alkyl, or halogenated aryl; each $R_6$ is hydrogen, alkyl or aryl or both $R_6$ together form a 5- or 6-member heterocyclic or heteroaryl ring; $R_7$ is alkyl or aryl, both of which are optionally substituted with one or more halogens, alkyl, alkoxy, acyl, amine, or hydroxyl.

In additional embodiments of the method, FG is a halogen or an activated ester group, FG is a fluorescent label, FG is a mono-, di-, oligo- or polysaccharide, or FG is an amino acid, peptide or protein.

In additional embodiments of the method, FG is an alkyl, alkenyl or aryl group substituted with one or more halogens; alkoxy groups; hydroxyl groups; amine groups (—$N(R_4)_2$) and quaternary ammonium groups (—$N(R_4)_3^+$) and salts thereof; carboxylate groups (—COO—) and salts thereof, carboxylic acid groups and ester groups (—$COOR_4$), and/or sulfonic acid and sulfonate groups (—$SO_3R_4$), wherein $R_4$ is an alkyl, alkenyl or aryl group which in turn is optionally substituted with one or more halogens, C1-C3 alkyl groups, C1-C3 alkoxy groups, hydroxyl groups, amino groups (—$NH_2$) or protonated amino groups (—$NH_3^+$) or salts thereof, —COH, —COOH, —$COO^-$ (or salts thereof), —$SO_3H$, —$SO_3^-$ (or salts thereof).

In additional embodiments of the method, FG is a halogenated aryl group, FG is a substituted phenyl group or a substituted benzyl group or FG is an amino acid, peptide or protein.

In an additional embodiment of the method for making a degradable polymer a compound of formula I wherein FG is a reactive group, such as an alkynyl group, an azide group or an activated ester, the compound is first coupled to a species which reacts with the alkynyl, azide or activated ester group to modify the FG group and the resultant modified monomer is then polymerized to form the functionalized degradable polymer. In a specific embodiment, the one or more monomers which are modified are monomers of formula I where FG is an azide group and the one or more monomers are reacted with an alkyne to modify the FG group. In a specific embodiment, the modified FG group is a non-reactive functional group, which more specifically is a mono-, di-, oligo- or polysaccharide, an amino acid, peptide or protein. In a specific embodiment FG is a monosaccharide or the modified FG is a monosaccharide.

In specific embodiments of the method, in the one or more monomers of formula I, X is O, Y is O, or a single bond; and Z is O. In specific embodiments of the method, in the one or more monomers of formula I, X is O, Y is O, or a single bond; and Z is O. In specific embodiments of the method, in the one or more monomers of formula I, X is O; Y is $NR_1$, or a single bond; and Z is O. In specific embodiments of the method, in the one or more monomers of formula I, y is 1 and L comprises an alkylene moiety, a heterocyclene moiety or both.

In a specific embodiment of the method a copolymer is prepared by contacting a mixture of different monomers of formula I with the with the ROMP catalyst. The monomers that are polymerized vary in structure and in a specific embodiment they differ in FG group.

In another embodiment, a mixture of one or more monomers of formula I and one or more monomers of formula III are polymerized to form a copolymer.

The invention provides the compounds of formula I particularly where FG is an azide group, an alkynyl group or an activated ester group.

The invention provides the compounds of formula III wherein X and Z are not both O. The invention provides compounds of formula III wherein X is S and Z is $C(R_2)_2$, $NR_1$, or S.

The invention provides a polymer or copolymer formed by ROMP polymerization of one or more compounds of formula I, formula III and mixtures thereof.

The terms alkyl or alkyl group refer to a monoradical of a straight-chain or branched saturated hydrocarbon and to cycloalkyl groups having one or more rings. Alkyl groups include straight-chain, branched and cyclic alkyl groups. Alkyl groups may include portions that are straight-chain, branched or cyclic. Unless otherwise indicated alkyl groups have 1-20 carbon atoms (C1-C20 alkyl groups) and preferred are those that contain 1-12 carbon atoms (C1-C12 alkyl groups). In specific embodiments, alkyl groups contain 1 to 3 carbon atoms (C1-C3 alkyl groups). Alkyl groups include larger alkyl groups having 8 or more carbon atoms. Cyclic alkyl groups include those having one or more rings. Cyclic alkyl groups include those which have 1, 2 or 3 rings. Cyclic alkyl groups also include those having 3-20 carbon atoms as well as those having 5-8 carbons. Cyclic alkyl groups include those having a 3-, 4-, 5-, 6-, 7-, 8-, 9- or 10-member carbon ring and particularly those having a 3-, 4-, 5-, 6-, 7-, or 8-member ring. Cycloalkyl groups also include those having linked cycloalkyl rings, such as those linked by a single bond or a methylene (e.g., bicyclohexane, or biscyclohexylmethylene). The carbon rings in cyclic alkyl groups can also carry straight-chain or branched alkyl group substituents. Cyclic alkyl groups can include bicyclic and tricyclic alkyl groups. Alkyl groups are optionally substituted with one or more non-hydrogen substituents as described herein. Exemplary alkyl groups include methyl, ethyl, n-propyl, iso-propyl, cyclopropyl, n-butyl, s-butyl, t-butyl, cyclobutyl, n-pentyl, branched-pentyl, cyclopentyl, n-hexyl, branched hexyl, cyclohexyl, adamantyl, decalinyl and norbornyl all of which are optionally substituted. Substituted alkyl groups include fully halogenated or semi-halogenated alkyl groups, such as alkyl groups having one or more hydrogens replaced with one or more fluorine atoms, chlorine atoms, bromine atoms and/or iodine atoms. Substituted alkyl groups include fully fluorinated or semi-fluorinated alkyl. Such groups are optionally substituted as described herein above.

Alkylene and cycloalkylene refers to divalent moieties derived formally from alkyl and cycloalkyl groups as described above by removal of an additional hydrogen e.g., —(CH$_2$)a-, where a is 1-20 or a 1,4-cyclhexylene.

The terms alkenyl or alkenyl group refer to a monoradical of a straight-chain, branched or cyclic hydrocarbon group (cycloalkenyl) having one or more double bonds. Alkenyl groups include straight-chain, branched and cyclic alkenyl groups. Alkenyl groups may include portions that are straight-chain, branched or cyclic. Unless otherwise indicated alkenyl groups have 2-20 carbon atoms (C2-C20 alkenyl groups) and preferred are those that contain 1-12 carbon atoms (C2-C12 alkenyl groups). In specific embodiments, alkenyl groups contain 2 to 4 carbon atoms (C2-C4 alkenyl groups). Alkenyl groups include larger alkenyl groups having 8 or more carbon atoms. Cyclic alkenyl groups include those having one or more rings. Cyclic alkenyl groups include those which have 1, 2 or 3 rings. Cyclic alkenyl groups also include those having 5-10 carbon atoms. Cyclic alkenyl groups include those having a 5-, 6-, 7-, 8-, 9- or 10-member carbon ring and particularly those having a 5-, 6-, 7-, or 8-member ring. The carbon rings in cyclic alkenyl groups can also carry straight-chain or branched alkyl group substituents. Cyclic alkenyl groups can include bicyclic and tricyclic alkenyl groups. Cycloalkenyl groups also include those having linked cycloalkenyl rings, such as those linked by a single bond or a methylene Alkenyl groups are optionally substituted with one or more non-hydrogen substituents as described herein. Exemplary alkenyl groups are those having 1 or 2 double bonds and include omega-alkenyl groups. Alkenyl groups include those having 2 to 6 carbon atoms including ethylene (vinyl), propylene, butyl ene, pentylene, and hexylene groups including all isomers thereof. Cycloalkenyl groups include, by way of example, single ring structures (monocyclic) such as cyclobutenyl, cyclopentenyl, cyclohexenyl, cyclooctenyl, cylcooctadienyl and cyclooctatrienyl as well as multiple ring structures (bicyclic, tricyclic, spiro or linked rings) all of which are optionally substituted. Substituted alkenyl groups include fully halogenated or semi-halogenated alkenyl groups, such as alkenyl groups having one or more hydrogens replaced with one or more fluorine atoms, chlorine atoms, bromine atoms and/or iodine atoms. Substituted alkenyl groups include fully fluorinated or semi-fluorinated alkenyl. Such groups are optionally substituted as described herein above.

The terms alkynyl or alkynyl group refers to a monoradical of an unsaturated straight-chain, branched or cyclic hydrocarbon having one or more triple bonds (C≡C). An alkynyl group may have portions that are straight-chain, branched and/or cyclic. Unless otherwise indicated alkynyl groups have 2 to 20 carbon atoms and more specifically contain 2-12 carbon atoms. Alkynyl groups include ethynyl, propargyl, and the like. In specific embodiments, alkynyl groups have 2-6 carbon atoms. Unless otherwise specified alkynyl groups are optionally substituted as defined herein. In specific embodiments, alkynyl groups are terminal alkynyl groups.

An alicyclic group is a group having one or more saturated or unsaturated carbon rings and optionally contains one to three heteroatoms (e.g., N, O or S) per ring. Alicyclic groups, for example, contain one or two double bonds. To satisfy valence requirement, a ring atom may be substituted as described herein. One or more carbons in an alicyclic ring can be —CO— groups. Alicyclic groups include those having 3-12 carbon atoms, 1-6, heteroatoms, and optionally replacing 1 or 2 carbon atoms with a —CO— group and optionally having 1, 2 or 3 double bonds. Alicyclic groups include those having 3-12 or 3-10 ring atoms of which up to three can be heteroatoms other than carbon. Alicyclic groups can contain one or more rings each of which is saturated or unsaturated. Alicyclic groups include bicyclic and tricyclic groups. Preferred alicyclic groups have 5- or 6-member rings. Alicyclic groups are optionally substituted as described herein. Specifically, alicyclic groups can be substituted with one or more alkyl groups. Carbocyclic groups are alicyclic groups as described above in which all the ring atoms are carbon (this group includes among others cycloalkyl and cycloalkenyl groups). Heterocyclic groups are alicyclic groups as described above that contain at least one heteroatom (non-carbon atom), specific heteroatoms are N, O or S. Carbocyclic groups include among others cycloalkyl groups, cycloalkenyl groups, cyclopropyl, cyclobutyl, cyclopentyl groups, cyclopentadienyl groups, cyclohexyl, and cyclohexenyl. Heterocyclic groups include those having 5-12 ring atoms, with 1, 2 or 3 heteroatoms and 1, 2 or 3 double bonds. Heterocyclic groups include those having 5- and 6-member rings with one or two nitrogens and one or two double bonds. Heterocyclic groups include those having 5- and 6-member rings with an oxygen or a sulfur and one or two double bonds. Heterocyclic group include those having 5- or 6-member rings and two different heteroatom, e.g., N and O, O and S or N and S. Specific heterocyclic groups include among others among others, pyrrolidinyl, piperidyl, piperazinyl, pyrrolyl, pyrrolinyl, furyl, thienyl, morpholinyl, oxazolyl, oxazolinyl, oxazolidinyl, indolyl, triazoly, and triazinyl groups.

Heterocyclene refers to a divalent species formally derived from a heterocyl group as described above by removal of a hydrogen.

Aryl groups include groups having one or more 5- or 6-member aromatic rings. Aryl groups can contain one, two or three, 6-member aromatic rings. Aryl groups can contain two or more fused aromatic rings. Aryl groups can contain two or three fused aromatic rings. Aryl groups are optionally substituted with one or more non-hydrogen substituents. Substituted aryl groups include among others those which are substituted with alkyl or alkenyl groups, which groups in turn can be optionally substituted. Specific aryl groups include phenyl groups, biphenyl groups, pyridyl groups, and naphthyl groups, all of which are optionally substituted as described herein. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semi-fluorinated aryl groups, such as aryl groups having one or more hydrogens replaced with one or more fluorine atoms.

Heteroaryl groups include groups having one or more aromatic rings in which at least one ring contains a heteroatom (a non-carbon ring atom). Heteroaryl groups include those having one or two heteroaromatic rings carrying 1, 2 or 3 heteroatoms and optionally have one 6-member aromatic ring. Heteroaryl groups can contain 5-20, 5-12 or 5-10 ring atoms. Heteroaryl groups include those having one aromatic ring contains a heteroatom and one aromatic ring containing carbon ring atoms. Heteroaryl groups include those having one or more 5- or 6-member aromatic heteroaromatic rings and one or more 6-member carbon aromatic rings. Heteroaromatic rings can include one or more N, O, or S atoms in the ring. Heteroaromatic rings can include those with one, two or three N, those with one or two O, and those with one or two S, or combinations of one or two or three N, O or S. Specific heteroaryl groups include pyridyl, pyrazinyl, pyrimidinyl, quinolinyl, and purinyl groups. In specific embodiments herein aryl groups contain no heteroatoms in the aryl rings. Aryl including heteroaryl groups are optionally substituted.

Heteroatoms include among others, O, S, N, P, B, Si, As, Bi, Ge, Sn, and Sb. In more specific embodiments, heteroatoms include O, N, S, P or B. More specifically heteroatoms are N, O or S. In specific embodiments, one or more heteroatoms are substituted for carbons in aromatic or carbocyclic rings. To satisfy valence any heteroatoms in such aromatic or carbocyclic rings may be bonded to H or a substituent group, e.g., an alkyl group or other substituent.

Arylalkyl groups are alkyl groups substituted with one or more aryl groups wherein the alkyl groups optionally carry additional substituents and the aryl groups are optionally substituted. Exemplary arylalkyl groups are benzyl groups.

Heteroarylalkyl groups are alkyl groups substituted with one or more heteroaryl groups wherein the alkyl groups optionally carry additional substituents and the aryl groups are optionally substituted.

Alkylaryl groups are aryl groups substituted with one or more alkyl groups wherein the alkyl groups optionally carry additional substituents and the aryl groups are optionally substituted. Specific alkylaryl groups are alkyl-substituted phenyl groups such as methylphenyl.

Alkylheteroaryl groups are heteroaryl groups substituted with one or more alkyl groups wherein the alkyl groups optionally carry additional substituents and the aryl groups are optionally substituted.

An alkoxy group is an alkyl group (including a cycloalkyl group), as broadly discussed above, linked to oxygen ($R_{alkyl}$—O—). An alkenoxy is an alkenyl groups as discussed above linked to an oxygen, ($R_{alkenyl}$—O—). An alkynoxy is an alkynyl groups as discussed above linked to an oxygen, ($R_{alkynyl}$—O—) An aryloxy group is an aryl group, as discussed above, linked to an oxygen ($R_{aryl}$—O—). A heteroaryloxy group is a heteroaryl group as discussed above linked to an oxygen ($R_{heteroaryl}$—O—)

An acyl group is an R'—CO group where R' in general is a hydrogen, an alkyl, alkenyl or alkynyl, aryl or heteroaryl group as described above. In specific embodiments, acyl groups have 1-20, 1-12 or 1-6 carbon atoms and optionally 1-3 heteroatom, optionally one double bond or one triple bond. In specific embodiments, R is a C1-C6 alkyl, alkenyl or alkynyl group. cyclic configuration or a combination thereof, attached to the parent structure through a carbonyl functionality. Examples include acetyl, benzoyl, propionyl, isobutyryl, or oxalyl. The R' group of acyl groups are optionally substituted as described herein. When R' is hydrogen, the group is a formyl group.

An acetyl group is a $CH_3$—CO— group. Another exemplary acyl group is a benzyloxy group.

An alkylthio group is an alkyl group (including a cycloalkyl group), as broadly discussed above, linked to a sulfur ($R_{alkyl}$—S—) An arylthio group is an aryl group, as discussed above, linked to a sulfur ($R_{aryl}$—S—). A heteroarylthio group is a heteroaryl group as discussed above linked to a sulfur ($R_{heteroaryl}$—S—)

The term amine group is used broadly herein to refer to the species —N(R")$_2$—, R" is most generally selected from hydrogen, alkyl, aryl or heterocyclic. In specific embodiments, R" is hydrogen, alkyl or aryl (other than heteroaryl). R" groups are generally optionally substituted. More specifically, the term amino refers to —NH$_2$ and alkyl amine refers to —NH(R") where R" is an alkyl and dialkyl amino refers to —N(R")$_2$ where R" independently are alkyl groups.

Groups herein are optionally substituted most generally alky, alkenyl, alkynyl, and aryl, heteroaryl groups can be substituted with one or more halogen, hydroxyl group, nitro group, cyano group, isocyano group, oxo group, thioxo group, azide group, cyanate group, isocyanate group, acyl group, haloakyl group, alkyl group, alkenyl group or alkynyl group (particularly those having 1-4 carbons), a phenyl or benzyl group (including those that are halogen or alkyl substituted), alkoxy, alkylthio, or mercapto (HS—). In specific embodiments, optional substitution is substitution with 1-12 non-hydrogen substituents. In specific embodiments, optional substitution is substitution with 1-6 non-hydrogen substituents. In specific embodiments, optional substitution is substitution with 1-3 non-hydrogen substituents. In specific embodiments, optional substituents contain 6 or fewer carbon atoms. In specific embodiments, optional substitution is substitution by one or more halogen, hydroxy group, cyano group, oxo group, thioxo group, unsubstituted C1-C6 alkyl group or unsubstituted aryl group. The term oxo group and thioxo group refer to substitution of a carbon atom with a =O or a =S to form respectively —CO— (carbonyl) or —CS— (thiocarbonyl) groups.

Specific substituted alkyl groups include haloalkyl groups, particularly trihalomethyl groups and specifically trifluoromethyl groups. Specific substituted aryl groups include mono-, di-, tri, tetra- and pentahalo-substituted phenyl groups; mono-, di, tri-, tetra-, penta-, hexa-, and hepta-halo-substituted naphthalene groups; 3- or 4-halo-substituted phenyl groups, 3- or 4-alkyl-substituted phenyl groups, 3- or 4-alkoxy-substituted phenyl groups, 3- or 4-RCO-substituted phenyl, 5- or 6-halo-substituted naphthalene groups. More specifically, substituted aryl groups include acetylphenyl groups, particularly 4-acetylphenyl groups; fluorophenyl groups, particularly 3-fluorophenyl and 4-fluorophenyl groups; chlorophenyl groups, particularly 3-chlorophenyl and 4-chlorophenyl groups; methylphenyl groups, particularly 4-methylphenyl groups, and methoxyphenyl groups, particularly 4-methoxyphenyl groups.

As to any of the above groups which contain one or more substituents, it is understood, that such groups do not contain any substitution or substitution patterns which are sterically impractical and/or synthetically non-feasible. In addition, the compounds of this invention include all stereochemical isomers arising from the substitution of these compounds.

Compounds of the invention may contain chemical groups (acidic or basic groups) that can be in the form of salts. Exemplary acid addition salts include acetates (such as those formed with acetic acid or trihaloacetic acid, for example, trifluoroacetic acid), adipates, alginates, ascorbates, aspartates, benzoates, benzenesulfonates, bisulfates, borates, butyrates, citrates, camphorates, camphorsulfonates, cyclopentanepropionates, digluconates, dodecylsulfates, ethanesulfonates, fumarates, glucoheptanoates, glycerophosphates, hemisulfates, heptanoates, hexanoates, hydro-hydrochlorides (formed with hydrochloric acid), hydrobromides (formed with hydrogen bromide), hydroiodides, 2-hydroxyethanesulfonates, lactates, maleates (formed with maleic acid), methanesulfonates (formed with methanesulfonic acid), 2-naphthalenesulfonates, nicotinates, nitrates, oxalates, pectinates, persulfates, 3-phenylpropionates, phosphates, picrates, pivalates, propionates, salicylates, succinates, sulfates (such as those formed with sulfuric acid), sulfonates (such as those mentioned herein), tartrates, thiocyanates, toluenesulfonates such as tosylates, undecanoates, and the like.

Exemplary basic salts include ammonium salts, alkali metal salts such as sodium, lithium, and potassium salts, alkaline earth metal salts such as calcium and magnesium salts, salts with organic bases (for example, organic amines) such as benzathines, dicyclohexylamines, hydrabamines [formed with N,N-bis(dehydro-abietyl)ethylenediamine], N-methyl-D-glucamines, N-methyl-D-glucamides, t-butyl amines, and salts with amino acids such as arginine, lysine and the like. Basic nitrogen-containing groups may be quaternized with agents such as lower alkyl halides (e.g., methyl, ethyl, propyl, and butyl chlorides, bromides and iodides), dialkyl sulfates (e.g., dimethyl, diethyl, dibutyl, and diamyl sulfates), long chain halides (e.g., decyl, lauryl, myristyl and stearyl chlorides, bromides and iodides), aralkyl halides (e.g., benzyl and phenethyl bromides), and others.

Compounds of the present invention, and salts thereof, may exist in their tautomeric form, in which hydrogen atoms are transposed to other parts of the molecules and the chemical bonds between the atoms of the molecules are consequently rearranged. It should be understood that all tautomeric forms, insofar as they may exist, are included within the invention. Additionally, inventive compounds may have trans and cis isomers and may contain one or more chiral centers, therefore exist in enantiomeric and diastereomeric forms. The invention includes all such isomers, as well as mixtures of cis and trans isomers, mixtures of diastereomers and racemic mixtures of enantiomers (optical isomers). When no specific mention is made of the configuration (cis, trans or R or S) of a compound (or of an asymmetric carbon), then any one of the isomers or a mixture of more than one isomer is intended. The processes for preparation can use racemates, enantiomers, or diastereomers as starting materials. When enantiomeric or diastereomeric products are prepared, they can be separated by conventional methods, for example, by chromatographic or fractional crystallization. The inventive compounds may be in the free or hydrate form.

With respect to the various compounds of the invention, the atoms therein may have various isotopic forms, e.g., isotopes of hydrogen include deuterium and tritium. All isotopic variants of compounds of the invention are included within the invention and particularly included at deuterium and $^{13}C$ isotopic variants. It will be appreciated that such isotopic variants may be useful for carrying out various chemical and biological analyses, investigations of reaction mechanisms and the like. Methods for making isotopic variants are known in the art.

All references throughout this application, for example patent documents including issued or granted patents or equivalents; patent application publications; and non-patent literature documents or other source material; are hereby incorporated by reference herein in their entireties, as though individually incorporated by reference.

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups, including any isomers and enantiomers of the group members, and classes of compounds that can be formed using the substituents are disclosed separately. When a compound is claimed, it should be understood that compounds known in the art including the compounds disclosed in the references disclosed herein are not intended to be included. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination.

One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention.

THE EXAMPLES

Example 1

Materials and General Information

Alexa Fluor488® (sold as Alexa Fluor® 488 Cadaverine, sodium salt) was purchased from Invitrogen (Carlsbad, Calif.). All other commercially available reagents were purchased from Sigma-Aldrich (St. Louis, Mo.). Tetrahydrofuran (THF) was distilled over sodium/benzophenone. Methanol was distilled over magnesium filings. Dichloromethane and triethylamine were distilled over calcium hydride. Dimethylsulfoxide (DMSO), N,N-dimethyl formamide (DMF) and diethyl ether, hexanes, and ethyl acetate (EtOAc) were used as received. Deionized (milliQ) water and PD-10 Desalting Columns (GE Healthcare; Little Chalfont, UK) were used to purify water soluble polymer 8. All reactions were run under an inert atmosphere of $N_2$ unless otherwise specified. Reactions were stirred using Teflon coated magnetic stir bars. All glassware and stir bars stored in oven before use. Cold baths were prepared using water/ice (0° C.) or ethylene glycol/$CO_2$ (−15° C.).

Analytical thin layer chromatography (TLC) was carried out on E. Merck (Darmstadt) TLC plates pre-coated with silica gel 60 F254 (250 µm layer thickness). Analyte visualization was accomplished using a UV lamp and by charring with potassium permanganate stain (Fischer, 1.5 g in 300 mL water with 6.5% $K_2CO_3$ (w/v) and 5 mL 5% NaOH (w/v)). Flash column chromatography was performed on SiliaFlash® P60 (Silicycle; Quebec City, Canada; 40-63 µm particle size).

$^1$H and $^{13}$C nuclear magnetic resonance (NMR) spectra were obtained using a Bruker AC-300 MHz spectrometer (for small molecules) or Varian Inova-500 MHz spectrometer (for polymers). Chemical shifts are reported relative to tetramethylsilane or residual solvent peaks in parts per million ($CHCl_3$: $^1$H: δ 7.26, $^{13}$C: δ 77.23). Peak multiplicity is reported as singlet (s), doublet (d), doublet of doublets (dd), doublet of doublet of (ddd), doublet of doublet of triplets (ddt), triplet (t), doublet of triplets (dt), quartet (quart), pentet (pent), multiplet (m), AB quartet, $ABX_2$. When visible, the degree of polymerization (DP) was based upon integration of the chain end protons (either phenyl of N-hydroxysuccinimidyl) relative to the polymer olefin protons. High resolution electrospray ionization mass spectra (HRESI-MS) were obtained on a Micromass LCT mass spectrometer. Room temperature GPC-SEC analysis (Viscotek GPC max) was performed on 300×7.5 mm PolyPor 5 µm mixed columns from Polymer Laboratories. Data was analyzed using OmniSEC software (Viscotek Inc.). Polymers were eluted with THF (1.0 mL/min, 40° C.) to determine $M_n$, $M_w$, and polydispersity index ($M_n/M_w$). Columns were calibrated with 10 narrow polystyrene standards (Polymer Laboratories S-M2-10 kit).

UV-Vis absorption spectra were obtained on a Varian Cary 50-Scan UV-Visible Spectrophotometer and fluorescence emission spectra were obtained on a Hitachi F-4500 Fluorescence Spectrophotometer. All optical measurements were taken in a quartz cuvette and samples were prepared to a concentration of 80 µM chromophore, unless otherwise noted.

Raji cell were obtained from Drs. Li Wu and Vineet N. KewalRamani. (Wu, L.; Martin, T. D.; Carrington, M.; KewalRamani, V. N. *Virology* 2004, 318, 17)

Example 2

Preliminary Polymerization Results

Polymerization of 3a used Grubbs $2^{nd}$ generation catalyst [Scholl, M.; Ding, S.; Lee, C. W.; Grubbs, R. H. Org. Lett. 1999, 1, 953.] In dichloromethane at room temperature afforded polymer 4a. However, the polydispersity index (PDI) of the polymers produced was broad.

The broad PDI is believed to be a consequence of the production of highly oxygenated polymers, which can be susceptible to catalyst backbiting during ROMP. [Buchowicz, W.; Holerca, M. N.; Percec, V. Macromolecules 2001, 34, 3842.] The heteroatoms of the monomer coordinate to the ruthenium metal center and situate the catalyst in close proximity to the double bonds along the polymer backbone. This orientation increases the propensity for a deleterious metathesis reaction to occur. Due to the high density of heteroatoms on 4a, the occurrence of back biting was a concern.

Observance of a concomitant increase in the PDI and decrease in the number averaged molecular weight ($M_n$) of polymerization products of another monomer 3e as the polymerization progressed (Table 2) also indicated that backbiting was occurring.

TABLE 2

Evidence for backbiting during the polymerization of oxazinone monomers using catalyst G11 in $CHCl_3$

| entry | [3e]o/[G11][a] | time (h) | conv (%)[b] | Yield[c],[d] | $Mn^{theo}$ (g/mol) | $Mn^{GPC[e]}$ (g/mol) | PDI (Mn/Mw) |
|---|---|---|---|---|---|---|---|
| 1 | 10/1 | 1 | 41 | 73 | 1100 | 13800 | 1.7 |
| 2 | 10/1 | 3 | 66 | 76 | 1700 | 11700 | 1.8 |
| 3 | 10/1 | 7 | 92 | 72 | 2400 | 9400 | 2.0 |
| 4 | 10/1 | 13 | 92 | 83 | 2400 | 8800 | 2.1 |
| 5 | 10/1 | 20 | 97 | 76 | 2500 | 2600 | 2.6 |

[a][3e]$_o$ = 1M in $CHCl_3$, 20° C.
[b]based off of 1H-NMR integrations of monomer olefin signals to polymer olefin signals.
[c]isolated.
[d]theoretical yield based off of monomer conversion.
[e]calibrated with polystyrene standards, eluted in THF.

To prevent back biting, the polymerization was performed in the oxygenated solvent tetrahydrofuran (THF) using catalyst 5 (Scheme 1). The objective was to use a solvent that could outcompete the heteroatoms on the polymer for catalyst coordination sites in conjunction with a catalyst shown to have superior polymerization kinetics to Grubbs' $2^{nd}$ general catalyst. [Kang, E.-H.; Lee, I. S.; Choi, T.-S. J.A.C.S. 2011, 133(31), 11904; Love, J. A.; Morgan, J. P.; Trnka, T. M.; Grubbs, R. H. Angew. Chem. Int. Ed. 2002, 41, 4035.] Indeed, these changes were found to reduce the propensity for back biting. At monomer to catalyst loadings up to 50:1 the observed $M_n$ values increase linearly and closely mirror the theoretical $M_n$ values. In addition, the PDI is maintained around a value of 1.4. As the initial loadings pass 50:1, the observed $M_n$ values deviate from theory and PDI increases to 2.0. Nevertheless, these studies show that compound 3a is amenable to ROMP and high molecular weight polymers can be readily obtained.

Example 3

Preliminary Polymer Degradation Studies

The degradability of a polymer containing an N-alkoxy-oxazinone backbone was investigated. Small molecule oxazinones have been shown to undergo ring opening to afford β-hydroxy carboxylic acids under both acidic and basic conditions. [Cardillio et al., 1990; Bandini et al., 1999.] To see if an N-alkoxy-oxazinone would behave similarly, monomer 3a was subjected to a ring-opening cross metathesis reaction with 1-hexene to synthesize the 1-mer S2. compound underwent ring opening as well to afford compound S3 when stirred in an acidified methanol solution. Although there is incomplete hydrolysis to a β-hydroxy carboxylic acid, the observed ring-opening is sufficient to facilitate decomposition along the polymer backbone.

Having established that an N-alkoxy-oxazinone motif is susceptible to ring-opening, the degradation of polymer 4a could be assessed. Utilizing gel permeation chromatography (GPC) the decomposition of 4a could be monitored over time under acidic and basic conditions. The results of these studies are shown in FIGS. 2A and 2B. At pH<1.0, degradation was found to be fast. In this case, complete decomposition occurred in 45 min. As the acidity decreased, the rate of degradation decreased as well but was still relatively fast at a pH of 2.5. Under these more dilute acidic conditions, there was a 66% mass lost in 6 h. Past this threshold, degradation occurred but was much slower until no appreciable degradation was observed at pH greater than 4.5. Similar trends were also observed for the polymer under basic conditions (FIG. 2B). These studies demonstrate that the oxazinone backbone of 4a can lead to complete polymer degradation.

It is interesting to note that the degradation profile of 4a is similar to that for a hydrophobic polyester recently reported by Yao et. al. [Yao, K.; Wang, J.; Zhang, W.; Lee, J. S.; Wang, C.; Chu, F.; He, X.; Tang, C. Biomacromolecules 2011, 12(6), 2171.] The hydrophobic polyester demonstrated complete mass loss in 1 h at a pH of 0.8, yet only 10% mass loss over 60 days in a solution buffered to a pH of 7.4. These observations are similar to the degradation profile seen in FIG. 2A. This validates that the polymers of this invention are not only a new class of degradable ROMP polymer, but that they degrade on a time scale similar to currently utilized polyesters.

Characterization of the Decomposition Product of the Ring-Opening of an N-alkoxy-1,3-oxazin-2-one 1-mer:

Scheme 5: 3-benzyloxy-5,5-dimethyl-2-(1'-pentenyl)-6-vinyl-1,3-oxazin-4-one, 9.

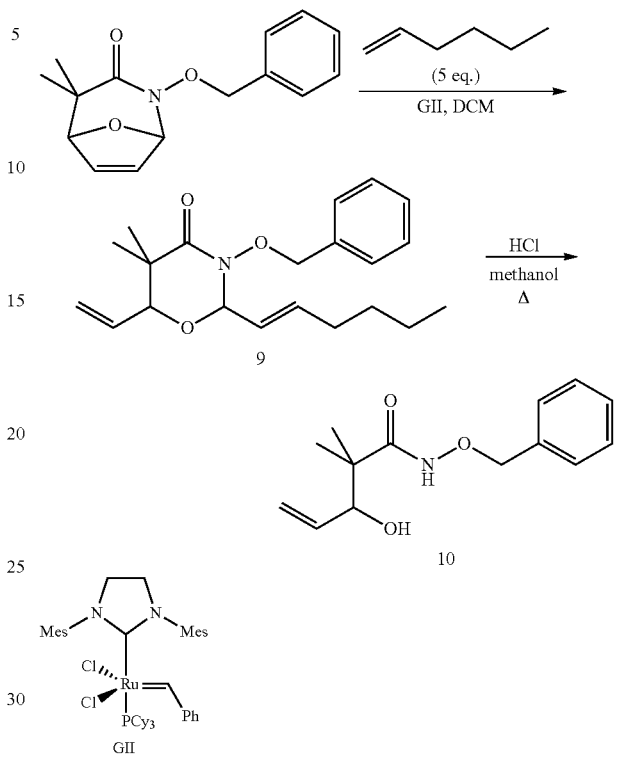

To a stirring solution of 3e (100 mg, 0.388 mmol) in dichloromethane (1.0 mL) was added 1-hexene (0.24 mL, 1.95 mmol) and then GII (33 mg, 0.0388 mmol) in dichloromethane (0.3 mL). The reaction was allowed to stir at room temperature for 1.45 h and then quenched with ethyl vinyl ether (150 μL). The solution was allowed to stir for an additional hour. The volatiles were removed under reduced pressure and the residue was purified by flash column chromatography (the column was packed with 5% EtOAc/hexanes and eluted with a gradient to 18% EtOAc/hexanes). The product was isolated as a red oil (59 mg, 44%).

$^1$H-NMR (CDCl$_3$, 300 MHz): δ 7.45-7.30 (m, 5H), 5.95 (dt, J=15.5, 7.0 Hz, 1H), 5.79 (ddd, J=17.4, 10.5, 6.5, 1H), 5.49 (ddt, J=15.5, 7.8, 1.5 Hz, 1H), 5.32 (dt, J=17.5, 1.5, 1H), 5.30 (dt, J=10.5, 1.5 Hz, 1H), 5.08 (d, J=7.8 Hz, 1H), 4.90 (AB quartet, J$_{AB}$=9.5 Hz, 2H), 3.96 (broad d, J=6.0 Hz, 1H), 2.12 (broad quart, J=6.8 Hz, 2H), 1.49-1.31 (m, 4H), 1.23 (s, 3H), 1.14 (s, 3H), 0.91 (t, J=7.2 Hz, 3H). $^{13}$C-NMR (CDCl$_3$, 75 MHz): δ 173.4, 139.7, 135.3, 132.2, 129.8, 128.9, 128.5, 125.5, 119.4, 91.5, 82.7, 77.3, 45.0, 31.98, 30.9, 22.5, 21.0, 20.7, 14.9. HRESI-MS calcd for C$_{21}$H$_{29}$NO$_3$ [M+H]$^+$ 344.2; observed 344.2. The regiochemistry of S2 was determined by the coupling between signals at δ 5.49 to δ 5.08 and coupling between signals at δ 5.79 to δ 3.96. NMR spectrum showed that a single regioisomer was isolated.

Decomposition of 9 (see: Berhal, F.; Takechi, S.; Kumagai, N.; Shibasaki, M. Chem. Eur. J. 2011, 17, 1915.)

To a stirring solution of 9 (20 mg) in methanol (0.50 mL) was added 1 mL of the 2.27 M HCl stock solution from the general procedure. The solution was allowed to stir at 45° C. overnight. The solution was neutralized by elution through a plug of Amberlite® IRA 400(OH) basic resin and the volatiles were removed under reduced pressure. The residue was purified by flash column chromatography (the column was packed with 10% EtOAc/hexanes and eluted with a gradient to 20% EtOAc/hexanes). A low $R_f$ fraction was isolated to afford a clear oil characterized as 10. $^1$H-NMR (CDCl$_3$, 500 MHz): δ 8.85 (s, 1H, NH), 7.60-7.25 (m, 5H), 5.82 (ddd, J=17.1, 10.3, 6.8 Hz, 1H), 5.28 (dt, J=17.2, 1.0 Hz, 1H), 5.23 (dd, 10.3, 1.0 Hz, 1H), 4.91 (s, 2H), 3.99 (broad d, J=6.9 Hz, 1H), 1.21 (s, 3H), 1.08 (s, 3H). $^{13}$C-NMR (CDCl$_3$, 125 MHz): δ 174.7, 136.1, 135.3, 129.3, 128.8, 128.6, 118.5, 78.6, 78.0, 45.0, 23.8, 20.4. HRESI-MS calcd for $C_{14}H_{19}NO_3$ [M+Na]$^+$ 272.1288; observed 272.1266.

Example 4

Synthesis of Monomers

A. Preparation of N-Boc, O-octyl hydroxylamine (21)

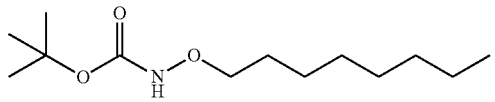 [SMILES: CCCCCCCCONC(=O)OC(C)(C)C]

To a stirring solution of N-Boc hydroxylamine (1.40 g, 10.6 mmol) in 7.0 mL DMF was added 1,8-diazabicyclo [5.4.0]undec-7-ene (DBU, 1.6 mL, 10.6 mmol) followed by 3.5 mL DMF. Then 1-bromooctane (1.6 mL, 9.5 mmol) was added to the solution followed b 3.5 mL DMF. The reaction was stirred at rt for 2 h, then 0.8 mL DMF was added to the reaction and the solution was moved to an oil bath and stirred at 50° C. After 20 h, dichloromethane (90 mL) was added to the reaction and the solution was washed with 3×22 mL 15% aqueous citric acid solution. The organic layer was dried over Na$_2$SO$_4$. The drying agent was removed by filtration and the solvent was removed under reduced pressure. The residue was purified by flash column chromatography (5→15% EtOAc/hexanes). Compound 21 was obtained as an oil (1.01 g, 43%). $^1$H-NMR (CDCl$_3$, 500 MHz): δ 7.12 (s, 1H), 3.86 (t, J=6.7 Hz, 2H), 1.63 (pent, J=7.0 Hz, 2H), 1.50 (s, 9H), 1.43-1.21 (m, 10 Hz), 0.89 (t, J=6.9 Hz, 3H). $^{13}$C-NMR (CDCl$_3$, 125 MHz): δ 156.9, 81.6, 77.0, 31.8, 29.4, 29.2, 28.2, 28.0, 25.9, 22.7, 14.1. HRESI-MS calcd for $C_{11}H_{27}NO_3$ [M+H]+ 263.2330. found 263.2324.

B. Preparation of O-octyl hydroxylamine trifluoroacetate salt (1a)

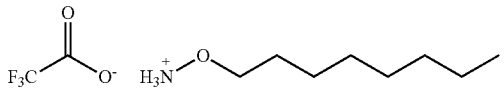

To a stirring solution of 21 (1.01 gg, 4.1 mmol) in dichloromethane (20 mL) at 0° C. was added trifluoroacetic acid (10.0 mL). Stirring continued for 1 h at 0° C. The volatile compounds were removed under reduced pressure and the excess acid was removed by azeotroping with toluene (3×20 mL). Compound 1a was obtained as a clear oil (1.01 g, quant.), which was carried on without further purification. $^1$H-NMR (CDCl$_3$, 500 MHz): δ 11.00-9.50 (broad s, 3H), 4.04 (t, J=6.6 Hz, 2H), 1.66 (pent, J=7.0 Hz, 2H), 1.50-1.12 (m, 10H), 0.90 (t, J=6.7 Hz, 3H). $^{13}$C-NMR (CDCl$_3$, 125 MHz): δ 162.8 (q, J=36.7 Hz), 116.1 (q, J=290.5 Hz), 76.0, 31.7, 29.1, 29.1, 27.5, 25.4, 22.6, 14.0. HRESI-MS calcd for $C_8H_{20}NO$ [M-TFA]$^+$ 146.1540. found 146.1537.

C. Preparation of O-(6-bromohexyl)-hydroxylamine trifluoroacetate salt, 1b

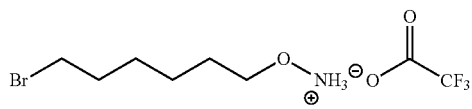

To a stirring solution of N-Boc-O-(6-bromohexyl)hydroxylamine (954 mg, 3.22 mmol) in dichloromethane (16 mL) at 0° C. was added trifluoroacetic acid (8.0 mL). Stirring continued for 1 h at 0° C. (Gilmore, J. M.; Scheck, R. A.; Esser-Kahn, A. P.; Joshi, N. S.; Francis, M. B. *Angew. Chem. Int. Ed.* 2006, 45, 5307.) The volatile compounds were removed under reduced pressure and the excess acid was removed by azeotroping with toluene (3×20 mL). O-(6-bromohexyl)hydroxylamine trifluoroacetate salt (1b) was obtained as a clear oil (998 mg, quant.), which was carried on without further purification. $^1$H-NMR (CDCl$_3$, 300 MHz): δ 10.41 (broad s, 3H), 4.05 (broad t, J=6.2 Hz, 2H), 3.4 (t, J=7.0 Hz, 2H), 1.85 (pent, J=6.7 Hz, 2H), 1.68 (broad pent, J=6.3 Hz, 2H), 1.51-1.33 (m, 4H). $^{13}$C-NMR (CDCl$_3$, 75 MHz): δ 33.7, 32.6, 27.8, 27.6, 24.2. HRESI-MS calcd for $C_6H_{15}BrON$ [M+H]$^+$ 196.0332. found 196.0332.

D. Preparation of O-octyl, α-bromoisobutyryl hydroxamic ester (2a)

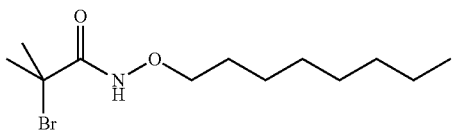 [SMILES: CCCCCCCCONC(=O)C(C)(C)Br]

To a stirring solution of 1a (1.06 g mg, 4.1 mmol) in dichloromethane (15.5 mL) at 0° C. was added triethylamine (0.4 mL, 4.2 mmol) in one portion followed by α-bromoisobutyryl bromide (0.5 mL, 4.1 mmol) dropwise. Stirring continued for 15 min at 0° C. Pyridine (0.5 mL, 4.7 mmol) was added and the reaction was allowed to slowly warm to rt. After 20 h, the reaction was diluted with dichloromethane (15 mL) and washed with H$_2$O (2×15 mL). The organic phase was dried over Na$_2$SO$_4$. The drying agent was removed by filtration and the solvent was removed under reduced pressure. The residue was purified by flash column chromatography (5→10% EtOAc/hexanes). 2a was obtained as an oil (710 mg, 59%). $^1$H-NMR (CDCl$_3$, 400 MHz): δ 9.22 (s, 1H), 3.96 (t, J=6.7 Hz, 2H), 1.99 (s, 6H), 1.70 (pent, J=7.0 Hz, 2H), 1.55-1.20 (m, 10H), 0.91 (t, J=6.9 Hz, 3H). $^{13}$C-NMR (CDCl$_3$, 100 MHz): δ 169.7, 76.9, 59.7, 32.5, 31.8, 29.4, 29.2, 28.0, 25.8, 22.7, 14.1. HRESI-MS calcd for $C_{12}H_{24}BrNO_2$ [M+H]+ 311.1329. found 311.1318.

E. Preparation of O-(6-bromohexyl)-α-bromo-isobutyryl hydroxamic ester, 2b

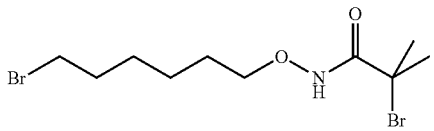

To a stirring solution of 1b (945 mg, 3.05 mmol) in dichloromethane (11.5 mL) at 0° C. was added triethylamine (0.38 mL, 3.1 mmol) in one portion followed by α-bromo isobutyryl bromide (0.37 mL, 3.05 mmol) dropwise. Stirring continued for 15 min at 0° C. Pyridine (0.29 mL, 3.45 mmol) was added and the reaction was allowed to slowly warm to rt. After 20 h, the reaction was diluted with dichloromethane (12 mL) and washed with $H_2O$ (2×12 mL). The organic phase was dried over $Na_2SO_4$. The drying agent was removed by filtration and the solvent was removed under reduced pressure. The residue was purified by flash column chromatography (the column was packed with 15% EtOAc/hexanes and eluted with 20% EtOAc/hexanes). 2b was obtained as a light yellow oil (600 mg, 57%). $^1$H-NMR (CDCl$_3$, 300 MHz): δ 9.59 (broad s, 1H), 3.95 (t, J=6.7 Hz, 2H), 3.42 (t, J=6.8 Hz, 2H), 1.97 (s, 6H), 1.87 (pent, J=7.0 Hz, 2H), 1.68 (pent, J=6.9 Hz, 2H), 1.53-1.38 (m, 4H). $^{13}$C-NMR (CDCl$_3$, 75 MHz): δ 169.5, 76.2, 58.6, 33.8, 32.5, 32.1, 27.8, 27.7, 24.9. HRESI-MS calcd for $C_{10}H_{19}Br_2NO_2$ [M+H]$^+$ 343.9856. found 343.9851.

F. Preparation of N-(octyloxy), 8-oxo-2-azabicyclo[3.2.1]oct-6-en-3-one (3a)

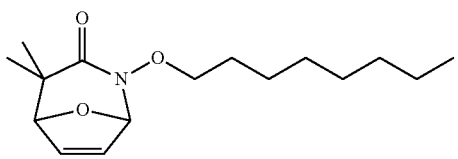 [SMILES: CCCCCCCCON1C(=O)C(C)(C)C2C=CC1O2]

To a stirring solution of 2a (705 mg, 2.4 mmol) in 1,1,1,3,3,3-hexafluoroisopropanol and furan [1:1 (v/v) 0.25 M] at 0° C. was added triethylamine (0.68 mL, 4.8 mmol) dropwise over 5 min. Stirring continued at 0° C. for 5 min, then the reaction was allowed to warm to rt over 25 min. The volatile compounds were removed under reduced pressure and the residue was purified by flash column chromatography (7→15% EtOAc/hexanes). Compound 3a was obtained as a light yellow oil (443 mg, 66%). $^1$H-NMR (CDCl$_3$, 500 MHz): δ 6.73 (broad d, J=5.5 Hz, 1H), 6.49 (broad d, J=5.5 Hz, 1H), 5.49 (broad s, 1H), 4.52 (broad s, 1H), 3.93 (ABX2, JAB=9.2 Hz, JAX=6.7 Hz, JBX=7.3 Hz, 2H), 1.73-1.60 (m, 2H), 1.50 (s, 3H), 1.45-1.20 (m, 10H), 1.06 (s, 3H), 0.89 (t, J=7.1 Hz, 3H). $^{13}$C-NMR (CDCl$_3$, 125 MHz): δ 175.9, 135.5, 134.7, 90.8, 87.4, 75.9, 49.0, 31.8, 29.4, 29.2, 28.2, 27.0, 25.9, 22.7, 19.8, 14.1. HRESI-MS calcd for $C_{16}H_{27}NO_3$ [M+H]$^+$=282.2064. found 282.2075.

G. Preparation of N-(6-bromohexyloxy)-8-oxo-2-azabicyclo[3.2.1]oct-6-en-3-one 3b

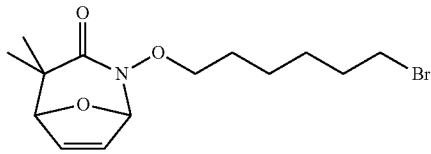 [SMILES: CC1(C)C(=O)N(OCCCCCCBr)C2C=CC1O2]

See: Jeffrey, C. S.; Barnes, K. L.; Eickhoff, J. A.; Carson, C. R. *J. Am. Chem. Soc.* 2011, 133, 7688. To a stirring solution of 2b (665 mg, 1.93 mmol) in 1,1,1,3,3,3-hexafluoroisopropanol and furan [1:1 (v/v) 0.25 M] at 0° C. was added triethylamine (0.46 mL, 3.85 mmol) dropwise over 5 min. Stirring continued at 0° C. for 5 min, then the reaction was allowed to warm to rt over 40 min. The volatile compounds were removed under reduced pressure and the residue was purified by flash column chromatography (the column was packed with 15% EtOAc/hexanes and eluted with 20% EtOAc/hexanes). Compound 3b was obtained as a light yellow oil (406 mg, 63%). $^1$H-NMR (CDCl$_3$, 300 MHz): δ 6.73 (dd, J=6.0, 1.0 Hz, 1H), 6.48 (dd, J=6.0, 1.8 Hz, 1H), 5.48 (d, J=1.0 Hz, 1H), 4.51 (d, J=1.8 Hz, 1H), 3.92 (ABX$_2$, J$_{AB}$=9.6 Hz, J$_{AX}$=J$_{BX}$=6.8 Hz, 2H), 3.41 (t, J=6.8 Hz, 2H), 1.87 (broad pent, J=6.8 Hz, 2H), 1.67 (m, 2H), 1.49 (s, 3H), 1.46 (m, 4H), 1.05 (s, 3H). $^{13}$C-NMR (CDCl$_3$, 75 MHz): δ 175.6, 135.4, 134.7, 90.7, 87.3, 75.4, 48.9, 33.8, 32.6, 28.0, 27.9, 26.9, 25.1, 19.8. HRESI-MS calcd for $C_{14}H_{22}BrNO_3$ [M+H]$^+$ =332.0856. found 332.0840.

H. Preparation of N-(6-azidohexyloxy)-8-oxo-2-azabicyclo[3.2.1]oct-6-en-3-one, 3c

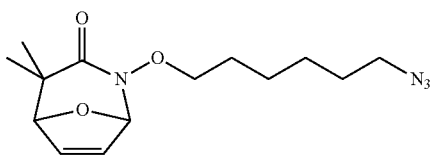 [SMILES: CC1(C)C(=O)N(OCCCCCCN=[N+]=[N-])C2C=CC1O2]

To a stirring solution of 3b (100 mg, 0.302 mmol) in DMF (10 mL) was added sodium azide (98 mg, 1.51 mmol). The solution was allowed to stir at 65° C. overnight. After cooling to room temperature, the solution was diluted with water (10 mL) and extracted with EtOAc (3×15 mL). The combined organic phase was dried over $Na_2SO_4$. The drying agent was removed by filtration and the solvent was removed under reduced pressure to afford 3c as a clear oil (73 mg, 83%). The oil was taken on without further purification immediately, as 3c was found to be unstable. $^1$H-NMR (CDCl$_3$, 300 MHz): δ 6.70 (dd, J=5.8, 1.0 Hz, 1H), 6.49 (dd, J=6.0, 1.7 Hz, 1H), 5.47 (d, J=1.1 Hz, 1H), 4.50 (d, J=1.6 Hz, 1H), 3.92 (ABX$_2$, J$_{AX}$=J$_{BX}$=6.7 Hz, J$_{AB}$=9.2 Hz, 2H), 3.27 (t, J=7.0 Hz, 2H), 1.71-1.56 (m, 4H), 1.48 (s, 3H), 1.48-1.39 (m, 4H), 1.04 (s, 3H). $^{13}$C-NMR (CDCl$_3$, 75 MHz): δ 175.4, 135.3, 134.6, 90.6, 87.1, 75.3, 51.2, 48.8, 28.5, 27.9, 26.7, 26.3, 25.3, 19.6. HRESI-MS calcd for $C_{14}H_{22}N_4O_3$ [M+H]$^+$ 295.1765. found 295.1758.

I. Preparation of O-(6-(5-(α-D-mannose-3,4,5,7-tetraacetate)triazole)hexyl)-oxybicyclo[3.2.1]lactenam, 6

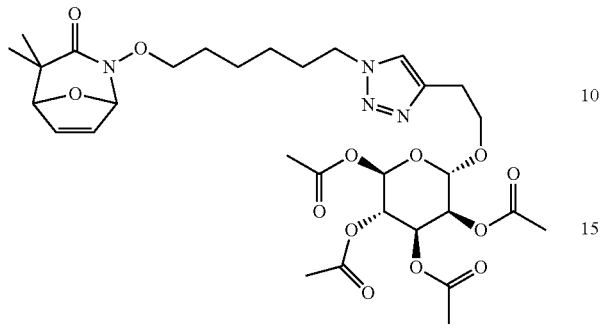

To a stirring solution of 3c (37 mg, 0.126 mmol) and 2-propargyl-α-D-mannose-3,4,5,7-tetraacetate (49 mg, 0.126 mmol) (Schmid, S.; Mishra, A.; Bäuerle, P. *Chem. Commun.* 2011, 47, 1324) in toluene (0.25 mL) was added tris(triphenylphosphine) copper(I) bromide (2.7 mg, 0.0063 mmol) (Gujadhur, R.; Venkataramen, D.; Kintigh, J. T. *Tett. Lett.* 2001, 42, 4791.) The reaction was allowed to stir at room temperature overnight. The reaction mixture was then directly loaded onto a flash chromatography column for purification (the column was packed with 60% EtOAc/hexanes and eluted with 90% EtOAc/hexanes). The product was isolated as an oil (55 mg, 64%). $^1$H-NMR (CDCl$_3$. 300 MHz): δ 7.60 (s, 1H), 6.72 (dd, J=6.2, 1.0 Hz, 1H), 6.49 (dd, J=6.0, 1.7 Hz, 1H), 5.47 (d, J=1.0 Hz, 1H), 5.36-5.24 (m, 3H), 4.96 (d, J=1.4 Hz, 1H), 4.85 (d, J=12.1 Hz, 1H), 4.68 (d, J=12.1 Hz, 1H), 4.51 (d, J=1.9 Hz, 1H), 4.37 (t, J=7.4 Hz, 2H), 4.30 (dd, J=12.4, 5.4 Hz, 1H), 4.13-4.06 (m, 3H), 3.96 (ABX$_2$, J$_{AB}$=9.6, J$_{AX}$=J$_{BX}$=6.6 Hz, 2H), 2.16 (s, 3H), 2.12 (s, 3H), 2.04 (s, 3H), 1.99 (s, 3H), 2.00-1.90 (m, 2H), 1.71-1.60 (m, 2H), 1.53-1.34 (m, 6H), 1.05 (s, 3H). $^{13}$C-NMR (CDCl$_3$. 75 MHz): δ 175.9, 170.8, 170.2, 170.0, 169.9, 143.6, 135.6, 134.9, 122.9, 97.0, 90.8, 87.5, 75.5, 69.6, 69.2, 68.8, 66.2, 62.3, 61.3, 50.4, 49.1, 30.3, 28.1, 27.0, 26.4, 25.4, 21.0, 20.9, 20.8. 20.8. 19.9. HRESI-MS calcd for C$_{31}$H$_{44}$N$_4$O$_{13}$ [M+H]$^+$ 681.2978. found 681.2986.

J. Preparation of O-ethyl, α-bromoisobutyryl hydroxamic ester (2d)

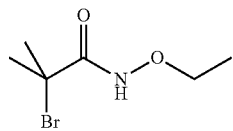

To a stirring solution of O-ethyl hydroxylamine hydrochloride (700 mg, 7.2 mmol) in dichloromethane (30 mL) at 0° C. was added triethylamine (1.00 mL, 7.2 mmol) in one portion followed by α-bromoisobutyryl bromide (0.89 mL, 7.2 mmol) dropwise. Stirring continued for 15 min at 0° C. Pyridine (0.67 mL, 8.3 mmol) was added and the reaction was allowed to slowly warm to rt. After 20 h, the reaction was diluted with dichloromethane (30 mL) and washed with H$_2$O (2×30 mL). The organic phase was dried over Na$_2$SO$_4$. The drying agent was removed by filtration and the solvent was removed under reduced pressure. The residue was purified by flash column chromatography (25% EtOAc/hexanes). 2d was obtained as a light yellow oil (1.24 mg, 81%). $^1$H-NMR (CDCl$_3$, 500 MHz): δ 9.10 (broad s, 1H), 3.93 (q, J=7.1 Hz, 2H), 1.90 (s, 6H), 1.23 (t, J=7.1 Hz, 3H). $^{13}$C-NMR (CDCl$_3$, 125 MHz): δ 169.8, 72.3, 59.8, 32.5, 13.4. HRESI-MS calcd for C$_6$H$_{12}$BrNO$_2$ [M+H]+ 210.0125. found 210.0127.

K. Preparation of N-(ethyloxy)-8-oxo-2-azabicyclo[3.2.1]oct-6-en-3-one (3d)

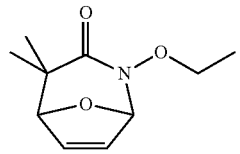

To a stirring solution of 2d (1.17 g, 5.5 mmol) in 1,1,1,3,3,3-hexafluoroisopropanol and furan [1:1 (v/v) 0.25 M] at 0° C. was added triethylamine (1.6 mL, 11.1 mmol) dropwise over 5 min. Stirring continued at 0° C. for 5 min, then the reaction was allowed to warm to rt over 25 min. The volatile compounds were removed under reduced pressure and the residue was purified by flash column chromatography (25% EtOAc/hexanes). Compound 3d was obtained as an oil (720 mg, 69%). $^1$H-NMR (CDCl$_3$, 500 MHz): δ 6.66 (broad d, J=6.6 Hz, 1H), 6.42 (broad d, J=6.4 Hz, 1H), 5.41 (s, 1H), 4.44 (s, 1H), 3.93 (m, 2H), 1.45 (s, 3H), 1.21 (t, J=7.1 Hz, 3H), 0.98 (s, 3H). $^{13}$C-NMR (CDCl$_3$, 125 MHz): δ 175.8, 135.5, 134.7, 90.9, 87.4, 71.8, 49.0, 26.9, 19.8, 13.8. HRESI-MS calcd for C$_{10}$H$_{15}$NO$_3$ [M+H]+ 198.1125. found 198.1130.

L. Preparation of N-(benzyloxy)-8-oxo-2-azabicyclo[3.2.1]oct-6-en-3-one (3e)

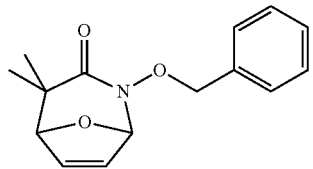 [SMILES: CC1(C)C(=O)N(OCc2ccccc2)C2C=CC1O2]

Compound 3e was synthesized as previously reported (Jeffrey et al. 2011).

M. Preparation of N-Boc, O-(4-pyrenylbutyl)hydroxylamine (22)

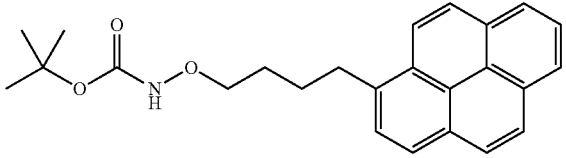 [SMILES: CC(C)(C)OC(=O)NOCCCCc1ccc2ccc3cccc4ccc1c2c34]

To a stirring solution of 4-(1-pyrenyl)butyl methanesulfonate (415 mg, 1.18 mmol) [S. Cicchi, P. Fabbrizzi, G. Ghini, A. Brandi, P. Foggi, A. Marcelli, R. Righini, C. Botta *Chem. Eur. J.* 2009, 15, 754] and NBoc hydroxylamine (235 mg, 1.77 mmol) in DMF (1.3 mL) was added DBU (0.26 mL, 1.77 mmol) in DMF (0.65 mL). The reaction was allowed to stir for 20 h at 50° C. The reaction was then concentrated and the residue was purified on a flash chromatography column (20% EtOAc/Hexanes). Compound 22 was isolated as an oil (236 mg, 51%). $^1$H-NMR (CDCl$_3$, 300 MHz): δ 8.19 (dd, J=9.3 Hz, 1H), 8.12-8.06 (m, 2H), 8.05-8.00 (m, 2H), 7.98-7.88 (m, 3H), 7.77 (d, J=7.9 Hz, 1H), 7.21 (broad s, 1H), 3.86 (t, J=6.6 Hz, 2H), 3.30 (t, J=7.4 Hz, 2H), 1.96-1.82 (m, 4H), 1.82-1.68 (m, 4H), 1.44 (s, 9H). $^{13}$C-NMR (CDCl$_3$, 75 MHz): δ 157.1, 136.6, 131.5, 131.0, 129.9, 128.7, 127.6, 127.3, 127.3, 126.7, 125.9, 125.2, 125.1, 124.9, 124.9, 124.8, 123.5, 81.7, 76.6, 33.3, 28.3, 28.2, 27.7. HRESI-MS calcd for C$_{25}$H$_{31}$NO$_3$ [M+NH$_4$]$^+$ 407.2333. found 407.2348.

N. Preparation of O-(4-pyrenylbutyl)hydroxylamine trifluoroacetate salt, 1f

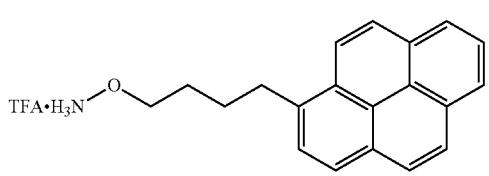

To a stirring solution of 22 (117 mg, 0.30 mmol) in dichloromethane (1.5 mL) at 0° C. was added trifluoroacetic acid (0.75 mL). Stirring continued for 1 h at 0° C. The volatile compounds were removed under reduced pressure and the excess acid was removed by azeotroping with toluene (3×20 mL). Compound 1t was obtained as an oil (121 mg, quant.), which was carried on without further purification. $^1$H-NMR (CDCl$_3$, 300 MHz): δ 10.09 (broad s, 3H), 8.00-7.50 (m, 8H), 7.35 (d, J=8.1 Hz, 1H), 3.92 (broad t, J=5.5 Hz, 2H), 2.82 (broad t, J=7.0 Hz, 2H), 1.70-130 (m, 4H). $^{13}$C-NMR (CDCl$_3$, 75 MHz): δ 135.8, 131.5, 130.9, 129.9, 129.3, 128.5, 127.5, 127.3, 126.9, 126.7, 125.7, 125.6, 125.0, 125.0, 124.8, 123.1, 75.9, 32.6, 27.5, 27.3. HRESI-MS calcd for C$_{20}$H$_{20}$NO [M−TFA]$^+$ 290.1540. found 290.1532.

Preparation of O-(4-pyrenylbutyl), α-bromoisobutyryl hydroxamic ester (2f)

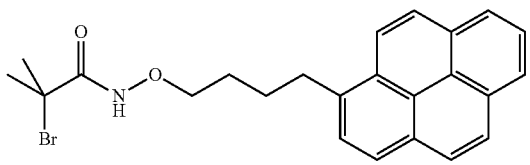 [SMILES: CC(C)(Br)C(=O)NOCCCCc1ccc2ccc3cccc4ccc1c2c34]

To a stirring solution of 1f (120 mg, 0.30 mmol) in dichloromethane (1.05 mL) at 0° C. was added triethylamine (38 μL, 0.30 mmol) in one portion followed by α-bromo isobutyryl bromide (36 μL, 0.30 mmol) dropwise. Stirring continued for 15 min at 0° C. Pyridine (30 μL, 0.35 mmol)) was added and the reaction was allowed to slowly warm to rt. After 20 h, the reaction was diluted with dichloromethane (5 mL) and washed with H$_2$O (2×4 mL). The organic phase was dried over Na$_2$SO$_4$. The drying agent was removed by filtration and the solvent was removed under reduced pressure. The residue was purified by flash column chromatography (20% EtOAc/hexanes).

Compound 2f was obtained as an oil (68 mg, 53%). $^1$H-NMR (CDCl$_3$, 300 MHz): δ 9.14 (broad s, 1H), 8.23 (d, J=9.1 Hz, 1H), 8.16-8.10 (m, 2H), 8.00-7.91 (m, 3H), 7.82- (d, J=7.7 Hz, 1H), 3.94 (t, J=6.6 Hz, 2H), 3.35 (t, J=7.4 Hz, S7 2H), 2.04-1.86 (m, 8H), 1.86-1.74 (m, 2H). $^{13}$C-NMR (CDCl$_3$, 75 MHz): δ 169.9, 136.5, 131.6, 131.1, 130.0, 128.8, 127.7, 127.5, 126.8, 126.0, 125.2, 125.2, 125.0, 125.0, 124.9, 123.5, 76.7, 59.6, 33.3, 32.5, 28.0. ESI-MS calcd for C$_{48}$H$_{53}$BrN$_2$O$_4$ [2M−HBr]$^+$ calcd 795.7. found 796.4. Compound 2d was found to dimerize upon ionization, eliminating 1 eq of HBr.

N-(4-pyrenylbutyloxy)-8-oxo-2-azabicyclo[3.2.1] oct-6-en-3-one (3f)

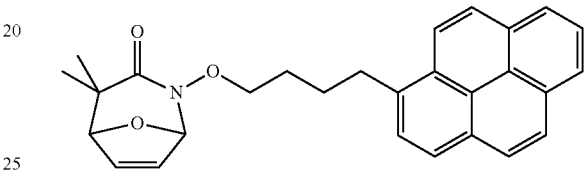

To a stirring solution of compound 2f (120 mg, 0.28 mmol) in 1,1,1,3,3,3-hexafluoroisopropanol and furan [1:1 (v/v) 0.25 M] at 0° C. was added triethylamine (73 μL, 0.59 mmol) dropwise over 5 min. Stirring continued at 0° C. for 5 min, then the reaction was allowed to warm to rt over 40 min. The volatile compounds were removed under reduced pressure and the residue was purified by flash column chromatography (20% EtOAc/hexanes). Compound 3f was obtained as an orange solid (96 mg, 82%). $^1$HNMR (CDCl$_3$, 300 MHz): δ 8.25 (d, J=9.0 Hz, 1H), 8.18-8.11 (m, 2H), 8.11-8.05 (m, 2H), 8.02-7.93 (m, 3H), 7.84 (d, J=7.8 Hz, 1H), 6.65 (dd, J=5.8, 0.9 Hz, 1H), 6.43 (dd, J=6.1, 1.8 Hz, 1H), 5.42 (d, J=1.1 Hz, 1H), 4.46 (d, J=1.7 Hz, 1H), 3.98 (ABX2, JAB=9.3 Hz, JAX=JBX=6.5 Hz, 2H), 3.36 (t, J=7.6 Hz, 2H), 2.05-1.72 (m, 4H), 1.47 (s, 3H), 1.03 (s, 3H). $^{13}$C-NMR (CDCl$_3$, 75 MHz): δ 175.9, 136.7, 135.6, 134.9, 131.7, 131.1, 130.0, 128.9, 127.7, 127.5, 127.5, 126.8, 126.0, 125.3, 125.3, 125.1, 125.0, 124.9, 123.6, 91.0, 87.6, 75.7, 49.2, 33.4, 28.5, 28.3, 27.1, 20.0. HRESI-MS calcd for C$_{28}$H$_{27}$NO$_3$ [M+H]$^+$ 426.2064. found 426.2063.

Example 5

Synthesis of Polymers by ROMP

A. ROMP polymerization conditions were screened employing monomer 3a, as detailed in Table 3. This screening led to a general procedure for synthesis of polymers by ROMP under optimized conditions.

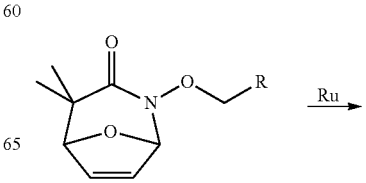

-continued

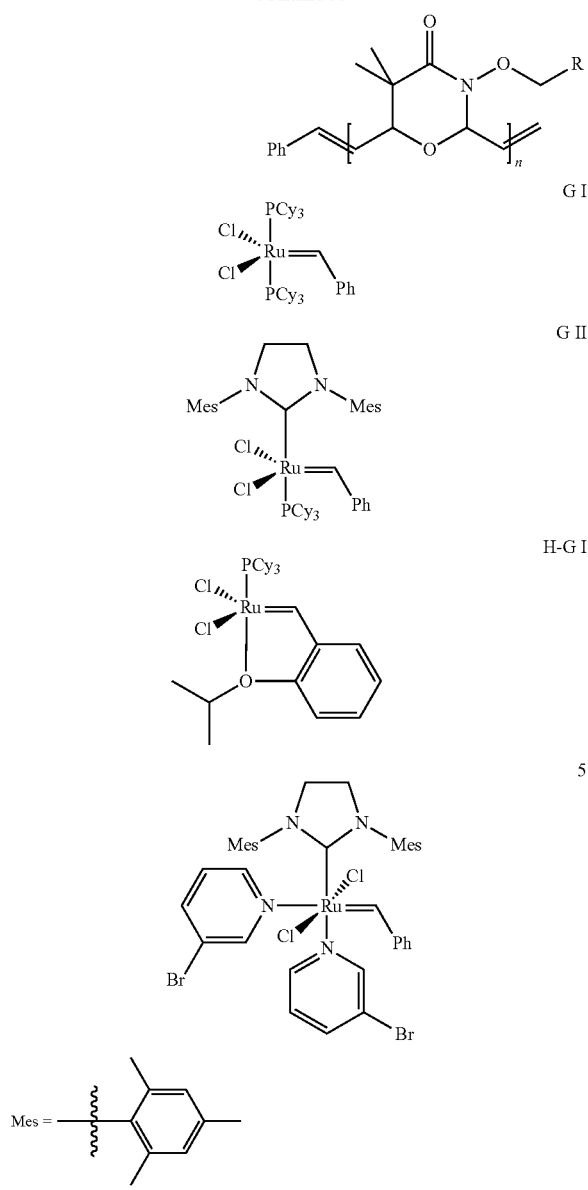

B. General Procedure: Synthesis of Polymers by ROMP

To a stirring solution of initiator G11 or 5 (Love, J. A.; Morgan, J. P.; Trnka, T. M.; Grubbs, R. H. *Angew. Chem. Int. Ed.* 2002, 41, 4035) in either chloroform or THF (0.1 mL) and under an atmosphere of argon was added monomer (0.20 mmol) in either chloroform or THF (0.1 mL). As noted below, better polymerization conditions for 3e employed 1:1 THF:CHCl$_3$.

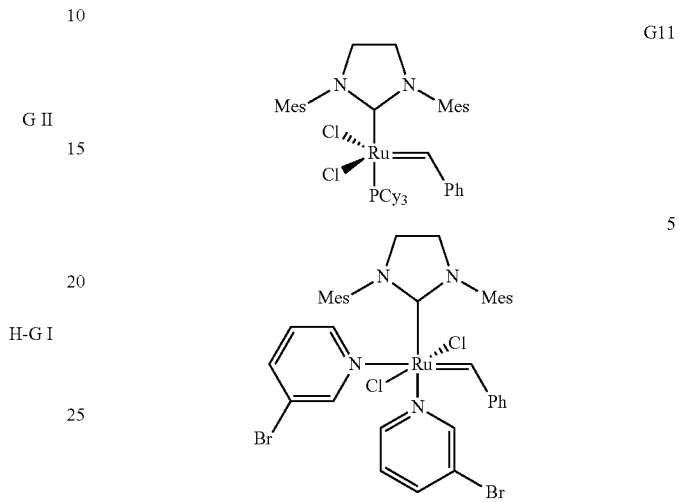

The reaction was allowed to stir for the time and temperature specified in Table 1. The reaction was quenched with ethyl vinyl ether (100 μL) and the solution was allowed to stir over night at rt. The reaction mixture was triturated using Et$_2$O or MeOH (30 mL) and the resulting solid was isolated via centrifugation.

C. Preparation of Polymer 4a

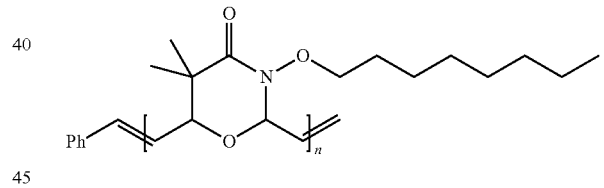

Polymers 4a were synthesized following the general procedure using monomer 3a. Polymer was collected by trituration into MeOH. $^1$H-NMR (CDCl$_3$, 500 MHz): δ 6.25-5.60 (m, 2H), 5.50-5.20 (m, 1H), 4.35-3.55 (m, 3H), 1.75-1.00 (m, 18H), 1.90-1.80 (broad t, J=6.7 Hz, 3H).

D. Preparation of Polymer 4b

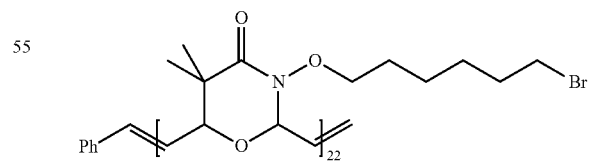

Polymers 4b were synthesized following the general procedure using monomer 3b. Polymer was collected by trituration into cold MeOH. $^1$H-NMR (CDCl$_3$, 500 MHz): δ 7.50-7.30 (m, 0.18H), 7.00-6.80 (m, 0.04H), 6.20-5.70 (m, 2H, olefin), 5.45-5.25 (m, 1H), 4.30-3.70 (m, 3H), 3.40 (broad t, J=6.1 Hz, 2H), 1.85 (broad s, 2H), 1.70-1.35 (m, 6H), 1.30-1.05 (m, 6H).

TABLE 3

Conditions Screened to Optimize the Polymerization of Monomer 3a by ROMP

| Ru | solvent[a] | temp (° C.) | [3a]$_o$/[Ru] | M$_n^{theo}$ (g/mol) | M$_n^{obs}$ (g/mol) | PDI |
|---|---|---|---|---|---|---|
| G II | CH$_2$Cl$_2$ | 20 | 10/1 | 2,700 | 8,807 | 2.13 |
| G II | chlorobenzene | 20 | 10/1 | 2,700 | n.r. | — |
| G II | CHCl$_3$ | 20 | 10/1 | 2,700 | 11,408 | 2.23 |
| G I | CH$_2$Cl$_2$ | 20 | 10/1 | 2,700 | n.r. | — |
| H-G I | CH$_2$Cl$_2$ | 20 | 10/1 | 2,700 | n.r. | — |
| 5 | CH$_2$Cl$_2$ | 20 | 10/1 | 2,700 | 3,641 | 1.52 |
| 5 | THF | −10 | 10/1 | 2,700 | 3,527 | 1.39 |
| 5 | THF | −10 | 25/1 | 6,750 | 7,139 | 1.39 |
| 5 | acetone | −10 | 25/1 | 6,750 | 10,296 | 1.56 |
| 5 | DME | −10 | 25/1 | 6,750 | 7,149 | 1.4 |
| 5 | isopropanol | −10 | 25/1 | 6,750 | 6,852 | 1.36 |
| 5 | pyridine | −10 | 25/1 | 6,750 | n.r. | — |

[a][3a]$_o$ = 1M

E. Preparation of Polymer 4c

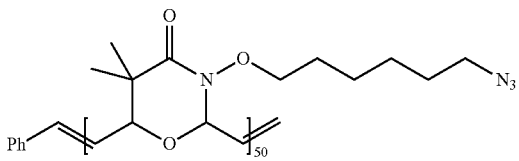

Polymer 4b (5 mg) and sodium azide (5 mg, 5 equiv with respect to bromine) were taken up in 1.0 mL DMF. The reaction was stirred at 65° C. overnight. The reaction was allowed to cool and the solvent was removed under reduced pressure. The residue was taken up in 2.0 mL of dichloromethane and the solution was separated from the insoluble material. The solvent was removed under reduced pressure to afford polymers 4c. $^1$H-NMR (CDCl$_3$, 500 MHz): δ 7.60-7.40 (m, 0.10H), 6.20-5.75 (m, 2H), 5.50-5.25 (m, 1H), 4.30-3.70 (m, 3H), 3.26 (broad t, 2H), 1.75-1.00 (m, 16H).

F. Preparation of Polymer 4d

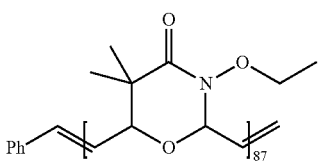

Polymers 4d were synthesized following the general procedure using monomer 3d. Polymer was collected by trituration into Et$_2$O. $^1$H-NMR (CDCl$_3$, 500 MHz): δ 6.30-5.60 (m, 2H), 5.60-5.10 (m, 1H), 4.70-3.50 (m, 3H), 1.50-0.90 (m, 9H).

G. Preparation of Polymer 4e.

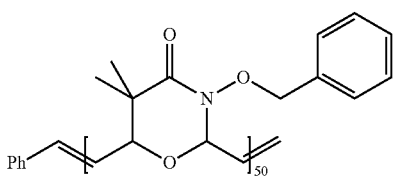

Polymers 4e were synthesized following the general procedure using monomer 3e. in a 1:1 THF:CHCl$_3$ solution. Polymer was collected by trituration into Et$_2$O. $^1$H-NMR (CDCl$_3$, 500 MHz): δ 7.50-7.20 (broad s, 5H), 6.10-5.60 (m, 2H), 5.20-4.60 (m, 3H), 4.15-3.90 (broad d, 1H), 1.35-1.00 (broad s, 6H).

It was found that the optimized polymerization conditions for monomer 3a (i.e. 1M in THF, 5, rt) did not work efficiently for monomer 3e. Better polymerization conditions for this monomer were found to be: 1M in 1:1 THF:CHCl$_3$, 5, −10° C. warming to rt. Although backbiting was mitigated using these reaction conditions [polymer Mn and PDI does not erode over long reaction times, the observed polymer dispersities remained high. The reason this monomer is less well behaved is not known, however, it may be that the growing polymer chain of 4e is less soluble in neat THF than the other polymers. Such a solubility discrepancy would lead to increased PDIs as the growing chain-end randomly would be in and out of solution.

H. Preparation of Polymer 4f

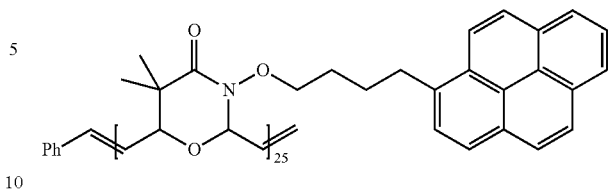

Polymer 4f was prepared following the general procedure using monomer 3f. Polymer was collect via trituration into Et$_2$O. 1H-NMR (CDCl$_3$, 500 MHz): δ 8.40-7.40 (m, 9.1H), 6.00-2.80 (m, 7H), 1.90-1.30 (m, 5H), 1.30-0.50 (m, 6H).

Preparation of Polymer 7.

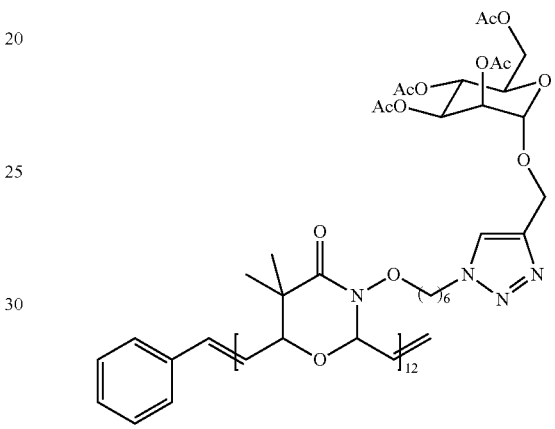

Polymer 7 was synthesized following the general procedure using monomer 6. Example ([6]/[5]=20/1). Collect polymer by trituration into Et$_2$O. $^1$H-NMR (CDCl$_3$, 500 MHz): δ 7.60 (broad s, 1.34H), 6.20-5.70 (m, 2H, olefin), 5.50-5.15 (m, 4H), 4.96 (broad s, 1H), 4.83 (broad d, 1H), 4.66 (broad d, 1H), 4.50-4.00 (m, 6H), 4.00-3.75 (m, 2H), 2.92 (broad s, 0.43H, NHS), 2.15 (broad s, 3H), 2.11 (broad s, 3H), 2.03 (broad s, 3H), 1.98 (broad s, 3H), 2.00-1.90 (m, 2H), 1.50-0.80 (m, 14H). DP=11; MW$^{calc}$=7732; M$_n$=7577; M$_w$=10518; PDI=1.39.

G. Preparation of Polymer 8.

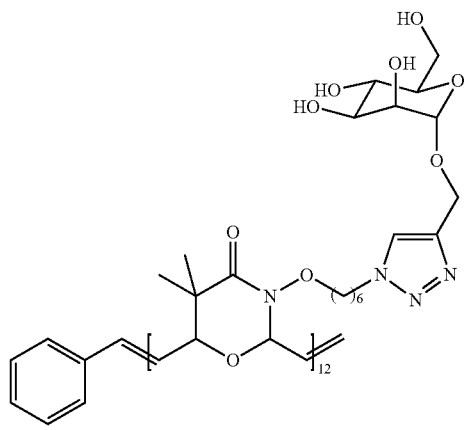

To a stirring solution of polymer 7 (7.0 mg) dissolved in DMSO (1.0 mL) was added a solution of sodium methoxide in methanol (50.0 µL, 0.50 M). The solution was allowed to stir at rt for 45 min and then directly loaded onto a PD-10 desalting column to remove the DMSO and methoxide. The water was removed by lyophilization to obtain polymer 8 as an off white solid (5.0 mg). $^1$H-NMR (DMSO-$d_6$, 500 MHz): δ 8.15 (s, 1H), 7.59 (s, 0.13H), 7.36 (s, 0.21H), 6.20-5.60 (m, 2H), 5.00-4.20 (m, 10H), 4.10-3.70 (m, 5H), 1.83 (s, 2H), 1.80-1.00 (m, 16H). DP=12.

Example 6

Polymer Degradation

A. Monitoring the Acidic Degradation of the ROMP Derived Polymers.

A stock solution of HCl in methanol (2.27 M) underwent four 10× dilutions to afford methanol solutions with [H$^+$] between 2.27 M and 0.227 µM. Polymer (2.4 mg) was taken up in THF (0.75 mL) and allowed to dissolve over 1 h. The polymer solution was passed through a syringe driven filter (Millex®-GV, PVDF—0.22 µm) and an initial $M_n$ reading was acquired by GPC. Acidic methanol solution (0.25 mL) was added to the polymer solution and degradation at each [H$^+$] concentration was monitored by analyzing aliquots of solution (100 µL) over 20 h by GPC. Results for polymer 4e are shown in FIG. 2A.

B. Monitoring the Basic Degradation of the ROMP Derived Polymers.

A commercially available stock solution of sodium methoxide in methanol (0.50 M) underwent four 10× dilutions to afford methanol solutions with [$^-$OMe] between 0.5 M and 0.05 µM. Polymer (2.4 mg) was taken up in THF (0.75 mL) and allowed to dissolve over 1 h. The polymer solution was passed through a syringe driven filter (Millex®-GV, PVDF—0.22 µm) and an initial $M_n$ reading was acquired by GPC. Basic methanol solution (0.25 mL) was added to the polymer solution and degradation was monitored at each [$^-$OMe] concentration by analyzing aliquots of solution (100 µL) over 20 h by GPC. Results for polymer 4e are shown in FIG. 2B.

Example 7

Monitoring the Degradation of Polymer 4d Via Pyrene Fluorescence

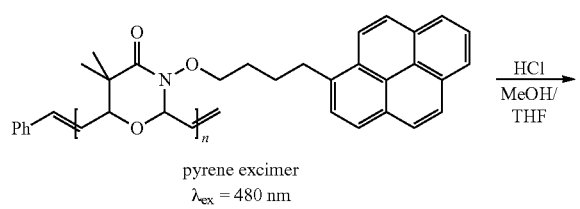

pyrene excimer
$\lambda_{ex} = 480$ nm

-continued

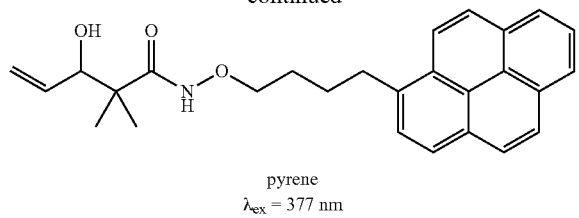

pyrene
$\lambda_{ex} = 377$ nm

Polymer 4d (2.4 mg) was taken up in THF (0.75 mL) and allowed to dissolve over 1 h. The polymer solution was passed through a syringe driven filter (Millex®-GV, PVDF—0.22 µm) and then acidified methanol (0.25 mL, 2.27 M) was added to the solution. The solution was allowed to stir at room temperature. Periodically, aliquots of the solution (14.3 µL) were drawn and diluted with THF (1.0 mL). The fluorescence emission spectrum of the sample was taken ($\lambda_{ex}$=250 nm) and the ratio of pyrene exciplex emission ($\lambda_{em}$=480 nm) to monomeric pyrene emission ($\lambda_{em}$=377 nm) was calculated. Decomposition was monitored by following this ratio over time. Results are shown in FIG. 3.

Example 8

To test the utility of synthetic polymers in a biological context, cell-based assays were developed to examine receptor-mediated cellular processes, including those mediated by the lectin DC-SIGN. [A) Kiessling, L. L.; Gestwicki, J. E.; Strong, L. E. Curr. Opin. Chem. Biol. 2000, 4, 696. B) Gestwicki, J. E.; Strong, L. E.; Kiessling, L. L. Chem. Biol. 2000, 7, 583. C) Borrok, J. M.; Kolonko, E. M.; Kiessling, L. L. A.C.S. Chem. Bio. 2008, 3, 101. D) Baessler, K. A.; Lee, Y.; Sampson, N. S. A.C.S. Chem. Bio. 2009, 4, 357. E) Lee, S. G.; Brown, J. M.; Rogers, C. J.; Matson, J. B.; Krishnamurthy, C.; Rawat, M.; Hsieh-Wison, L. C. Chem. Sci. 2010, 1, 322.] This receptor promotes internalization of macro-molecules decorated with carbohydrates, such as mannose. [A) Mitchell, D. A.; Fadden, A. J.; Drickamer, K. J. Biol. Chem. 2001, 276, 28939. B) Švajger, U.; Anderluh, M.; Jeraz, M.; Obermajer, N. Cellular Signalling 2010, 22, 1397.] By conjugating the azido-bearing monomer 3c to the peracylated monosaccharide 2-propargyl-α-D-mannose-3,4,5,7-tetraacetate [Gujadhar, R.; Venkataraman, D.; Kintigh, J. T. Tett. Lett. 2001, 42, 4791] using [CuBr(PPh$_3$)$_3$] [Schmid, S.; Mishra, A.; Bäuerle, P. Chem. Commun. 2011, 47, 1324] as an air-stable Cu$^1$ source, a grafting-through approach was taken to create polymers that could be used in this assay (Scheme 2B, 3g).

In order to visualize DC-SIGN mediated polymer internalization, a fluorescent tag must be appended to the mannosylated macromolecule. [Kolonko, E. M.; Kiessling, L. L. J. Am. Chem. Soc. 2008, 130, 5626; Mangold, S. M.; Carpenter, R. T.; Kiessling, L. L. Org. Lett. 2008, 10, 2997.] To this end, a handle for fluorophore conjugation needed to be installed on the polymer as shown in Scheme 6. Using initiator 16, an N-hydroxysuccinimidyl (NHS) ester was incorporated onto the polymer chain end through modification of the ruthenium alkylidene. [Bielawski, C. W.; Louis, J.; Grubbs, R. H. *J. Am. Chem. Soc.* 2000, 122, 12872.]

Scheme 6: Synthesis of functionalized ROMP catalyst

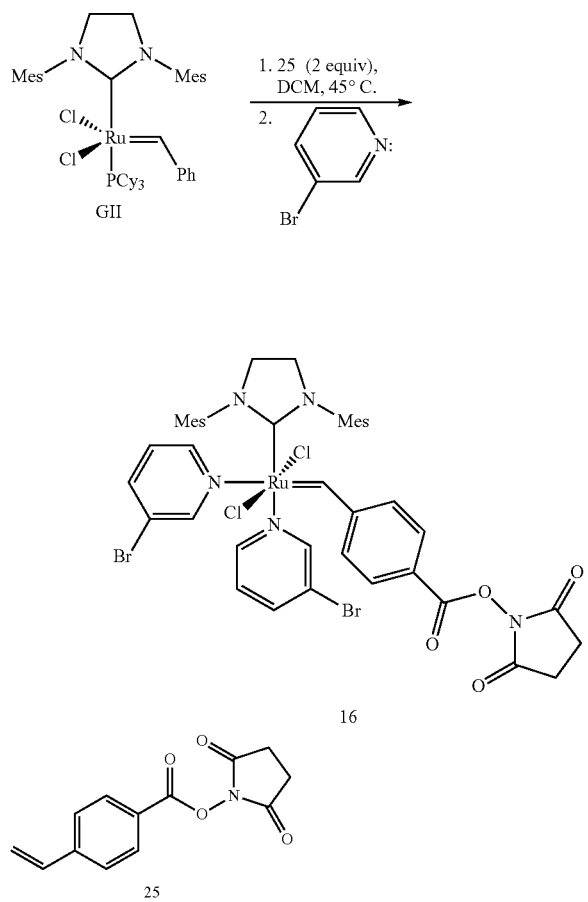

In Scheme 6, the functionalized styrene 25 carrying an activated ester group in the para-position is reacted with the pentacoordinate Grubbs $2^{nd}$ generation catalyst GII in dichloromethane to replace the carbene C=C-Phenyl, after which the neutral electron donor ligand substituted pyridine is added to make the functionalized hexacoordinate fast initiation catalyst 16. This scheme can be employed to replace the phenyl carbene of the catalyst with a variety of functionalized styrenes. The activated ester group in this case functions as a latent reactive group as defined above which is compatible with ROMP polymerization conditions.

Use of functionalized catalyst 16 lead to amine reactive polymer 27, which was conjugated to the fluorescent dye AlexaFluor488® following polymerization. Subsequent removal of the acetate groups from the carbohydrate ligands with a catalytic amount of sodium methoxide unmasked the bioactive moieties and completed the synthesis of polymer probe 29 (Scheme 7).

With polymer 29 cell internalization of the labeled polymers could be assessed. To test this, a Raji B-cell line engineered to express the receptor DC-SIGN was used. As a control, 29 was also exposed to Raji cells that do not express DC-SIGN. A positive re-suit is indicated by intracellular fluorescence due to polymer internalization. After incubating the cells for 40 minutes at 37° C. with 29, the cells were washed and internalization was assessed via confocal microscopy. When the polymer was added to the DC-SIGN-expressing Raji cells, the polymers were internalized and intracellular fluorescence was observed. On the other hand, no fluorescence was observed in Raji cells that do not express DC-SIGN.

Scheme 7. Synthesis of Flourophore Conjugated and Mannose-displaying Polymer.

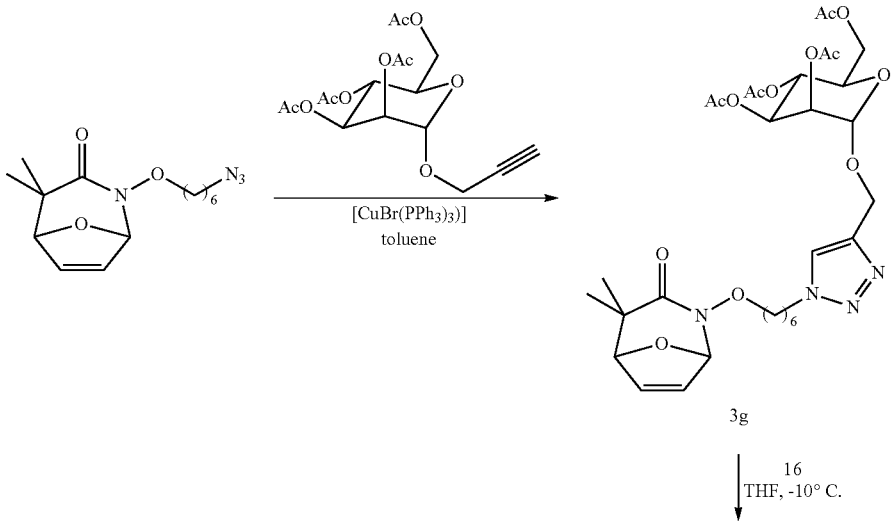

-continued
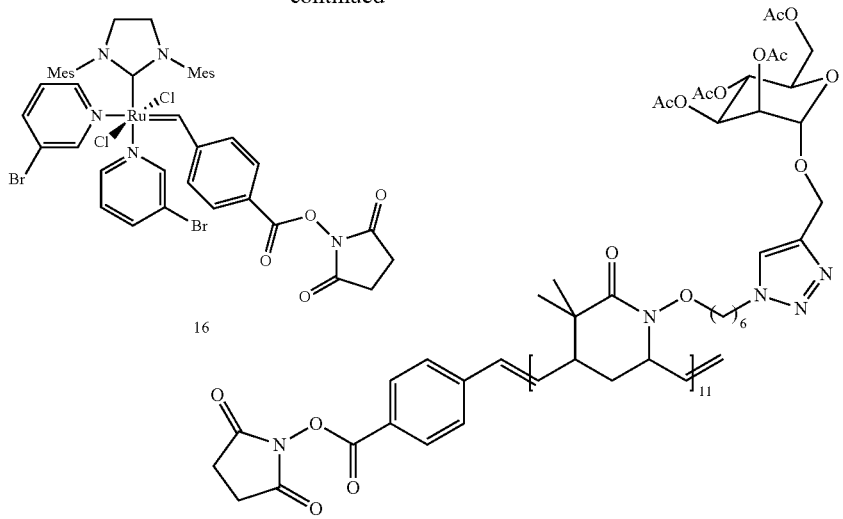
27
1. AF488 Cadaverine
   N-methylmorpholine
   DMSO
2. cat. NaOMe, DMSO
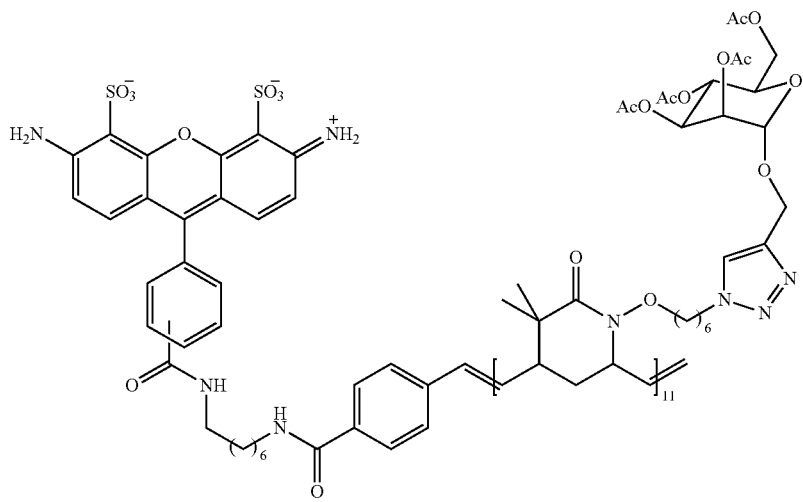
29
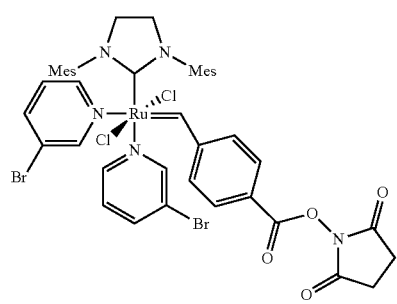
16

-continued

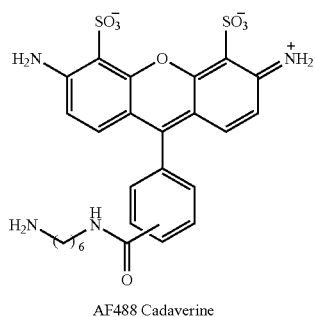
AF488 Cadaverine

Example 9

Synthetic Methods

The methods illustrated in Scheme 8 are employed to synthesize monomers of formulas I, II and III.

Scheme 8
Diversification of Core Monomer Structures 1. varying α position $A_1$ and $A_2$ many commercially available structures with connectivity:

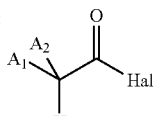

others can be made:

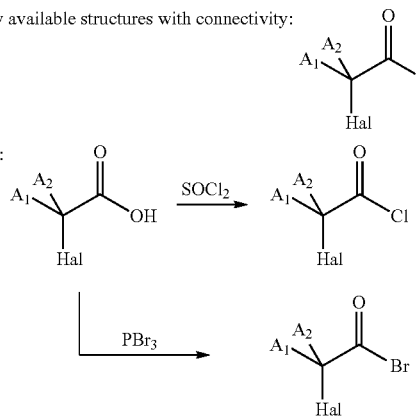

2. varying heteroatom Y

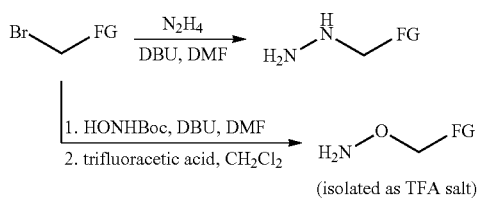

3. varying bridgehead heteroatom Z

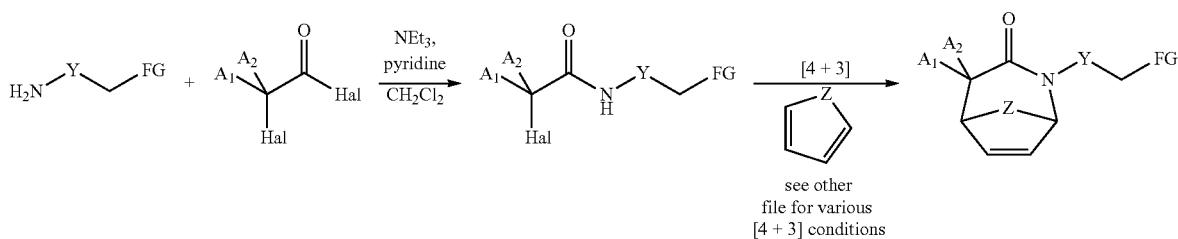

see other file for various [4 + 3] conditions 4. varying carbonyl heteroatom X

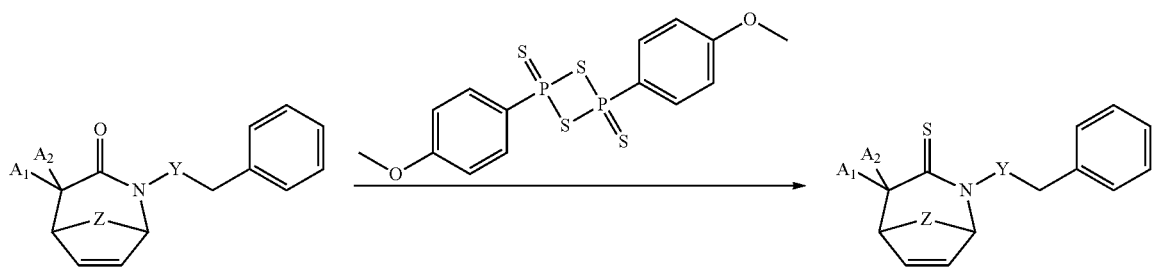

$A_1$ and $A_2$ = H, alkyl, aryl, halogen Hal = Cl, Br
FG: any fuctional group, functionalized hydrocabon chain, hydrocarbon chain, aryl, functionalized ary, H
NOTE: also many commericially available hydroxylamines and hydrazines
Y = N, O
Z = C, N, O, S

Example 10

Synthetic Methods

The methods illustrated in Scheme 9 are employed to synthesized monomers of formulas I, II and III herein

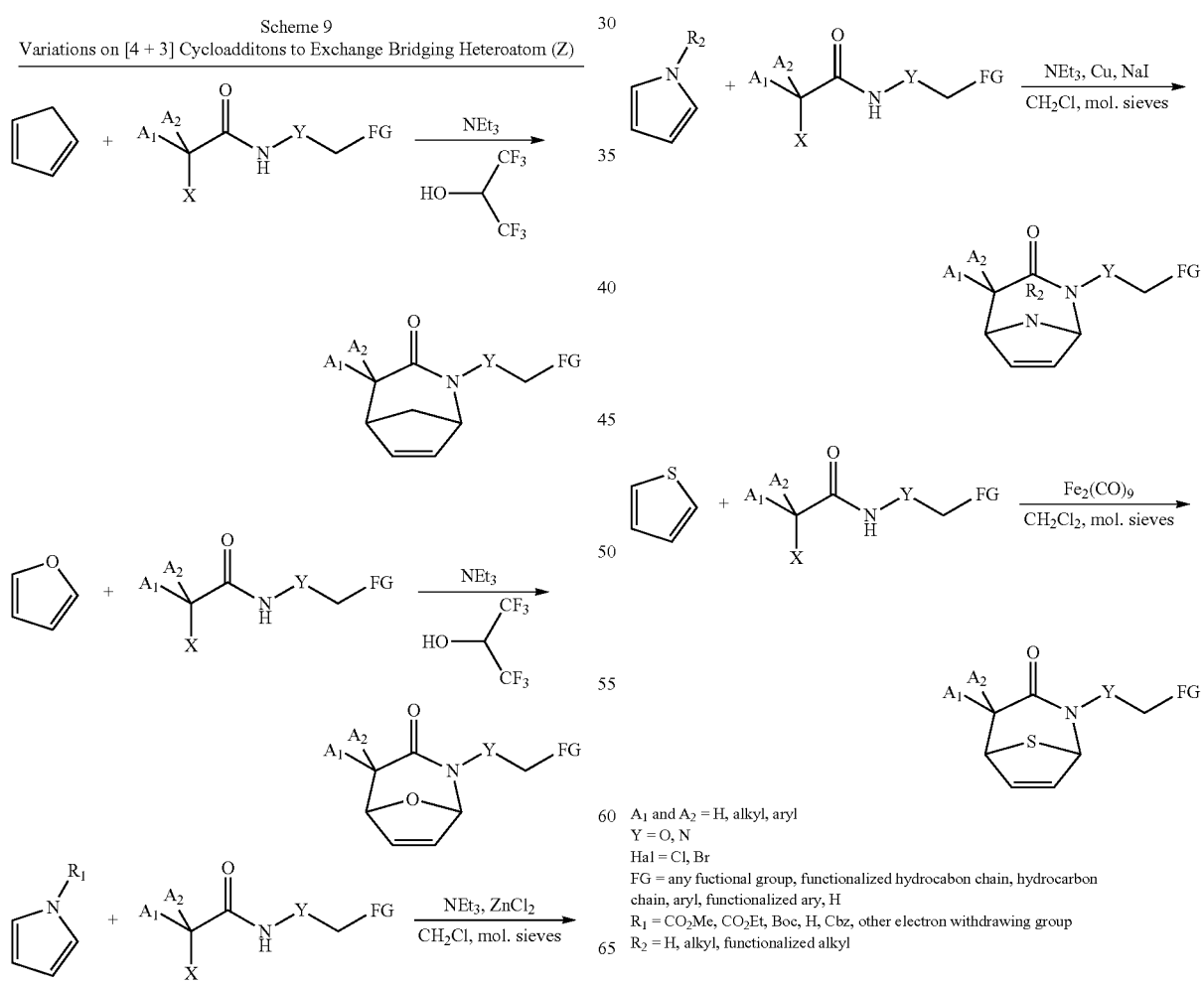

$A_1$ and $A_2$ = H, alkyl, aryl
Y = O, N
Hal = Cl, Br
FG = any fuctional group, functionalized hydrocabon chain, hydrocarbon chain, aryl, functionalized ary, H
$R_1$ = $CO_2Me$, $CO_2Et$, Boc, H, Cbz, other electron withdrawing group
$R_2$ = H, alkyl, functionalized alkyl

Example 11

Certain cyclic ureas of formula I are prepared as follows:

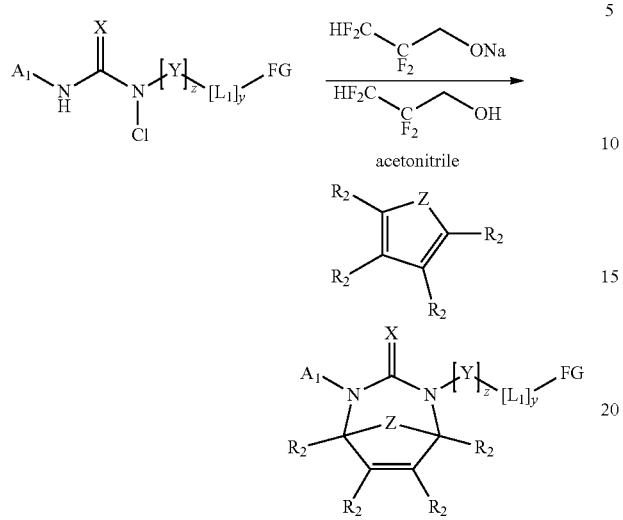

where variables are as defined for formula I. As noted for formula I, $A_1$ is hydrogen, halogen, alkyl, arylalkyl, alkoxy, acyl, heterocyclyl, aryl or heteroaryl, or $A_1$ and $A_2$ is $-[L_2]_{y2}$-FG1.

Example 12

Certain heteronorborenes of formula I are prepared as follows:

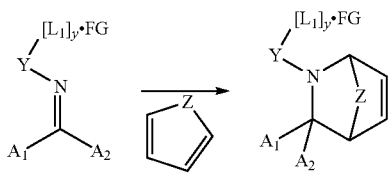

where variables are as defined for formula I. As noted for formula I, $A_1$ and $A_2$ are independently hydrogen, halogen, alkyl, arylalkyl, alkoxy, acyl, heterocyclyl, aryl or heteroaryl, $A_1$ and $A_2$ together form a 5-6-member ring which optionally has one or two heteroatoms or one or both of $A_1$ and $A_2$ are independently $-[L_2]_{y2}$-FG1;

Example 13

Glass Temperatures of Polymers

Degradable polymers are often designed with the intention to replace extant non-degradable commodity plastics and resins. Therefore, degradable polymers must have comparable tensile and rheological properties to the polymer they are replacing the avoid fatigue or deformation under normal operating conditions. A limitation of current degradable polymers is many have low glass transition temperatures (Tg) which limits their use in applications that require the material to withstand exposure to high temperatures (e.g. for use as containers for hot food or beverages) [Xu, J. and Guo, B.-H. *Biotechnol. J.* 2010, 5, 1149; Vroman, I. and Tighzert, L. *Materials*, 2009, 2, 307; Lavilla, C. et al. *Biomacromolecules*, 2013, 14, 78].

Figure 4:
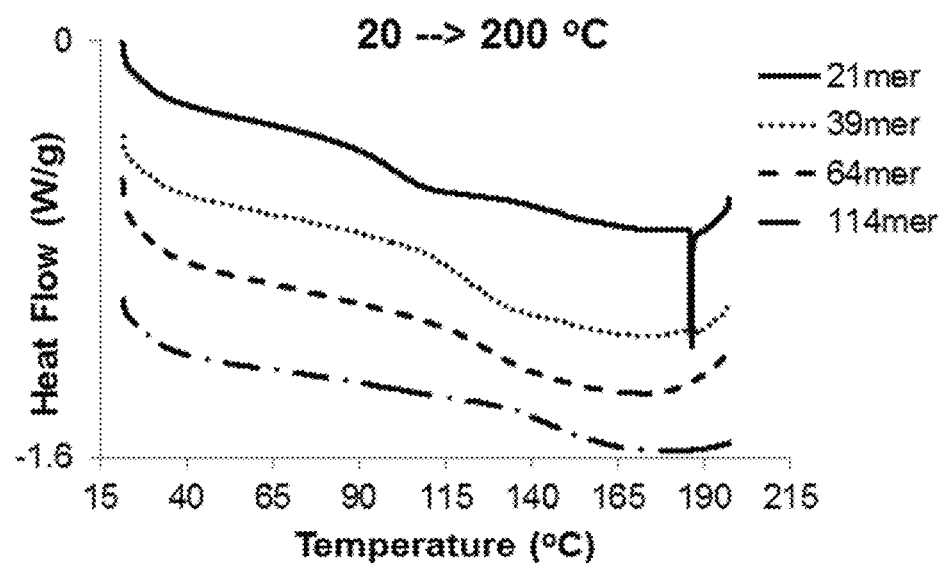
FIG. 4 is a graph of DSC heating trace for polymer X(4e) at various degrees of polymerization, i.e., where m is 21, 39, 64 and 114.

For instance, poly(lactic acid) (PLA) is considered a degradable polymer with a high Tg, yet only has a Tg of about 55° C. [Xu and Guo 2010]. On the other hand, cyclic olefin copolymers (COC) generated from the copolymerization of ethylene and a cyclic olefin are known to have Tg's well in excess of 100° C., yet are non-degradable [Lavoie, A. R. et al. *Chem. Comm.*, 2003, 864: Yu, S. T et al. *Macromolecules*, 2010, 43, 725; Hong, M. et al. *Macromolecules*, 2012, 45, 5397.] ROMP derived polyoxazinone polymers resemble COC's in connectivity and contain a degradable linkage along the backbone. Therefore, the Tg for polymer 4e of varying chain lengths was assess using Differential Scanning calorimetry (DSC). The results are shown in FIG. 4 and glass transition temperatures are listed in Table 5.

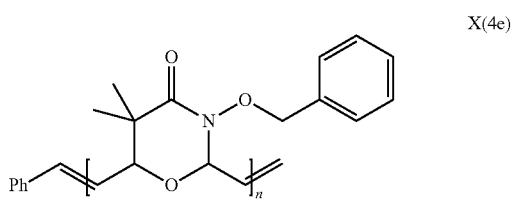

X(4e)

It was observed that even for short oligomers of X(4e) high Tg's were observed (DP=21, Tg=93° C.). The Tg was found to increase as the DP increased and a Tg as high as 145° C. was observed for DP=114. Therefore, polyoxazinones represent a unique structure allowing both degradability and tolerance to thermal stress.

TABLE 5

Glass Transition Temperatures for Certain X4e polymers

| n   | $M_n$ (g/mol)[a] | $T_g$ (° C.) |
|-----|------------------|--------------|
| 21  | 5500             | 93           |
| 39  | 10100            | 116          |
| 64  | 16600            | 128          |
| 114 | 30000            | 145          |

[a]using polymer X4e, determined by GPC, THF elutant at 1.0 mL/min using polystyrene standards.
[b]mid-point temperature of Tg.

We claim:

1. A method for preparing a degradable polymer or copolymer which comprises contacting one or more monomers of formula I:

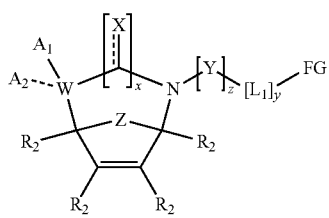

or salts thereof with a ROMP catalyst wherein the ROMP catalyst is a Ru or Os carbene catalyst having at least one N-heterocyclic carbene ligand;

where:

X is =O, =S, —N($R_1$)—, or —C($R_2$)$_2$— and x is 0 or 1 to show the absence or presence of X;

Y is —N$R_1$, —O—, —S—, or —C($R_2$)$_2$—, and z is 0 or 1 to show the absence of presence of Y;

Z is >C(R$_2$)$_2$, >NR$_1$, —O—, —S—, —SO—, or —SO$_2$—;

W is tetravalent carbon or trivalent nitrogen, where if W is N, then A$_2$ is not present;

A$_1$ and A$_2$ are independently hydrogen, halogen, alkyl, arylalkyl, alkoxy, acyl, heterocyclyl, aryl or heteroaryl, or A$_1$ and A$_2$ together form a 5-6-member ring which optionally has one or two heteroatoms or one or both of A$_1$ and A$_2$ are independently -[L$_2$]$_{y2}$-FG1;

FG and FG1 are independently functional groups;

L$_1$ and L$_2$ are independently divalent linking moieties, where y and y2 are 0 or 1 to show the absence of presence of L$_1$ or L$_2$, respectively;

each R$_1$ is independently hydrogen, alkyl or aryl;

each R$_2$ is independently hydrogen, halogen, alkyl, arylalkyl, alkoxy, acyl, or aryl; and wherein A$_1$, A$_2$, R$_1$ and R$_2$ groups are optionally substituted with one or more alkyl, alkoxy, acyl, amine, amino, alkylamino, dialkylamino, hydroxyl or halogen.

2. The method of claim 1 wherein FG is selected from a halogen, a silyl group, a silyl ether group, a sulfonate group, an amine group, —N$_3$, an azide group, a tosyl group, an aryl group, an alkynyl group, an alkenyl group, an arylalkyl group, an alkylaryl group, a triazolyl group, an epoxide group, —OH, —COOH, an activated ester group, a thioester group, a phosphinothioester group, an acid halide group, a malemide group, HS—, an acyl azide group, a hydroxylamine group, an aldehyde or ketone group, a urea group, a disulfide, a diol group, a dithiol, —CO—CH=CH$_2$, —NH—CO—CH=CH, a hydrazine group, a hydrazone group, an acyl sulfonamide group, a boronic acid group, a cyano group, an isocyanide group, an isocyanate group, an isothiocyanate group, a mono-, di- or triphosphoric acid ester group, a phosphite group, a phosphine group, a, phosphoranes group, an iminophosphorane group, a guanidinium group, an acyl nitrite group, a phenol group, an aryl halide group, a heterocyclic or a heteroaryl group.

3. The method of claim 1 wherein FG is selected from a halogen, —OSO$_2$R$_5$, —N(R$_6$)$_2$, —N$_3$, a tosyl group, an aryl group, an alkynyl group, an alkenyl group, an arylalkyl group, an alkylaryl group, a triazolyl group, an epoxide group, —OH, —COOH, an activated ester group, a thioester group, a phosphinothioester group, an acid halide group, a malemide group, HS—, an acyl azide group, a hydroxylamine group, —COR$_7$, —N(R$_7$)$_2$—CO—N(R$_7$)$_2$; —S—SR$_7$, a diol group, a dithiol group, —CO—CH=CH$_2$, —NH—CO—CH=CH, a hydrazine group, a hydrazone group, an acyl sulfonamide group, a boronic acid group, an isocyanate group, an isothiocyanate group, a mono-, di- or triphosphoric acid ester group, a phosphite group, a phosphine group, a phosphate group, a phosphorane group, an iminophosphorane group, a guanidinium group, —Si(R$_{10}$)$_3$, —Si(R$_{10}$)$_2$(OR$_7$), —Si(R$_{10}$)(OR$_{17}$)$_2$, —Si(OR$_{17}$)$_3$, an acyl nitrites group, a phenol group, an aryl halide group, or an indolyl group, wherein R$_5$ is fluorine, alkyl, aryl, halogenated alkyl, or halogenated aryl; each R$_6$ is hydrogen, alkyl or aryl or both R$_6$ together form a 5- or 6-member heterocyclic or heteroaryl ring; each R$_7$ is hydrogen, alkyl, alkenyl, alkynyl, aryl, each of which is optionally substituted with one or more halogens, alkyl, alkoxy, aryl, acyl, amine, or hydroxyl; and each R$_{10}$ is a halogen, hydrogen, alkyl, alkenyl, alkynyl, aryl, heteroaryl or heterocyclic, each of which is optionally substituted with one or more halogens, alkyl, alkoxy, aryl, acyl, amine, or hydroxyl.

4. The method of claim 1 wherein FG is a halogen, an activated ester group, a fluorescent label, or a mono-, di-, oligo- or polysaccharide.

5. The method of claim 1 wherein FG is an alkyl, alkenyl or aryl group optionally substituted with one or more halogens; alkoxy groups; hydroxyl groups; —N(R$_4$)$_2$; —N(R$_4$)$_3^+$ or salts thereof; —COO$^-$ or salts thereof; carboxylic acid groups; —COOR$_4$; or —SO$_3$R$_4$, wherein R$_4$ is an alkyl, alkenyl or aryl group which in turn is optionally substituted with one or more halogens; C1-C3 alkyl group; C1-C3 alkoxy group; hydroxyl group; amino groups, protonated amino groups or salts thereof; —COH; —COO$^-$ or salts thereof; carboxylic acid groups; —SO$_3$H; or —SO$_3^-$ or salts thereof.

6. The method of claim 1 wherein FG is a halogenated aryl group, a substituted phenyl group, a substituted benzyl group, a mono-, di-, oligo- or polysaccharide, an amino acid, peptide or protein.

7. The method of claim 1 which further comprises reacting one or more of the monomers wherein FG is a reactive group to modify the FG group therein and thereafter contacting the one or more modified monomers with a ROMP catalyst.

8. The method of claim 7 which further comprises reacting one or more of the monomers wherein FG is an azide with an alkyne to modify the FG group therein and thereafter contacting the one or more modified monomers with a ROMP catalyst.

9. The method of claim 7 wherein the modified FG group is a non-reactive functional group.

10. The method of claim 1 wherein X is present and is =O, Y is O, or is absent; W is carbon and Z is O.

11. The method of claim 1 where X is present and is =O; Y is NR$_1$ or is absent; W is carbon and Z is O.

12. The method of claim 1 where X is present and is =O or =S, and W is nitrogen.

13. The method of claim 1 where X is absent, and W is carbon.

14. The method of claim 1 wherein y is 1 and L$_1$ comprises an alkylene moiety, a heterocyclene moiety or both.

15. The method of claim 14 wherein y is 1 and L$_1$ is:

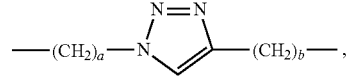

where a and b are 1-12.

16. The method of claim 15 wherein FG is a monosaccharide.

17. The method of claim 1 wherein a mixture of different monomers are contacted with the ROMP catalyst, wherein the monomers are of formula 1 or of formula III, where formula III is:

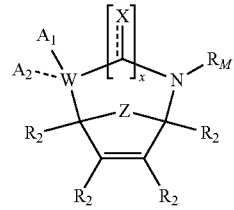

where in formula III,

X is =O, or =S;

A$_1$, A$_2$, X and Z are as defined for formula I and

R$_M$ is unsubstituted alkyl, unsubstituted arylalkyl, unsubstituted alkoxy, unsubstituted arylalkoxy, unsubstituted alkylthio, or unsubstituted arylalkylthio.

18. The method of claim 17 wherein the monomers differ in FG or FG1 groups.

19. A polymer or copolymer prepared by the method of claim 1.

20. A polymer or co-polymer prepared by the method of claim 1 further comprising contacting one or more monomers of formula III with the ROMP catalyst where formula III is:

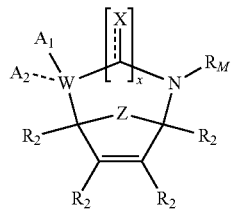

where in formula III,
X is =O, or =S;
$A_1$, $A_2$, X, and Z are as defined for formula I and $R_M$ is unsubstituted alkyl, unsubstituted arylalkyl, unsubstituted alkoxyl, unsubstituted arylalkoxy, unsubstituted alkylthio, or unsubstituted arylalkylthio.

21. The method of claim 15 wherein X is present and is =O, Y is O, or is absent; W is carbon and Z is O.

22. The method of claim 15 where X is present and is =O; Y is $NR_1$ or is absent; W is carbon and Z is O.

23. The method of claim 15 where X is present and is =O or =S, and W is nitrogen.

24. The method of claim 1 wherein the compound of formula I has formula:

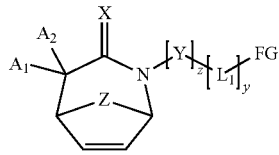

where:
X is O or S;
Y is $NR_1$, O, S or a single bond;
Z is $C(R_2)_2$, $NR_1$, O or S; and
$A_1$ and $A_2$ are independently hydrogen, halogen, alkyl, arylalkyl, alkoxy, acyl, heterocyclyl, aryl or heteroaryl, or $A_1$ and $A_2$ together form a 5-6-member ring which optionally has one or two heteroatoms;
and wherein X and Z are not both O.

25. The method of claim 24 wherein y is 1 and $L_1$ is:

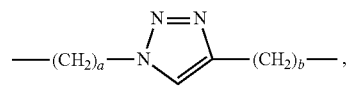

where a and b are 1-12.

26. The method of claim 25 wherein FG is a halogen, an activated ester group, a fluorescent label, or a mono-, di-, oligo- or polysaccharide.

27. The method of claim 1 wherein FG is selected from a halogen, a silyl group, a silyl ether group, a sulfonate group, an amine group, —$N_3$, an azide group, a tosyl group, an alkynyl group, an alkenyl group, a triazolyl group, an epoxide group, —OH, —COOH, an activated ester group, a thioester group, a phosphinothioester group, an acid halide group, a malemide group, HS—, an acyl azide group, a hydroxylamine group, an aldehyde or ketone group, a urea group, a disulfide, a diol group, a dithiol, —CO—CH=$CH_2$, —NH—CO—CH=CH, a hydrazine group, a hydrazone group, an acyl sulfonamide group, a boronic acid group, a cyano group, an isocyanide group, an isocyanate group, an isothiocyanate group, a mono-, di- or triphosphoric acid ester group, a phosphite group, a phosphine group, a, phosphoranes group, an iminophosphorane group, a guanidinium group, an acyl nitrite group, a phenol group, an aryl halide group, a heterocyclic or a heteroaryl group.

* * * * *